US012473369B2

(12) United States Patent
Zhang et al.

(10) Patent No.: US 12,473,369 B2
(45) Date of Patent: Nov. 18, 2025

(54) FUSION PROTEIN OF ANTI-ETA ANTIBODY AND TGF-BETA TRAP AND PHARMACEUTICAL COMPOSITION AND APPLICATION THEREOF IN METHOD OF TREATMENT

(71) Applicant: GMAX BIOPHARM LLC, Hangzhou (CN)

(72) Inventors: Cheng Zhang, Hangzhou (CN); Chenjiang Yao, Hangzhou (CN); Hua Zhang, Hangzhou (CN); Xiaofeng Wang, Hangzhou (CN); Shuqian Jing, Hangzhou (CN)

(73) Assignee: GMAX BIOPHARM LLC, Hangzhou (CN)

(*) Notice: Subject to any disclaimer, the term of this patent is extended or adjusted under 35 U.S.C. 154(b) by 973 days.

(21) Appl. No.: 17/627,089

(22) PCT Filed: Jul. 14, 2020

(86) PCT No.: PCT/CN2020/101857
§ 371 (c)(1),
(2) Date: Jan. 13, 2022

(87) PCT Pub. No.: WO2021/008519
PCT Pub. Date: Jan. 21, 2021

(65) Prior Publication Data

US 2022/0265771 A1 Aug. 25, 2022

(30) Foreign Application Priority Data

Jul. 17, 2019 (CN) ........................ 201910645466.X

(51) Int. Cl.

| | |
|---|---|
| ***C07K 16/28*** | (2006.01) |
| ***A61K 38/17*** | (2006.01) |
| ***A61K 39/395*** | (2006.01) |
| ***A61K 47/68*** | (2017.01) |
| ***A61P 9/00*** | (2006.01) |
| ***A61P 9/12*** | (2006.01) |
| ***A61P 11/00*** | (2006.01) |
| ***C07K 14/71*** | (2006.01) |
| ***C12N 15/63*** | (2006.01) |
| *A61K 39/00* | (2006.01) |
| *C07K 14/495* | (2006.01) |
| *C07K 14/72* | (2006.01) |

(52) U.S. Cl.

CPC ........ *C07K 16/2869* (2013.01); *A61K 38/179* (2013.01); *A61K 39/3955* (2013.01); *A61K 47/6811* (2017.08); *A61K 47/6835* (2017.08); *A61P 9/00* (2018.01); *A61P 9/12* (2018.01); *A61P 11/00* (2018.01); *C07K 14/71* (2013.01); *C12N 15/63* (2013.01); *A61K 2039/505* (2013.01); *C07K 14/495* (2013.01); *C07K 14/72* (2013.01); *C07K 2317/565* (2013.01); *C07K 2319/00* (2013.01); *C07K 2319/30* (2013.01); *C07K 2319/32* (2013.01)

(58) Field of Classification Search

CPC C07K 16/2869; C07K 14/71; C07K 2319/00; C07K 2319/30; C07K 2319/32; A61K 39/3955; A61K 38/179; A61K 47/6811; A61K 47/6835; A61P 9/00; A61P 9/12; A61P 11/00

See application file for complete search history.

(56) References Cited

U.S. PATENT DOCUMENTS

| | | | |
|---|---|---|---|
| 9,750,761 | B2 | 9/2017 | Kottmann et al. |
| 2018/0256714 | A1 | 9/2018 | Zhang et al. |
| 2019/0365894 | A1 | 12/2019 | Zhang et al. |

FOREIGN PATENT DOCUMENTS

| | | | |
|---|---|---|---|
| CA | 2971491 | A1 | 6/2017 |
| CN | 104371019 | A | 2/2015 |
| CN | 105669863 | A | 6/2016 |
| CN | 107987162 | A | 5/2018 |
| CN | 108348589 | A | 7/2018 |
| CN | 108368176 | A | 8/2018 |
| EP | 3476864 | A | 5/2019 |
| JP | 2017501977 | A | 1/2017 |
| JP | 2017506217 | A | 3/2017 |
| RU | 2425833 | A | 8/2011 |
| WO | WO 2012162592 | A1 | 11/2012 |
| WO | 2017037634 | A | 3/2017 |
| WO | WO 2017092375 | A1 | 6/2017 |
| WO | 2017206840 | A1 | 12/2017 |
| WO | WO 2018035119 | A2 | 2/2018 |
| WO | 2018204594 | A1 | 11/2018 |

OTHER PUBLICATIONS

Benjamini et al, 1991. Immunology: A Short Course, 2nd edition, p. 40 only.*
Ferrara et al (2015. mAbs. 7(1): 32-41).*
Tokuriki et al, 2009, Current Opinion in Structural Biology. 19: 596-604.*
Bhattacharya et al, 2017. Plos One. 12(3): e0171355, pp. 1-22 as printed.*

(Continued)

*Primary Examiner* — Zachary C Howard
(74) *Attorney, Agent, or Firm* — Junhe Law Office P.C.; James J. Zhu

(57) ABSTRACT

Provided is a fusion protein of an ETA antibody and a TGF-β Trap. Also provided is a pharmaceutical composition of the fusion protein of the ETA antibody and the TGF-β Trap. Further provided is a method for treating, preventing, or improving one or more symptoms of pulmonary arterial hypertension, pulmonary hypertension, pulmonary fibrosis, or cardiovascular fibrosis by using the fusion protein of the ETA antibody and the TGF-β Trap.

19 Claims, 4 Drawing Sheets

Specification includes a Sequence Listing.

(56) References Cited

OTHER PUBLICATIONS

Lan et al., "Enhanced preclinical antitumor activity of M7824, a bifunctional fusion protein simultaneously targeting PD-L1 and TGF-β", Science Translational Medicine, 10/eaan5488, pp. 1-15, DOI: 10/1126/scitranslmed.aan5488, Jan. 17, 2018.
David et al. 2017, "A novel bifunctional anti-PD-L1/TGF-b Trap fusion protein (M7824) efficiently reverts mesenchymalization of human lung cancer cells", OncoImmunology, 6 (10): e1349589.
Megalou et al. 2012, "Transforming growth factor-ß inhibition and endothelin receptor blockade in rats with monocrotaline-induced pulmonary hypertension", Pulm Circ., 2(4): 461-469.
Roman et al. 2016, "Catching a Disease: A Molecular Trap as a Therapy for Pulmonary Arterial Hypertension", American Journal of Respiratory and Critical Care Medicine, 194 (9), 1047-1048.
Yung Lai-Ming et al., A Selective Transforming Growth Factor-β Ligand Trap Attenuates Pulmonary Hypertension, Am J Respir Crit Care Med., 2016, v.194, n.9,p. 1140-1151, abstract, 1142-1149.
Kontermann R. E. et al., Bispecific antibodies, Drug Discovery Today, 2015, v.7, n.20, p. 838-847, Fig. 1.
El-Zaim H.S. et al., Protection against exotoxin A (ETA) and Pseudomonas aeruginosa infection in mice with ETA-specific antipeptide antibodies, Infect Immun., 1998, v.66, n. 11, p. 5551-5554, title, abstract.
Yarilin, A.A . . . , Foundations of Immunology, M.: Medicine, 1999, 608 pages, p. 172-174.
Singer, M. Et al., Genes and Genomes: in 2 vol., v.1, translated from English, M.: Mir, 1998, 373 pages, p. 63.
Su C. T.-T. et al., The role of Antibody Vκ Framework 3 region towards Antigen binding: Effects on recombinant production and Protein L binding, Scientific Reports, 2017, v.7, n.1, p. 3766, abstract, p. 1,5.
Torres M. et al., The immunoglobulin constant region contributes to affinity and specificity, Trends in immunology, 2008, v. 29, n. 2, p. 91-97, p. 93-94.
Frankel A.E. et al., Characterization of diphtheria fusion proteins targeted to the human interleukin-3 receptor, Protein Eng., 2000, v.13, n.8, p. 575-581, abstract, p. 579-580.
Arnau J. et al., Current strategies for the use of affinity tags and tag removal for the purification of recombinant proteins, Protein expression and purification, 2006, v. 48, n. 1, p. 1-13, p. 2.
Chen X. et al., Fusion protein linkers: property, design and functionality, Advanced drug delivery reviews, 2013, v. 65, n. 10, p. 1357-1369, entire text, p. 1365.
Maeda Y. et al., Engineering of functional chimeric protein GVargulaLuciferase, Analytical biochemistry, 1997, v. 249, n. 2, p. 147-152, entire text, p. 147.
Shen J. et al., Single variable domain-IgG fusion: a novel recombinant approach to Fc domain-containing bispecific antibodies, Journal of Biological Chemistry, 2006, v. 281, n. 16, p. 10706-10714, p. 10713.
Pakula A.A. et al., Genetic analysis of protein stability and function, Annual review of genetics, 1989, v. 23, n. 1, p. 289-310, p. 305-306.
Muller S. et al., Spliceosomal peptide P140 for immunotherapy of systemic lupus erythematosus: results of an early phase II clinical trial, Arthritis & Rheumatism: Official Journal of the American College of Rheumatology, 2008, v. 58, n. 12, p. 3873-3883, p. 3874.
Qi Pan et al . . . Blocking Neuropilin-1 Function Has an Additive Effect with Anti-VEGF to Inhibit Tumor Growth, Cancer Cell, 2007, v.11, n.1, p. 53-67, abstract, p. 54-65.
The Office Action and search report for the corresponding Russian application 2022100670 issued on Dec. 8, 2023.
David Alvarez et al "A novel role of endothelin-1 in linking Toll-like receptor 7-mediated inflammation to fibrosis in congenital heart block", the Journal of Biological Chemistry, vol. 286 issue 35, pp. 30444-30454, Sep. 2, 2011.
Justin M David et al "A novel bifunctional antiPDL1TGF Trap fusion protein M7824 efficiently reverts mesenchymalization of human lung cancer cells" Oncoimmunology, vol. 6, No. 10, Jul. 13, 2017, p. e1349589 XP055665439, DOI: 10.1080/2162402X.2017.1349589.
The First Office Action for the corresponding Chinese application 201910645466.X issued on Jun. 17, 2023.
The Extended European Search Report for the corresponding European application 20840563.9 issued on Jun. 15, 2023.
The Final Office Action for the counterpart JP application 2022-502538, mailed on Feb. 4, 2025.

* cited by examiner

| | h15F3 | h15F3-$(G_4S)_4$-TGF-β Trap |
|---|---|---|
| IC50 (μg/mL) | 7.99 | 8.38 |
| R square | 0.99 | 0.98 |

| | h15F3-$(G_4S)_4$-TGF-β Trap |
|---|---|
| IC50 (μg/mL) | 5.13 |
| R square | 0.99 |

FUSION PROTEIN OF ANTI-ETA ANTIBODY AND TGF-BETA TRAP AND PHARMACEUTICAL COMPOSITION AND APPLICATION THEREOF IN METHOD OF TREATMENT

CROSS-REFERENCE TO RELATED APPLICATIONS

This application is a U.S. national stage of International Patent Application No. PCT/CN2020/101857, filed Jul. 14, 2020, which claims the priority to Chinese Patent Application No. 201910645466.X, filed Jul. 17, 2019, the disclosure of each of which is incorporated by reference herein in its entirety.

SEQUENCE LISTING

This application incorporates by reference in its entirety the Computer Readable Form of a Sequence Listing in ASCII text format submitted via EFS-Web. The Sequence Listing text file submitted via EFS-Web is entitled "14254-013-999_SL.txt," was created on Jan. 7, 2022 and is 105,106 bytes in size.

FIELD

Provided herein is a fusion protein of an ETA antibody and a TGF-β Trap. Also provided herein is a pharmaceutical composition of the fusion protein of the ETA antibody and the TGF-β Trap. Further provided herein is a method for treating, preventing, or improving one or more symptoms of pulmonary arterial hypertension, pulmonary hypertension, or pulmonary fibrosis by using the fusion protein of the ETA antibody and the TGF-β Trap.

BACKGROUND

Pulmonary arterial hypertension (PAH) is a rare and progressive condition characterized by a marked increase in pulmonary arterial blood pressure. Pulmonary arterial hypertension has become an important condition threatening human health. Data shows that the annual incidence of various types of pulmonary arterial hypertension worldwide is about 2.4 to 7.6 per million, and the prevalence thereof is about 15 to 26 per million population. It has become the third most common cardiovascular condition only after ischemic heart disease and hypertension. The cause of pulmonary arterial hypertension is not yet fully understood. Because of its insidious onset, most patients are already at grades III to IV of cardiac function of pulmonary arterial hypertension. The accompanying symptoms of pulmonary arterial hypertension usually include shortness of breath (especially during exercise), chest pain, intermittent fainting, etc. In addition, as the condition continues, the continuous high pressure of pulmonary arteries will make the right ventricle fail to supply blood to the lungs continuously, which will eventually lead to right ventricular failure. Heart failure is the most common cause of death in patients with pulmonary arterial hypertension.

At present, there is no cure for pulmonary arterial hypertension, and drug therapy is the first choice for maintenance treatment of pulmonary arterial hypertension. The drugs approved by the FDA for the treatment of pulmonary arterial hypertension are vasodilators, which can be divided into calcium channel blockers, prostacyclin receptor agonists, phosphodiesterase type 5 (PDE5) inhibitors, endothelin receptor inhibitors and the like according to the mechanism.

Pulmonary arterial hypertension is caused by a compensatory increase in the pressure of the heart's blood supply to the lungs after the heart's blood supply to the lungs is insufficient due to vasoconstriction in the lungs or associated with the lungs. Its microscopic manifestations include thickening of the intima of pulmonary arterioles, and vascular contraction, remodeling, stiffness or local occlusion caused by thrombosis, thereby increasing the resistance of blood vessels to pulmonary blood circulation (Simonneau et al., 2004, J. Am. Coll. Cardiol. 43:5S-12S; Barst et al., 2004, J. Am. Coll. Cardiol. 43:40S-47S).

Endothelin receptor (e.g., Endothelin Receptor A (ETA or $ET_AR$)) inhibitors can effectively block the increase in vascular pressure caused by endothelin to relieve the symptoms of pulmonary arterial hypertension and improve the patient's exercise capacity and hemodynamics (Serasli et al., 2010, Recent Pat. Cardiovasc. Drug Discov. 5:184-95).

A number of studies have shown that transforming growth factor β1 (TGF-β1) plays an important role in a variety of conditions, especially in cardiovascular conditions. TGF-β1 participates in processes such as cell proliferation, differentiation, migration and apoptosis, and promotes processes such as smooth muscle cell proliferation, extracellular matrix deposition and endothelial-to-mesenchymal transition (EndMT) by regulating multiple signal pathways, thereby inducing the occurrence and development of pulmonary arterial hypertension (Yan et al., 2016, Int. J. Cardiol., 222:368-374; Graham et al., 2013, Circulation, 128: 1354-1364; Liu et al., 2016, Int. J. Biochem. Cell. Biol., 77:141-154). Pirfenidone, as an approved drug for the treatment of pulmonary fibrosis, can inhibit the expression of TGF-β, reduce the proliferation of fibroblasts, and attenuate the mRNA and protein levels of α-smooth muscle actin (α-SMA) induced by TGF-β.

TGF-β Trap is composed of the extracellular end of a TGF-β type 2 receptor, and can bind to TGF-β1 or TGF-β3, thereby effectively blocking TGF-β-mediated processes such as vascular smooth muscle cell proliferation and differentiation, extracellular matrix deposition and endothelial-mesenchymal transition in the course of pulmonary arterial hypertension. It can alleviate the fibrosis and remodeling of pulmonary arterioles, thereby reducing the resistance of pulmonary blood circulation and improving the function of the right heart (Goumans et al., 2018, Cold Spring Harb. Perspect. Biol., 10: a022210; Yung et al., 2016, Am. J. Respir. Crit. Care Med., 194:1140-1151).

Provided herein is a fusion protein of an ETA inhibitory antibody and a TGF-β Trap. On the one hand, the fusion protein of the ETA inhibitory antibody and the TGF-β Trap can block the ETA signaling pathway and reduce the resistance of blood vessels to pulmonary circulation; on the other hand, it can block the TGF-β signaling pathway and alleviate the fibrosis and remodeling of pulmonary arterioles. The purposes of treating pulmonary arterial hypertension and improving the function of the right heart are achieved through the dual mechanism of action.

SUMMARY

Provided herein is a fusion protein of an ETA antibody and a TGF-β Trap. Also provided herein is a method for treating, preventing, or improving one or more symptoms of pulmonary arterial hypertension, pulmonary hypertension, pulmonary fibrosis and cardiovascular fibrosis by using the fusion protein.

Provided herein is a fusion protein of an ETA antibody and a TGF-β Trap, structurally characterized in that the fusion protein comprises an ETA antibody and a TGF-β Trap fragment.

Provided herein is a fusion protein of an ETA antibody and a TGF-β Trap, structurally characterized in that the fusion protein comprises an ETA antibody, one, two, three, four, five, six, seven or eight TGF-β Traps and a corresponding number of peptide linkers (Linkers); the fusion protein connects the amino terminal of a TGF-β Trap with the carboxyl terminal of a light chain or a heavy chain of the ETA antibody via a peptide linker (Linker) sequence, or the fusion protein connects the carboxyl terminal of a TGF-β Trap with the amino terminal of a light chain or a heavy chain of the ETA antibody via a peptide linker (Linker) sequence.

Provided herein is a fusion protein of an ETA antibody and a TGF-β Trap, structurally characterized in that the fusion protein comprises an ETA antibody, one, two, three or four TGF-β Traps and a corresponding number of peptide linkers (Linkers); the fusion protein connects the amino terminal of a TGF-β Trap with the carboxyl terminal of a light chain or a heavy chain of the ETA antibody via a peptide linker (Linker) sequence, or the fusion protein connects the carboxyl terminal of a TGF-β Trap with the amino terminal of a light chain or a heavy chain of the ETA antibody via a peptide linker (Linker) sequence.

Provided herein is a fusion protein of an ETA antibody and a TGF-β Trap, structurally characterized in that the fusion protein comprises an ETA antibody, two TGF-β Traps and two peptide linkers (Linkers); the fusion protein connects the amino terminal of a TGF-β Trap with the carboxyl terminal of a light chain or a heavy chain of the ETA antibody via a peptide linker (Linker) sequence, or the fusion protein connects the carboxyl terminal of a TGF-β Trap with the amino terminal of a light chain or a heavy chain of the ETA antibody via a peptide linker (Linker) sequence.

Provided herein is a fusion protein of an ETA antibody and a TGF-β Trap, structurally characterized in that the fusion protein comprises an ETA antibody, a TGF-β Trap and a peptide linker (Linker); the fusion protein connects the amino terminal of the TGF-β Trap with the carboxyl terminal of a light chain or a heavy chain of the ETA antibody via the peptide linker (Linker) sequence, or the fusion protein connects the carboxyl terminal of the TGF-β Trap with the amino terminal of a light chain or a heavy chain of the ETA antibody via the peptide linker (Linker) sequence.

Provided herein is a fusion protein of an ETA antibody and a TGF-β Trap, structurally characterized in that the ETA antibody, TGF-β Trap and peptide linker sequence are fused to form the fusion protein in one of the following ways:

(1) via a peptide linker (Linker) sequence, the amino terminal of a TGF-βTrap is connected with the carboxyl terminal of a heavy chain/light chain of an ETA antibody: N'-R-Linker-TGF-β Trap-C'; and (2) via a peptide linker (Linker) sequence, the carboxyl terminal of a TGF-β Trap is connected with the amino terminal of a light chain or a heavy chain of an ETA antibody: N'-TGF-β Trap-Linker-R-C';

wherein N' represents the amino terminal of a polypeptide chain, C' represents the carboxyl terminal of a polypeptide chain, TGF-β Trap represents a TGF-β Trap fragment, R is the amino acid sequence of a light chain or a heavy chain of an ETA antibody, and Linker represents a peptide linker.

Provided herein is a polynucleotide encoding the fusion protein of an ETA antibody and a TGF-β Trap described herein.

Provided herein is a vector comprising the polynucleotide encoding the fusion protein of an ETA antibody and a TGF-β Trap described herein.

Provided herein is a host cell comprising the vector described herein.

Provided herein is a pharmaceutical composition comprising the fusion protein of an ETA antibody and a TGF-β Trap described herein and a pharmaceutically acceptable carrier.

Provided herein is the use of the fusion protein of an ETA antibody and a TGF-β Trap described herein in the preparation of a medicament for treating, preventing or improving one or more symptoms of pulmonary arterial hypertension and pulmonary arterial hypertension-related diseases.

Provided herein is the use of the fusion protein of an ETA antibody and a TGF-β Trap described herein in the preparation of a medicament for treating, preventing or improving one or more symptoms of pulmonary hypertension and pulmonary hypertension-related diseases.

Provided herein is the use of the fusion protein of an ETA antibody and a TGF-β Trap described herein in the preparation of a medicament for treating, preventing or improving one or more symptoms of pulmonary fibrosis and pulmonary fibrosis-related diseases.

Provided herein is the use of the fusion protein of an ETA antibody and a TGF-β Trap described herein in the preparation of a medicament for treating, preventing or improving one or more symptoms of cardiovascular fibrosis and cardiovascular fibrosis-related diseases.

Provided herein is the use of the fusion protein of an ETA antibody and a TGF-β Trap described herein in the preparation of a medicament for simultaneously treating, preventing or improving one or more symptoms of two or more diseases of pulmonary arterial hypertension, pulmonary hypertension, pulmonary fibrosis or cardiovascular fibrosis.

Provided herein is a method for treating, preventing or improving one or more symptoms of pulmonary arterial hypertension and pulmonary arterial hypertension-related diseases, comprising giving subjects a therapeutically effective dose of the fusion protein of an ETA antibody and a TGF-β Trap described herein.

Provided herein is a method for treating, preventing or improving one or more symptoms of pulmonary hypertension and pulmonary hypertension-related diseases, comprising giving subjects a therapeutically effective dose of the fusion protein of an ETA antibody and a TGF-β Trap described herein.

Provided herein is a method for treating, preventing or improving one or more symptoms of pulmonary fibrosis and pulmonary fibrosis-related diseases, comprising giving subjects a therapeutically effective dose of the fusion protein of an ETA antibody and a TGF-β Trap described herein.

Provided herein is a method for treating, preventing or improving one or more symptoms of cardiovascular fibrosis and cardiovascular fibrosis-related diseases, comprising giving subjects a therapeutically effective dose of the fusion protein of an ETA antibody and a TGF-β Trap described herein.

Provided herein is a method for treating, preventing or improving one or more symptoms of two or more diseases of pulmonary arterial hypertension, pulmonary hypertension, pulmonary fibrosis or cardiovascular fibrosis, comprising giving subjects a therapeutically effective dose of the fusion protein of an ETA antibody and a TGF-β Trap described herein.

DETAILED DESCRIPTION Definitions

Figure 1:
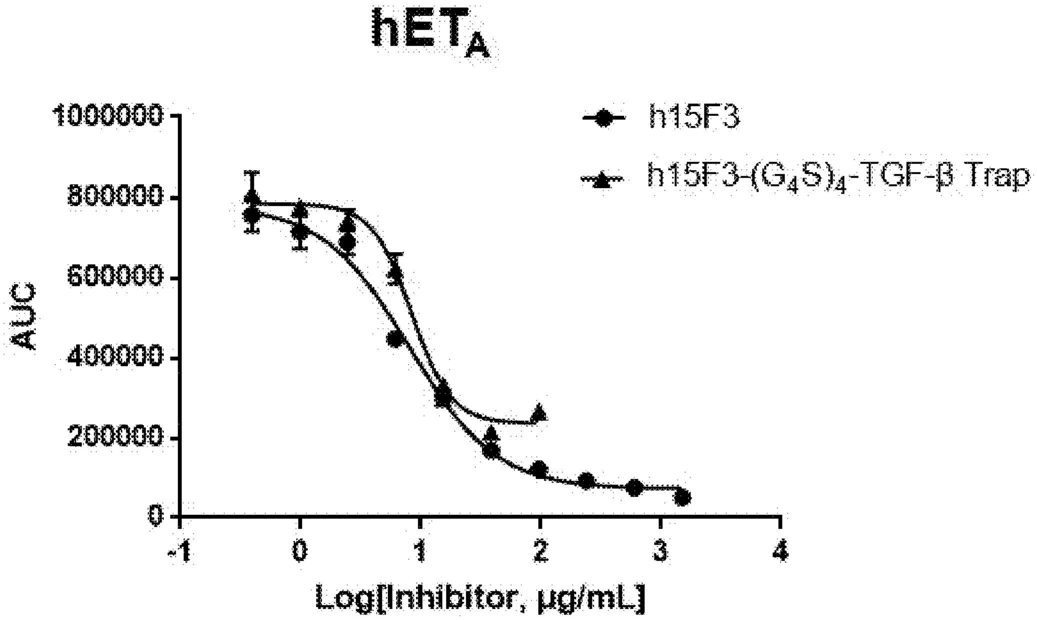
FIG. 1 shows the results of the fusion protein h15F3-$(G_4S)_4$-TGF-β Trap (comprising SEQ ID NO: 162, SEQ ID NO: 190, SEQ ID NO: 207, and SEQ ID NO: 210) of an ETA antibody and a TGF-β Trap inhibiting the $Ca^{2+}$ changes mediated by human ETA.

Unless defined otherwise herein, scientific and technical terms shall have the meanings understood by one of ordinary skill in the art. Generally, the nomenclature and techniques related to pharmacology, biology, biochemistry, cell and tissue culture, biology, molecular biology, immunology, microbiology, genetics and protein nucleic acid chemistry as well as hybridization are well known and commonly used in the art.

Standard one-letter or three-letter abbreviations are used herein to indicate polynucleotide and polypeptide sequences. Unless otherwise indicated, the amino terminal of the polypeptide sequence is on the left and the carboxyl terminal thereof is on the right, and the 5' ends of the upstream chains of single-stranded and double-stranded nucleic acid sequences are on the left and the 3' ends thereof are on the right.

The specific portion of a polypeptide can be represented by an amino acid residue number, such as amino acids 80 to 130, or represented by the actual residue of the site, such as Lys80 to Lys130. The specific polypeptide or polynucleotide sequence can also be described by explaining the difference thereof from the reference sequence.

The terms "peptide", "polypeptide", and "protein" refer to a molecule containing two or more amino acids that are interlinked by a peptide bond. These terms cover, for example, natural and artificial proteins, polypeptide analogs of protein fragments and protein sequences (such as mutant proteins, variants and fusion proteins), and proteins that are post-transcriptionally or otherwise covalently or non-covalently modified. A peptide, polypeptide, or protein can be a monomer or a polymer.

The term "polypeptide fragment" refers to a polypeptide that has an amino terminus and/or a carboxyl terminus absent from the corresponding full-length protein. The fragment length can be, for example, at least 5, 6, 7, 8, 9, 10, 11, 12, 13, 14, 15, 20, 50, 70, 80, 90, 100, 150, or 200 amino acids. The fragment length can be, for example, up to 1000, 750, 500, 250, 200, 175, 150, 125, 100, 90, 80, 70, 60, 50, 40, 30, 20, 15, 14, 13, 12, 11, or 10 amino acids. The fragment may further contain one or more additional amino acids at one end or both, such as amino acid sequences from different natural proteins (e.g., Fc or leucine zipper domains) or artificial amino acid sequences (e.g., artificial linker sequences).

The polypeptides herein include polypeptides modified for any reason and by any means, for example, to: (1) reduce susceptibility to proteolysis, (2) reduce susceptibility to oxidation, (3) alter the affinity for forming protein complexes, (4) alter the binding affinity, and (4) confer or modify other physiochemical or functional properties. Analogs contain a mutant protein of a polypeptide. For example, single or multiple amino acid substitutions (e.g., conservative amino acid substitutions) can be performed in natural sequences (e.g., outside the domain of the polypeptide that forms intramolecular contact). The "conservative amino acid substitution" is the one that does not significantly change the structural characteristics of the parent sequence (e.g., the substitution of amino acids shall not destroy the helices present in the parent sequence or interfere with other types of secondary structure that impart characteristics to the parent sequence or that are necessary for the function thereof).

A "variant" of a polypeptide includes an amino acid sequence in which one or more amino acid residues are inserted, deleted, and/or substituted in the amino acid sequence relative to another polypeptide sequence. The variants herein include fusion proteins.

A "derivative" of a polypeptide is a chemically modified polypeptide, for example, by binding to other chemical components such as polyethylene glycol and albumin (such as human serum albumin), phosphorylation, and glycosylation.

Unless otherwise stated, the term "antibody" includes antibodies with two full-length heavy chains and two full-length light chains, as well as their derivatives, variants, fragments, and mutant proteins, and instances are listed below.

The term "antibody" is a protein that contains the antigen-binding portion and optionally the scaffold or framework portion that allows the antigen-binding portion to adopt a conformation that promotes the binding of the antibody to the antigen. Examples of antibodies include intact antibodies, antibody fragments (such as the antigen-binding portion of an antibody), antibody derivatives, and antibody analogs. For example, the antibody may contain alternative protein scaffolds or artificial scaffolds with transplanted CDRs or derivatives of CDRs. The scaffold includes, but is not limited to an antibody-derived scaffold that is introduced, such as one that stabilizes the three-dimensional structure of the antibody, and a fully synthetic scaffold that contains, for example, a biocompatible polymer. See, for example, Korndorfer et al., 2003, Proteins: Structure, Function and Bioinformatics 53:121-129; Roque et al., 2004, Biotechnol. Prog. 20:639-654. In addition, peptide mimic antibodies ("PAMs") and scaffolds based on mimic antibodies can be used, which use fibrin ligands as scaffolds.

Antibodies may have the structure of, for example, a natural immunoglobulin. "Immunoglobulin" is a tetramer molecule. In a natural immunoglobulin, each tetramer consists of two identical polypeptide chain pairs, each pair having a "light" chain (about 25 kDa) and a "heavy" chain (about 50-70 kDa). The amino terminus of each chain includes a variable domain of about 100 to 110 or more amino acids, which is mainly related to antigen recognition. The carboxyl terminus of each chain determines the constant region mainly associated with the effect of the effectors. The human antibody light chains are divided into κ and λ light chains. The heavy chains are divided into μ, δ, α, or ε heavy chains, and the isotypes of the antigen are determined, such as IgM, IgD, IgG, IgA, and IgE. In light and heavy chains, the variable and constant regions are connected by the "J" region of about 12 or more amino acids, and the heavy chain also includes the "D" region of about 10 or more amino acids. See Fundamental Immunology Ch.7 (edited by Paul, 2nd edition, Raven Press, 1989) (the disclosure of which is incorporated by reference herein in its entirety for any purpose). Variable regions of each light/heavy chain pair form antibody binding sites, in this way an intact immunoglobulin has two binding sites.

The natural immunoglobulin chains exhibit the same basic structure of a relatively conservative framework region (FR) connected by three highly variable regions, also known as complementarity determining regions or CDRs. From the N end to the C end, the light and heavy chains contain the domains FR1, CDR1, FR2, CDR2, FR3, CDR3, and FR4. The assignment of amino acids in each domain is consistent with the definition in Kabat et al. Sequences of Proteins of Immunological Interest, 5th edition, US Dept. of Health and Human Services, PHS, NIH, NIH Publication No. 91-3242, 1991.

Unless otherwise specified, "antibody" means either an intact immunoglobulin or the antigen-binding portion thereof that can compete with an intact antibody for specific binding. The antigen-binding portion can be produced by recombinant DNA techniques, or by enzymatic or chemical cleavage of intact antibodies. The antigen-binding portion includes, in particular, Fab, Fab', $F(ab')_2$, Fv, domain antibodies (dAbs), fragments including complementarity determining regions (CDRs), single-chain antibodies (scFv), chimeric antibodies, diabodies, triabodies, tetrabodies, and polypeptides containing at least a portion of immunoglobulin sufficient to confer specific antigen binding to the polypeptides.

The Fab fragment is a monovalent fragment with $V_L$, $V_H$, $C_L$, and $C_{H1}$ domains; the $F(ab')_2$ fragment is a divalent fragment with two Fab fragments connected by a disulfide bond in the hinge region; the Fd fragment has a $V_H$ or $V_L$ domain; and the dAb fragment has a $V_H$ domain, a $V_L$ domain, or an antigen-binding fragment of a $V_H$ or $V_L$ domain (U.S. Pat. Nos. U.S. Pat. Nos. 6,846,634 and 6,696,245; U.S. Patent Application Publication Nos. US 2005/0202512, US 2004/0202995, US 2004/0038291, US 2004/0009507, and US 2003/0039958; Ward et al., 1989, Nature 341:544-546).

A single-chain antibody (scFv) is an antibody in which the $V_L$ and $V_H$ regions are connected by a linker (for example, a synthetic amino acid residue sequence) to form a continuous protein, wherein the linker is long enough to allow the protein chain to fold back to itself and to form a monovalent antigen-binding site (see, for example, Bird et al., 1988, Science 242:423-26; and Huston et al., 1988, Proc. Natl. Acad. Sci. USA 85:5879-83).

A diabody is a divalent antibody containing two polypeptide chains, each of which contains $V_H$ and $V_L$ domains connected by a linker which is so short that it does not allow pairing of the two domains on the same chain. Therefore, each domain is allowed to pair with a complementary domain on another polypeptide chain (see, for example, Holliger et al., 1993, Proc. Natl. Acad. Sci. USA 90:6444-48; and Poljak et al., 1994, Structure 2:1121-23). If a diabody has two identical polypeptide chains, the diabody resulting from the pairing of the two identical polypeptide chains will have the same antigen-binding site. Polypeptide chains with different sequences can be used to prepare diabodies with different antigen-binding sites. Similarly, triabodies and tetrabodies are antibodies that contain three and four polypeptide chains, respectively, and form three and four antigen-binding sites, respectively, which may be the same or different.

The method described in Kabat et al. Sequences of Proteins of Immunological Interest, 5th edition, US Dept. of Health and Human Services, PHS, NIH, NIH Publication No. 91-3242, 1991 can be used to identify the complementarity determining regions (CDRs) and framework regions (FRs) of a given antibody. One or more CDRs can be incorporated into a molecule either covalently or noncovalently to make it an antibody. The antibody can incorporate a larger polypeptide chain into the CDR(s). The CDR(s) can be covalently linked to another polypeptide chain, or incorporated thereto non-covalently. The CDRs allow antibodies to specifically bind to specific associated antigens.

Antibodies can have one or more binding sites. If there is more than one binding site, the binding site can be the same or different from another. For example, a natural human immunoglobulin usually has two identical binding sites, while a "bi-specific" or "bifunctional" antibody has two different binding sites.

The term "murine antibody" includes all antibodies having one or more variable and constant regions derived from mouse immunoglobulin sequences.

The term "humanized antibody" is an antibody made by transplanting the complementarity determining region sequences of mouse antibody molecules into the framework of human antibody variable regions.

The term "antigen-binding domain", "antigen-binding region", or "antigen-binding site" is the part of an antibody that contains amino acid residues (or other parts) that interact with an antigen and contributes to the specificity and affinity of the antibody for the antigen. For an antibody that specifically binds to the antigen thereof, this will include at least part of at least one of the CDR domains.

The term "epitope" is the portion of a molecule that binds to an antibody (for example, bound by an antibody). An epitope may contain a discontinuous part of a molecule (for example, in a polypeptide, the amino acid residues that are discontinuous in the primary sequence of the polypeptide are close enough to each other in the tertiary and quaternary structures of the polypeptide to be bound by an antibody).

The "percentage of identity" of two polynucleotide or two polypeptide sequences is determined using the GAP computer program's (GCG Wisconsin Package; a part of version 10.3 (Accelrys, San Diego, CA)) default parameter comparison sequence.

The terms "polynucleotide", "oligonucleotide" and "nucleic acid" can be used interchangeably throughout the full text and include DNA molecules (e.g., cDNA or genomic DNA), RNA molecules (e.g., mRNA), DNA or RNA analogs and hybrids thereof produced using nucleotide analogs (e.g., peptide nucleic acids and non-natural nucleotide analogs). Nucleic acid molecules can be single- or double-stranded. In one embodiment, the nucleic acid molecules herein comprise a continuous open reading frame encoding the antibody or fragments, derivatives, mutant proteins, or variants thereof provided herein.

If the sequences of two single-stranded polynucleotides can be arranged in reverse and parallel, the two single-stranded polynucleotides are "complementary" to each other, so that each nucleotide in one polynucleotide is opposite to the complementary nucleotide in another polynucleotide, no gaps are introduced, and no unpaired nucleotides are found at the 5' or 3' ends of each sequence. If two polynucleotides can hybridize to each other under moderately stringent conditions, one polynucleotide is "complementary" to another polynucleotide. Thus, one polynucleotide may be complementary to another polynucleotide, but not the complementary sequence thereof.

The term "vector" is a nucleic acid that can be used to introduce another nucleic acid connected thereto into a cell. One type of vector is a "plasmid", which refers to a linear or circular double-stranded DNA molecule to which additional nucleic acid segments can be connected. Another type of vector is a viral vector (e.g., replication-defective retroviruses, adenoviruses, and adenovirus-associated viruses) in which additional DNA segments can be introduced into the viral genome. Some vectors can replicate autonomously in a host cell into which they are introduced (e.g., bacterial vectors containing a bacterial origin of replication and episomal mammalian vectors). Other vectors (e.g., non-episomal mammalian vectors) are integrated into the host cell genome when introduced into the host cell and thus replicate with the host genome.

An "expression vector" is a type of vector that can direct the expression of a selected polynucleotide.

If a regulatory sequence affects the expression of a nucleotide sequence (for example, expression level, time, or site), then the nucleotide sequence is "operably linked" to the regulatory sequence. The "regulatory sequence" is a nucleic acid that affects the expression (for example, expression level, time, or site) of a nucleic acid to which it is operably linked. Regulatory genes, for example, act directly on regulated nucleic acids or through one or more other molecules (e.g., polynucleotides that bind to regulatory sequences and/or nucleic acids). Examples of regulatory sequences include promoters, enhancers, and other expression control elements (e.g., polyadenylation signals). Further examples of regulatory sequences can be described in, for example, Goeddel, 1990, Gene Expression Technology: Methods in Enzymology, Volume 185, Academic Press, San Diego, CA; and Baron et al., 1995, Nucleic Acids Res. 23:3605-06.

The term "host cell" refers to a cell used to express a nucleic acid such as the nucleic acid provided herein. The host cell may be prokaryotes, such as *E. coli*, or it can be eukaryotes, such as unicellular eukaryotes (e.g., yeast or other fungi), plant cells (e.g., tobacco or tomato plant cells), animal cells (e.g., human cells, monkey cells, hamster cells, rat cells, mouse cells or insect cells) or hybridomas. Usually, the host cell is a culture cell that can be transformed or transfected with a polypeptide-encoding nucleic acid, which can then be expressed in the host cell. The phrase "recombinant host cell" can be used to describe a host cell transformed or transfected with a nucleic acid intended to be expressed. The host cell may also be a cell that contains the nucleic acid but does not express it at the desired level, unless regulatory sequences are introduced into the host cell so that it is operably linked to the nucleic acid. It should be understood that the term "host cell" refers to not only the specific subject cell but also to the progeny or possible progeny of that cell. Due to certain modifications occurring in subsequent generations, caused by such as mutations or environmental influences, the progeny may in fact be different from the parent cell but still fall within the scope of the terminology used herein.

Endothelin Receptor

The endothelin receptor (ETA) belongs to the A subfamily of the 7-transmembrane receptor family, which is coupled to one or more intracellular signaling pathways through a heterotrimeric guanine nucleotide binding protein (G protein) (Jelinek et al., 1993, Science 259:1614-1616, and Segre et al., 1993, Trends Endocrinol. Metab. 4:309-314). As used herein, "endothelin receptor" and "ETA" or "$ET_AR$" can be used interchangeably.

In one embodiment, the antibody described herein can be selected to bind to membrane-bound endothelin receptors expressed on cells, and inhibit or block endothelin signaling through the endothelin receptors. In one embodiment, the antibody described herein specifically binds to human endothelin receptors. In a further embodiment, the antibody that binds to human endothelin receptors can also bind to endothelin receptors of other species, such as rats. The following examples provide for the generation of murine antibodies that bind to human membrane-bound endothelin receptors, and in a further embodiment the murine antibodies also bind to endothelin receptors of other species.

The polynucleotide and polypeptide sequences of endothelin receptors of several species are known. SEQ ID NO: 1-SEQ ID NO: 6 show the sequences of human, monkey and rat. The sequence data comes from the GenBank database of the US National Center for Biotechnology Information.

The sequence information of endothelin receptor A (ETA) is as follows:

human (*Homo sapiens*) polynucleotide (SEQ ID NO: 1); accession number: S63938;

human (*Homo sapiens*) amino acid (SEQ ID NO: 2); accession number: AAB20278;

monkey (Cynomolgus monkey) polynucleotide (SEQ ID NO: 3); accession number: JV635771;

monkey (Cynomolgus monkey) amino acid (SEQ ID NO: 4); accession number: AFJ71111;

rat (*Rattus norvegicus*) polynucleotide (SEQ ID NO: 5); accession number: M60786;

rat (*Rattus norvegicus*) amino acid (SEQ ID NO: 6); accession number: AAA41114.

Endothelin Receptor a (ETA) Antibody

In one embodiment, the ETA antibody described herein comprises one, two, three, four, five or six amino acid sequences, wherein each amino acid sequence is independently selected from the amino acid sequences listed below:

a. light chain CDR1 amino acid sequences: SEQ ID NO: 8, SEQ ID NO: 10, SEQ ID NO: 12, SEQ ID NO: 14, SEQ ID NO: 16, SEQ ID NO: 18, SEQ ID NO: 20, SEQ ID NO: 22, SEQ ID NO: 24, SEQ ID NO: 26, SEQ ID NO: 28, and SEQ ID NO: 30;

b. light chain CDR2 amino acid sequences: SEQ ID NO: 32, SEQ ID NO: 34, SEQ ID NO: 36, SEQ ID NO: 38, SEQ ID NO: 40, SEQ ID NO: 42, SEQ ID NO: 44, SEQ ID NO: 46, and SEQ ID NO: 48;

c. light chain CDR3 amino acid sequences: SEQ ID NO: 50, SEQ ID NO: 52, SEQ ID NO: 54, SEQ ID NO: 56, SEQ ID NO: 58, SEQ ID NO: 60, SEQ ID NO: 62, SEQ ID NO: 64, SEQ ID NO: 66, SEQ ID NO: 68, and SEQ ID NO: 205;

d. heavy chain CDR1 amino acid sequences: SEQ ID NO: 70, SEQ ID NO: 72, SEQ ID NO: 74, SEQ ID NO: 76, SEQ ID NO: 78, SEQ ID NO: 80, SEQ ID NO: 82, SEQ ID NO: 84, SEQ ID NO: 86, SEQ ID NO: 88, and SEQ ID NO: 90;

e. heavy chain CDR2 amino acid sequences: SEQ ID NO: 92, SEQ ID NO: 94, SEQ ID NO: 96, SEQ ID NO: 98, SEQ ID NO: 100, SEQ ID NO: 102, SEQ ID NO: 104, SEQ ID NO: 106, SEQ ID NO: 108, SEQ ID NO: 110, SEQ ID NO: 112, and SEQ ID NO: 114; and f. heavy chain CDR3 amino acid sequences: SEQ ID NO: 116, SEQ ID NO: 118, SEQ ID NO: 120, SEQ ID NO: 122, SEQ ID NO: 124, SEQ ID NO: 126, SEQ ID NO:

128, SEQ ID NO: 130, SEQ ID NO: 132, SEQ ID NO: 134, and SEQ ID NO: 136.

Table 1 lists the light chain CDR amino acid sequences of the ETA antibody described herein and the corresponding polynucleotide coding sequences thereof. Table 2 lists the heavy chain CDR amino acid sequences of the ETA antibody described herein and the corresponding polynucleotide coding sequences thereof.

TABLE 1

Light chain CDR amino acid sequences and the polynucleotide coding sequences thereof

| | CDR1 | CDR2 | CDR3 |
|---|---|---|---|
| A-1 nucleotide | agggccagtcagaacattggcaca agcatacac (SEQ ID NO: 7) | tatgcttctaagtctatatct (SEQ ID NO: 31) | caacatagttatagcttcccgtgga cg (SEQ ID NO: 49) |
| A-1 amino acid | RASQNIGTSIH (SEQ ID NO: 8) | YASKSIS (SEQ ID NO: 32) | QHSYSFPWT (SEQ ID NO: 50) or QHSYSWPWT SEQ ID NO: 205) |
| A-2 nucleotide | cgagcaagtgaaaatatttacagtta tttagca (SEQ ID NO: 9) | aatgcaaaaaccttagcagaa (SEQ ID NO: 33) | cagcatcattatggtattccgttcac g (SEQ ID NO: 51) |
| A-2 amino acid | RASENIYSYLA (SEQ ID NO: 10) | NAKTLAE (SEQ ID NO: 34) | QHHYGIPFT (SEQ ID NO: 52) |
| A-3 nucleotide | cagagcctctttgatattgatggaaa gacatatttgaat (SEQ ID NO: 11) | ctggtgtctgaattggactct (SEQ ID NO: 35) | tggcaaggtacacattttccgctca cg (SEQ ID NO: 53) |
| A-3 amino acid | QSLFDIDGKTYLN (SEQ ID NO: 12) | LVSELDS (SEQ ID NO: 36) | WQGTHFPLT (SEQ ID NO: 54) |
| A-4 nucleotide | cgggcaagtcaggacattggtggta gcttaaac (SEQ ID NO: 13) | gccacatccagcttagattct (SEQ ID NO: 37) | ctacaatatgctagttctccgtatac g (SEQ ID NO: 55) |
| A-4 amino acid | RASQDIGGSLN (SEQ ID NO: 14) | ATSSLDS (SEQ ID NO: 38) | LQYASSPYT (SEQ ID NO: 56) |
| A-5 nucleotide | agggccagccagactattagcgact tcttacac (SEQ ID NO: 15) | tatgcttcccaatccatctct (SEQ ID NO: 39) | caaagtggtaacacctttccgtgga cg (SEQ ID NO: 57) |
| A-5 amino acid | RASQTISDFLH (SEQ ID NO: 16) | YASQSIS (SEQ ID NO: 40) | QSGNTFPWT (SEQ ID NO: 58) |
| A-6 nucleotide | agggcaagtgaggacat acacactcaattagcc (SEQ ID NO: 17) | ggtgcagccagtttgaaaagt (SEQ ID NO: 41) | caacagtataggagtattccgtgga cg (SEQ ID NO: 59) |
| A-6 amino acid | RASEDIHTQLA (SEQ ID NO: 18) | GAASLKS (SEQ ID NO: 42) | QQYRSIPWT (SEQ ID NO: 60) |
| A-7 nucleotide | agatctagtcagtacattgttcatagt actggaaccacctatttagaa (SEQ ID NO: 19) | aaagtttccaaccgattttct (SEQ ID NO: 43) | tttcaaggttcacattttccattcacg (SEQ ID NO: 61) |
| A-7 amino acid | RSSQYIVHSTGT TYLE (SEQ ID NO: 20) | KVSNRFS (SEQ ID NO: 44) | FQGSHFPFT (SEQ ID NO: 62) |
| A-8 nucleotide | agatctagtcattaccttgttcatgata acggaaacacctatgttgaa (SEQ ID NO: 21) | aaggtttccaaccgattttct (SEQ ID NO: 43) | tttcaaggttcacatttcccattcacg (SEQ ID NO: 63) |
| A-8 amino acid | RSSHYLVHDNG NTYVE (SEQ ID NO: 22) | KVSNRFS (SEQ ID NO: 44) | FQGSHFPFT (SEQ ID NO: 62) |
| A-9 nucleotide | agatctagtcagaacattgtccatag tactggaaacacctatttagaa (SEQ ID NO: 23) | aaagtttccaaccgattttct (SEQ ID NO: 43) | tttcaaggttcacattttccattcacg (SEQ ID NO: 61) |
| A-9 amino acid | RSSQNIVHSTGN TYLE (SEQ ID NO: 24) | KVSNRFS (SEQ ID NO: 44) | FQGSHFPFT (SEQ ID NO: 62) |
| A-10 nucleotide | agtgtcagctcaagtgtaagttacat acac (SEQ ID NO: 25) | gacacatccaaactggcttct (SEQ ID NO: 45) | caccagtggagtactaacccaccc acg (SEQ ID NO: 63) |

TABLE 1-continued

Light chain CDR amino acid sequences and the polynucleotide coding sequences thereof

| | CDR1 | CDR2 | CDR3 |
|---|---|---|---|
| A-10 amino acid | SVSSSVSYIH (SEQ ID NO: 26) | DTSKLAS (SEQ ID NO: 46) | HQWSTNPPT (SEQ ID NO: 64) |
| A-11 nucleotide | agtgccagctcaagtgtaagttacat gtgc (SEQ ID NO: 27) | gacacatccaaactggcttct (SEQ ID NO: 45) | cagcagtggagtagtaacccaccc acg (SEQ ID NO: 65) |
| A-11 amino acid | SASSSVSYMC (SEQ ID NO: 28) | DTSKLAS (SEQ ID NO: 46) | QQWSSNPPT (SEQ ID NO: 66) |
| A-12 nucleotide | cagggcattaacaattat (SEQ ID NO: 29) | tatacatcaactttacagtca (SEQ ID NO: 47) | cagcagtttagtaaacttcggaca (SEQ ID NO: 67) |
| A-12 amino acid | QGINNY (SEQ ID NO: 30) | YTSTLQS (SEQ ID NO: 48) | QQFSKLRT (SEQ ID NO: 68) |

TABLE 2

Heavy chain CDR amino acid sequences and the polynucleotide coding sequences thereof

| | CDR1 | CDR2 | CDR3 |
|---|---|---|---|
| A-1 nucleotide | gggttctcactgaccactt ctggcttgggtgttgcc (SEQ ID NO: 69) | cacatttggtcggatggtgacacgc gctattacccagccctgaagaac (SEQ ID NO: 91) | atgaaggatgatagtattactagaca ac (SEQ ID NO: 115) |
| A-1 amino acid | GFSLTTSGLGVA (SEQ ID NO: 70) | HIWSDGDTRYYPALKN (SEQ ID NO: 92) | MKDDSLYFDN (SEQ ID NO: 116) |
| A-2 nucleotide | ggctacacctttactagctactgga tacac (SEQ ID NO: 71) | tacattaatcctgacactgattatagt gagtacaat (SEQ ID NO: 93) | gcaagtgctggttattatttttttgactt c (SEQ ID NO: 117) |
| A-2 amino acid | GYTFTSYWIH (SEQ ID NO: 72) | YINPDTDYSEYN (SEQ ID NO: 94) | ASAGYYFFDF (SEQ ID NO: 118) |
| A-3 nucleotide | ggcctcaacattaaagacatctat attcac (SEQ ID NO: 73) | aggattgatcctgcgaacggtaaga ctgcatatgac (SEQ ID NO: 95) | ggtagggggcccac (SEQ ID NO: 119) |
| A-3 amino acid | GLNIKDIYIH (SEQ ID NO: 74) | RIDPANGKTAYD (SEQ ID NO: 96) | GRGAH (SEQ ID NO: 120) |
| A-4 nucleotide | ggttactcattcaccaactactgga tacac (SEQ ID NO: 75) | atgattgatccttccgatgctgaaact gggttaaat (SEQ ID NO: 97) | gcaagaattggcgattactataatatg gactac (SEQ ID NO: 121) |
| A-4 amino acid | GYSFTNYWIH (SEQ ID NO: 76) | MIDPSDAETGLN (SEQ ID NO: 98) | ARIGDYYNMDY (SEQ ID NO: 122) |
| A-5 nucleotide | ggattcactttcagtgactatccca tgtct (SEQ ID NO: 77) | gttagtgatggtggtggttccacc (SEQ ID NO: 99) | acaagacatgcttcctactatagctac gaccattctatggactac (SEQ ID NO: 123) |
| A-5 amino acid | GFTFSDYPMS (SEQ ID NO: 78) | VSDGGGST (SEQ ID NO: 100) | TRHASYYSYDHSMDY (SEQ ID NO: 124) |
| A-6 nucleotide | ggattcactttcagtagctttggcat gtct (SEQ ID NO: 79) | attagtagtgctggtagtttcac c (SEQ ID NO: 101) | gcaagacgggggtacgacgttgggt gctttgaccac (SEQ ID NO: 125) |
| A-6 amino acid | GFTFSSFGMS (SEQ ID NO: 80) | ISSAGSFT (SEQ ID NO: 102) | ARRGYDVGCFDH (SEQ ID NO: 126) |
| A-7 nucleotide | ggattcactttcagtacctatggca tgtct (SEQ ID NO: 81) | accattaatactaatggtggtaccac ctattatcgagacagtgtgaagggc (SEQ ID NO: 103) | gcaagagactacggggctatggact ac (SEQ ID NO: 127) |

TABLE 2-continued

Heavy chain CDR amino acid sequences and the polynucleotide coding sequences thereof

| | CDR1 | CDR2 | CDR3 |
|---|---|---|---|
| A-7 amino acid | GFTFSTYGMS (SEQ ID NO: 82) | TINTNGGTTYYR DSVKG (SEQ ID NO: 104) | ARDYGAMDY (SEQ ID NO: 128) |
| A-8 nucleotide | ggattcactttcagtacctatggca tgtct (SEQ ID NO: 81) | accataaatactaatggtggtaacac ctattattcagacaatgtgaagggc (SEQ ID NO: 105) | gcaagagactacggggctatggact ac (SEQ ID NO: 127) |
| A-8 amino acid | GFTFSTYGMS (SEQ ID NO: 82) | TINTNGGNTYYS DNVKG (SEQ ID NO: 106) | ARDYGAMDY (SEQ ID NO: 128) |
| A-9 nucleotide | ggattcactttcagtagttatggcat gtct (SEQ ID NO: 83) | accattagtactaatggtgccaccgc caattatccagacagtgtgaagggc (SEQ ID NO: 107) | gcaactgaaaagggagctatgggct ac (SEQ ID NO: 129) |
| A-9 amino acid | GFTFSSYGMS (SEQ ID NO: 84) | TISTNGATANYP DSVKG (SEQ ID NO: 108) | ATEKGAMGY (SEQ ID NO: 130) |
| A-10 nucleotide | gggttttcactgaccacttctggtat gggtgtaggc (SEQ ID NO: 85) | cacatttggtgggatgatgataagta ctataatccatccctgaagagc (SEQ ID NO: 109) | gctcgaagaactgagactatgattac gacagtgctatattactatgctatgga ctac (SEQ ID NO: 131) |
| A-10 amino acid | GFSLTTSGMGVG (SEQ ID NO: 86) | HIWWDDDKYYNPSLK S (SEQ ID NO: 110) | ARRTETMITTVLYYYA MDY (SEQ ID NO: 132) |
| A-11 nucleotide | ggattttcactgagcacttctggttt gggtgtaggc (SEQ ID NO: 87) | cacatttggtgggatgatgataagta ctataatccatcccttaagaga (SEQ ID NO: 111) | gctcgaaggagggaagttaacttcg gtattaactattactattctatggactac (SEQ ID NO: 133) |
| A-11 amino acid | GFSLSTSGLGVG (SEQ ID NO: 88) | HIWWDDDKYYNPSLK R (SEQ ID NO: 112) | ARRREVNFGINYYYSM DY (SEQ ID NO: 134) |
| A-12 nucleotide | ggattcaccttcagtgattattac (SEQ ID NO: 89) | attagaaatcgggctaatggttacac aaca (SEQ ID NO: 113) | gtaagagattcctatcactacgggta cttcgatgtc (SEQ ID NO: 135) |
| A-12 amino acid | GFTFSDYY (SEQ ID NO: 90) | IRNRANGYTT (SEQ ID NO: 114) | VRDSYHYGYFDV (SEQ ID NO: 136) |

In one embodiment, the antibody described herein comprises a sequence different from one of the CDR amino acid sequences listed in Tables 1 and 2 by five, four, three, two or one single amino acid addition, substitution, and/or deletion. In another embodiment, the antibody described herein comprises a sequence different from one of the CDR amino acid sequences listed in Tables 1 and 2 by four, three, two or one single amino acid addition, substitution, and/or deletion. In another embodiment, the antibody described herein comprises a sequence different from one of the CDR amino acid sequences listed in Tables 1 and 2 by three, two or one single amino acid addition, substitution, and/or deletion. In another embodiment, the antibody described herein comprises a sequence different from one of the CDR amino acid sequences listed in Tables 1 and 2 by two or one single amino acid addition, substitution, and/or deletion. In another embodiment, the antibody described herein comprises a sequence different from one of the CDR amino acid sequences listed in Tables 1 and 2 by one single amino acid addition, substitution, and/or deletion.

In another embodiment, the ETA antibody (ETA-1 antibody) described herein comprises one or two amino acid sequences, wherein each amino acid sequence is independently selected from the amino acid sequences listed below:

a. light chain CDR1 amino acid sequences: SEQ ID NO: 8, SEQ ID NO: 10, SEQ ID NO: 12, SEQ ID NO: 14, SEQ ID NO: 16, SEQ ID NO: 18, SEQ ID NO: 20, SEQ ID NO: 22, SEQ ID NO: 24, SEQ ID NO: 26, SEQ ID NO: 28, and SEQ ID NO: 30; and
b. heavy chain CDR1 amino acid sequences: SEQ ID NO: 70, SEQ ID NO: 72, SEQ ID NO: 74, SEQ ID NO: 76, SEQ ID NO: 78, SEQ ID NO: 80, SEQ ID NO: 82, SEQ ID NO: 84, SEQ ID NO: 86, SEQ ID NO: 88, and SEQ ID NO: 90.

In one aspect, the ETA-1 antibody further comprises one or two amino acid sequences, wherein each amino acid sequence is independently selected from the amino acid sequences listed below:

a. light chain CDR2 amino acid sequences: SEQ ID NO: 32, SEQ ID NO: 34, SEQ ID NO: 36, SEQ ID NO: 38, SEQ ID NO: 40, SEQ ID NO: 42, SEQ ID NO: 44, SEQ ID NO: 46, and SEQ ID NO: 48; and
b. heavy chain CDR2 amino acid sequences: SEQ ID NO: 92, SEQ ID NO: 94, SEQ ID NO: 96, SEQ ID NO: 98, SEQ ID NO: 100, SEQ ID NO: 102, SEQ ID NO: 104, SEQ ID NO: 106, SEQ ID NO: 108, SEQ ID NO: 110, SEQ ID NO: 112, and SEQ ID NO: 114.

In another aspect, the ETA-1 antibody further comprises one or two amino acid sequences, wherein each amino acid sequence is independently selected from the amino acid sequences listed below:

a. light chain CDR3 amino acid sequences: SEQ ID NO: 50, SEQ ID NO: 52, SEQ ID NO: 54, SEQ ID NO: 56, SEQ ID NO: 58, SEQ ID NO: 60, SEQ ID NO: 62, SEQ ID NO: 64, SEQ ID NO: 66, SEQ ID NO: 68, and SEQ ID NO: 205; and b. heavy chain CDR3 amino acid sequences: SEQ ID NO: 116, SEQ ID NO: 118, SEQ ID NO: 120, SEQ ID NO: 122, SEQ ID NO: 124, SEQ ID NO: 126, SEQ ID NO: 128, SEQ ID NO: 130, SEQ ID NO: 132, SEQ ID NO: 134, and SEQ ID NO: 136.

In another embodiment, the ETA antibody (ETA-2 antibody) described herein comprises one or two amino acid sequences, wherein each amino acid sequence is independently selected from the amino acid sequences listed below:

a. light chain CDR2 amino acid sequences: SEQ ID NO: 32, SEQ ID NO: 34, SEQ ID NO: 36, SEQ ID NO: 38, SEQ ID NO: 40, SEQ ID NO: 42, SEQ ID NO: 44, SEQ ID NO: 46, and SEQ ID NO: 48; and b. heavy chain CDR2 amino acid sequences: SEQ ID NO: 92, SEQ ID NO: 94, SEQ ID NO: 96, SEQ ID NO: 98, SEQ ID NO: 100, SEQ ID NO: 102, SEQ ID NO: 104, SEQ ID NO: 106, SEQ ID NO: 108, SEQ ID NO: 110, SEQ ID NO: 112, and SEQ ID NO: 114.

In one aspect, the ETA-2 antibody further comprises one or two amino acid sequences, wherein each amino acid sequence is independently selected from the amino acid sequences listed below:

a. light chain CDR1 amino acid sequences: SEQ ID NO: 8, SEQ ID NO: 10, SEQ ID NO: 12, SEQ ID NO: 14, SEQ ID NO: 16, SEQ ID NO: 18, SEQ ID NO: 20, SEQ ID NO: 22, SEQ ID NO: 24, SEQ ID NO: 26, SEQ ID NO: 28, and SEQ ID NO: 30; and b. heavy chain CDR1 amino acid sequences: SEQ ID NO: 70, SEQ ID NO: 72, SEQ ID NO: 74, SEQ ID NO: 76, SEQ ID NO: 78, SEQ ID NO: 80, SEQ ID NO: 82, SEQ ID NO: 84, SEQ ID NO: 86, SEQ ID NO: 88, and SEQ ID NO: 90.

In another aspect, the ETA-2 antibody further comprises one or two amino acid sequences, wherein each amino acid sequence is independently selected from the amino acid sequences listed below:

a. light chain CDR3 amino acid sequences: SEQ ID NO: 50, SEQ ID NO: 52, SEQ ID NO: 54, SEQ ID NO: 56, SEQ ID NO: 58, SEQ ID NO: 60, SEQ ID NO: 62, SEQ ID NO: 64, SEQ ID NO: 66, SEQ ID NO: 68, and SEQ ID NO: 205; and b. heavy chain CDR3 amino acid sequences: SEQ ID NO: 116, SEQ ID NO: 118, SEQ ID NO: 120, SEQ ID NO: 122, SEQ ID NO: 124, SEQ ID NO: 126, SEQ ID NO: 128, SEQ ID NO: 130, SEQ ID NO: 132, SEQ ID NO: 134, and SEQ ID NO: 136.

In another embodiment, the ETA antibody (ETA-3 antibody) described herein comprises one or two amino acid sequences, wherein each amino acid sequence is independently selected from the amino acid sequences listed below:

a. light chain CDR3 amino acid sequences: SEQ ID NO: 50, SEQ ID NO: 52, SEQ ID NO: 54, SEQ ID NO: 56, SEQ ID NO: 58, SEQ ID NO: 60, SEQ ID NO: 62, SEQ ID NO: 64, SEQ ID NO: 66, SEQ ID NO: 68, and SEQ ID NO: 205; and b. heavy chain CDR3 amino acid sequences: SEQ ID NO: 116, SEQ ID NO: 118, SEQ ID NO: 120, SEQ ID NO: 122, SEQ ID NO: 124, SEQ ID NO: 126, SEQ ID NO: 128, SEQ ID NO: 130, SEQ ID NO: 132, SEQ ID NO: 134, and SEQ ID NO: 136.

In one aspect, the ETA-3 antibody further comprises one or two amino acid sequences, wherein each amino acid sequence is independently selected from the amino acid sequences listed below:

a. light chain CDR1 amino acid sequences: SEQ ID NO: 8, SEQ ID NO: 10, SEQ ID NO: 12, SEQ ID NO: 14, SEQ ID NO: 16, SEQ ID NO: 18, SEQ ID NO: 20, SEQ ID NO: 22, SEQ ID NO: 24, SEQ ID NO: 26, SEQ ID NO: 28, and SEQ ID NO: 30; and b. heavy chain CDR1 amino acid sequences: SEQ ID NO: 70, SEQ ID NO: 72, SEQ ID NO: 74, SEQ ID NO: 76, SEQ ID NO: 78, SEQ ID NO: 80, SEQ ID NO: 82, SEQ ID NO: 84, SEQ ID NO: 86, SEQ ID NO: 88, and SEQ ID NO: 90.

In another aspect, the ETA-3 antibody further comprises one or two amino acid sequences, wherein each amino acid sequence is independently selected from the amino acid sequences listed below:

a. light chain CDR2 amino acid sequences: SEQ ID NO: 32, SEQ ID NO: 34, SEQ ID NO: 36, SEQ ID NO: 38, SEQ ID NO: 40, SEQ ID NO: 42, SEQ ID NO: 44, SEQ ID NO: 46, and SEQ ID NO: 48; and b. heavy chain CDR2 amino acid sequences: SEQ ID NO: 92, SEQ ID NO: 94, SEQ ID NO: 96, SEQ ID NO: 98, SEQ ID NO: 100, SEQ ID NO: 102, SEQ ID NO: 104, SEQ ID NO: 106, SEQ ID NO: 108, SEQ ID NO: 110, SEQ ID NO: 112, and SEQ ID NO: 114.

In one embodiment, the ETA antibody described herein comprises: a. a light chain CDR1 amino acid sequence independently selected from the list below: SEQ ID NO: 8, SEQ ID NO: 10, SEQ ID NO: 12, SEQ ID NO: 14, SEQ ID NO: 16, SEQ ID NO: 18, SEQ ID NO: 20, SEQ ID NO: 22, SEQ ID NO: 24, SEQ ID NO: 26, SEQ ID NO: 28, and SEQ ID NO: 30;

b. a light chain CDR2 amino acid sequence independently selected from the list below: SEQ ID NO: 32, SEQ ID NO: 34, SEQ ID NO: 36, SEQ ID NO: 38, SEQ ID NO: 40, SEQ ID NO: 42, SEQ ID NO: 44, SEQ ID NO: 46, and SEQ ID NO: 48;

c. a light chain CDR3 amino acid sequence independently selected from the list below: SEQ ID NO: 50, SEQ ID NO: 52, SEQ ID NO: 54, SEQ ID NO: 56, SEQ ID NO: 58, SEQ ID NO: 60, SEQ ID NO: 62, SEQ ID NO: 64, SEQ ID NO: 66, and SEQ ID NO: 68;

d. a heavy chain CDR1 amino acid sequence independently selected from the list below: SEQ ID NO: 70, SEQ ID NO: 72, SEQ ID NO: 74, SEQ ID NO: 76, SEQ ID NO: 78, SEQ ID NO: 80, SEQ ID NO: 82, SEQ ID NO: 84, SEQ ID NO: 86, SEQ ID NO: 88, and SEQ ID NO: 90;

e. a heavy chain CDR2 amino acid sequence independently selected from the list below: SEQ ID NO: 92, SEQ ID NO: 94, SEQ ID NO: 96, SEQ ID NO: 98, SEQ ID NO: 100, SEQ ID NO: 102, SEQ ID NO: 104, SEQ ID NO: 106, SEQ ID NO: 108, SEQ ID NO: 110, SEQ ID NO: 112, and SEQ ID NO: 114; and f. a heavy chain CDR3 amino acid sequence independently selected from the list below: SEQ ID NO: 116, SEQ ID NO: 118, SEQ ID NO: 120, SEQ ID NO: 122, SEQ ID NO: 124, SEQ ID NO: 126, SEQ ID NO: 128, SEQ ID NO: 130, SEQ ID NO: 132, SEQ ID NO: 134, and SEQ ID NO: 136.

In one embodiment, the ETA antibody described herein comprises a light chain CDR3 amino acid sequence independently selected from the list below: SEQ ID NO: 50, SEQ ID NO: 52, SEQ ID NO: 54, SEQ ID NO: 56, SEQ ID NO: 58, SEQ ID NO: 60, SEQ ID NO: 62, SEQ ID NO: 64, SEQ ID NO: 66, SEQ ID NO: 68, and SEQ ID NO: 205. In another embodiment, the ETA antibody described herein comprises a heavy chain CDR3 amino acid sequence independently selected from the list below: SEQ ID NO: 116, SEQ ID NO: 118, SEQ ID NO: 120, SEQ ID NO: 122, SEQ ID NO: 124, SEQ ID NO: 126, SEQ ID NO: 128, SEQ ID NO: 130, SEQ ID NO: 132, SEQ ID NO: 134, and SEQ ID NO: 136.

In another embodiment, the ETA antibody described herein comprises a combination of light chain and heavy chain CDR3 amino acid sequences independently selected from the list below: SEQ ID NO: 50 and SEQ ID NO: 116, SEQ ID NO:50 and SEQ ID NO: 205, SEQ ID NO: 62 and SEQ ID NO: 128, SEQ ID NO: 62 and SEQ ID NO: 130, SEQ ID NO: 64 and SEQ ID NO: 132, SEQ ID NO: 66 And SEQ ID NO: 134, and SEQ ID NO: 68 and SEQ ID NO: 136.

In one embodiment, the ETA antibody described herein comprises:

(a) light chain CDR1 amino acid sequence: SEQ ID NO: 8;
light chain CDR2 amino acid sequence: SEQ ID NO: 32;
light chain CDR3 amino acid sequence: SEQ ID NO: 50 or SEQ ID NO: 205;
heavy chain CDR1 amino acid sequence: SEQ ID NO: 70;
heavy chain CDR2 amino acid sequence: SEQ ID NO: 92; and
heavy chain CDR3 amino acid sequence: SEQ ID NO: 116;

(b) light chain CDR1 amino acid sequence: SEQ ID NO: 10;
light chain CDR2 amino acid sequence: SEQ ID NO: 34;
light chain CDR3 amino acid sequence: SEQ ID NO: 52;
heavy chain CDR1 amino acid sequence: SEQ ID NO: 72;
heavy chain CDR2 amino acid sequence: SEQ ID NO: 94; and
heavy chain CDR3 amino acid sequence: SEQ ID NO: 118;

(c) light chain CDR1 amino acid sequence: SEQ ID NO: 12;
light chain CDR2 amino acid sequence: SEQ ID NO: 36;
light chain CDR3 amino acid sequence: SEQ ID NO: 54;
heavy chain CDR1 amino acid sequence: SEQ ID NO: 74;
heavy chain CDR2 amino acid sequence: SEQ ID NO: 96; and
heavy chain CDR3 amino acid sequence: SEQ ID NO: 120;

(d) light chain CDR1 amino acid sequence: SEQ ID NO: 14;
light chain CDR2 amino acid sequence: SEQ ID NO: 38;
light chain CDR3 amino acid sequence: SEQ ID NO: 56;
heavy chain CDR1 amino acid sequence: SEQ ID NO: 76;
heavy chain CDR2 amino acid sequence: SEQ ID NO: 98; and
heavy chain CDR3 amino acid sequence: SEQ ID NO: 122;

(e) light chain CDR1 amino acid sequence: SEQ ID NO: 16;
light chain CDR2 amino acid sequence: SEQ ID NO: 40;
light chain CDR3 amino acid sequence: SEQ ID NO: 58;
heavy chain CDR1 amino acid sequence: SEQ ID NO: 78;
heavy chain CDR2 amino acid sequence: SEQ ID NO: 100; and
heavy chain CDR3 amino acid sequence: SEQ ID NO: 124;

(f) light chain CDR1 amino acid sequence: SEQ ID NO: 18;
light chain CDR2 amino acid sequence: SEQ ID NO: 42;
light chain CDR3 amino acid sequence: SEQ ID NO: 60;
heavy chain CDR1 amino acid sequence: SEQ ID NO: 80
heavy chain CDR2 amino acid sequence: SEQ ID NO: 102; and
heavy chain CDR3 amino acid sequence: SEQ ID NO: 126, (g) light chain CDR1 amino acid sequence: SEQ ID NO: 20 or SEQ ID NO: 22;
light chain CDR2 amino acid sequence: SEQ ID NO: 44;
light chain CDR3 amino acid sequence: SEQ ID NO: 62;
heavy chain CDR1 amino acid sequence: SEQ ID NO: 82;
heavy chain CDR2 amino acid sequence: SEQ ID NO: 104 or 106; and
heavy chain CDR3 amino acid sequence: SEQ ID NO: 128;

(h) light chain CDR1 amino acid sequence: SEQ ID NO: 24;
light chain CDR2 amino acid sequence: SEQ ID NO: 44;
light chain CDR3 amino acid sequence: SEQ ID NO: 62;
heavy chain CDR1 amino acid sequence: SEQ ID NO: 84;
heavy chain CDR2 amino acid sequence: SEQ ID NO: 108; and
heavy chain CDR3 amino acid sequence: SEQ ID NO: 130;

(i) light chain CDR1 amino acid sequence: SEQ ID NO: 26;
light chain CDR2 amino acid sequence: SEQ ID NO: 46;
light chain CDR3 amino acid sequence: SEQ ID NO: 64;
heavy chain CDR1 amino acid sequence: SEQ ID NO: 86;
heavy chain CDR2 amino acid sequence: SEQ ID NO: 110; and
heavy chain CDR3 amino acid sequence: SEQ ID NO: 132;

(j) light chain CDR1 amino acid sequence: SEQ ID NO: 28;
light chain CDR2 amino acid sequence: SEQ ID NO: 46;
light chain CDR3 amino acid sequence: SEQ ID NO: 66;
heavy chain CDR1 amino acid sequence: SEQ ID NO: 88;
heavy chain CDR2 amino acid sequence: SEQ ID NO: 112; and
heavy chain CDR3 amino acid sequence: SEQ ID NO: 134; or (k) light chain CDR1 amino acid sequence: SEQ ID NO: 30;
light chain CDR2 amino acid sequence: SEQ ID NO: 48;
light chain CDR3 amino acid sequence: SEQ ID NO: 68;
heavy chain CDR1 amino acid sequence: SEQ ID NO: 90;
heavy chain CDR2 amino acid sequence: SEQ ID NO: 114; and
heavy chain CDR3 amino acid sequence: SEQ ID NO: 136.

In another embodiment, the ETA antibody described herein comprises:

light chain CDR1 amino acid sequence: SEQ ID NO: 28;
light chain CDR2 amino acid sequence: SEQ ID NO: 46;
light chain CDR3 amino acid sequence: SEQ ID NO: 66;
heavy chain CDR1 amino acid sequence: SEQ ID NO: 88;
heavy chain CDR2 amino acid sequence: SEQ ID NO: 112; and
heavy chain CDR3 amino acid sequence: SEQ ID NO: 134.

In another embodiment, the ETA antibody described herein comprises one or two amino acid sequences, wherein each amino acid sequence is independently selected from the amino acid sequences listed below:

a. light chain variable domain amino acid sequences: SEQ ID NO: 138 (L1), SEQ ID NO: 140 (L2), SEQ ID NO: 142 (L3), SEQ ID NO: 144 (L4), SEQ ID NO: 146 (L5), SEQ ID NO: 148 (L6), SEQ ID NO: 150 (L7), SEQ ID NO: 152 (L8), SEQ ID NO: 154 (L9), SEQ ID NO: 156 (L10), SEQ ID NO: 158 (L11), SEQ ID NO: 160 (L12), SEQ ID NO: 162 (L13), and SEQ ID NO: 164 (L14), and an amino acid sequence that is at least 80%, at least 85%, at least 90%, or at least 95% identical thereto; and b. heavy chain variable domain amino acid sequences: SEQ ID NO: 166 (H1), SEQ ID NO: 168 (H2), SEQ ID NO: 170 (H3), SEQ ID NO: 172 (H4), SEQ ID NO: 174 (H5), SEQ ID NO: 176 (H6), SEQ ID NO: 178 (H7), SEQ ID NO: 180 (H8), SEQ ID NO: 182 (H9), SEQ ID NO: 184 (H10), SEQ ID NO: 186 (H11), SEQ ID NO: 188 (H12), SEQ ID NO: 190 (H13), and SEQ ID NO: 192 (H14), and an amino acid sequence that is at least 80%, at least 85%, at least 90%, or at least 95% identical thereto.

In another embodiment, the polynucleotide coding sequence of the ETA antibody described herein comprises one or two polynucleotide sequences, wherein each polynucleotide sequence is independently selected from the polynucleotide sequences listed below:

a. light chain variable domain polynucleotide coding sequences: SEQ ID NO: 137, SEQ ID NO: 139, SEQ ID NO: 141, SEQ ID NO: 143, SEQ ID NO: 145, SEQ ID NO: 147, SEQ ID NO: 149, SEQ ID NO: 151, SEQ ID NO: 153, SEQ ID NO: 155, SEQ ID NO: 157, SEQ ID NO: 159, SEQ ID NO: 161, and SEQ ID NO: 163, and a polynucleotide sequence that is at least 80%, at least 85%, at least 90%, or at least 95% identical thereto; and b. heavy chain variable domain polynucleotide coding sequences: SEQ ID NO: 165, SEQ ID NO: 167, SEQ ID NO: 169, SEQ ID NO: 171, SEQ ID NO: 173, SEQ ID NO: 175, SEQ ID NO: 177, SEQ ID NO: 179, SEQ ID NO: 181, SEQ ID NO: 183, SEQ ID NO: 185, SEQ ID NO: 187, SEQ ID NO: 189, and SEQ ID NO: 191, and a polynucleotide sequence that is at least 80%, at least 85%, at least 90%, or at least 95% identical thereto.

In another embodiment, the ETA antibody described herein comprises:

a. a light chain variable domain amino acid sequence independently selected from the list below: SEQ ID NO: 138 (L1), SEQ ID NO: 140 (L2), SEQ ID NO: 142 (L3), SEQ ID NO: 144 (L4), SEQ ID NO: 146 (L5), SEQ ID NO: 148 (L6), SEQ ID NO: 150 (L7), SEQ ID NO: 152 (L8), SEQ ID NO: 154 (L9), SEQ ID NO: 156 (L10), SEQ ID NO: 158 (L11), SEQ ID NO: 160 (L12), SEQ ID NO: 162 (L13), and SEQ ID NO: 164 (L14), and an amino acid sequence that is at least 80%, at least 85%, at least 90%, or at least 95% identical thereto; and b. a heavy chain variable domain amino acid sequence independently selected from the list below: SEQ ID NO: 166 (H1), SEQ ID NO: 168 (H2), SEQ ID NO: 170 (H3), SEQ ID NO: 172 (H4), SEQ ID NO: 174 (H5), SEQ ID NO: 176 (H6), SEQ ID NO: 178 (H7), SEQ ID NO: 180 (H8), SEQ ID NO: 182 (H9), SEQ ID NO: 184 (H10), SEQ ID NO: 186 (H11), SEQ ID NO: 188 (H12), SEQ ID NO: 190 (H13), and SEQ ID NO: 192 (H14), and an amino acid sequence that is at least 80%, at least 85%, at least 90%, or at least 95% identical thereto.

In another embodiment, the ETA antibody described herein comprises:

a. a light chain variable domain amino acid sequence independently selected from the list below: SEQ ID NO: 138 (L1), SEQ ID NO: 140 (L2), SEQ ID NO: 142 (L3), SEQ ID NO: 144 (L4), SEQ ID NO: 146 (L5), SEQ ID NO: 148 (L6), SEQ ID NO: 150 (L7), SEQ ID NO: 152 (L8), SEQ ID NO: 154 (L9), SEQ ID NO: 156 (L10), SEQ ID NO: 158 (L11), SEQ ID NO: 160 (L12), SEQ ID NO: 162 (L13), and SEQ ID NO: 164 (L14); and b. a heavy chain variable domain amino acid sequence independently selected from the list below: SEQ ID NO: 166 (H1), SEQ ID NO: 168 (H2), SEQ ID NO: 170 (H3), SEQ ID NO: 172 (H4), SEQ ID NO: 174 (H5), SEQ ID NO: 176 (H6), SEQ ID NO: 178 (H7), SEQ ID NO: 180 (H8), SEQ ID NO: 182 (H9), SEQ ID NO: 184 (H10), SEQ ID NO: 186 (H11), SEQ ID NO: 188 (H12), SEQ ID NO: 190 (H13), and SEQ ID NO: 192 (H14).

In another embodiment, the ETA antibody described herein comprises a combination of light chain and heavy chain variable domain amino acid sequences independently selected from the list below: SEQ ID NO: 138 and SEQ ID NO: 166 (LIHI), SEQ ID NO: 140 and SEQ ID NO: 168 (L2H2), SEQ ID NO: 142 and SEQ ID NO: 170 (L3H3), SEQ ID NO: 144 and SEQ ID NO: 172 (L4H4), SEQ ID NO: 146 and SEQ ID NO: 174 (L5H5), SEQ ID NO: 148 and SEQ ID NO: 176 (L6H6), SEQ ID NO: 150 and SEQ ID NO: 178 (L7H7), SEQ ID NO: 152 and SEQ ID NO: 180 (L8H8), SEQ ID NO: 154 and SEQ ID NO: 182 (L9H9), SEQ ID NO: 156 and SEQ ID NO: 184 (L10H10), SEQ ID NO: 158 and SEQ ID NO: 186 (L11H11), SEQ ID NO: 160 and SEQ ID NO: 188 (L12H12), SEQ ID NO: 162 and SEQ ID NO: 190 (L13H13), and SEQ ID NO: 164 and SEQ ID NO: 192 (L14H14). In another embodiment, the ETA antibody described herein comprises a combination of light chain and heavy chain variable domain amino acid sequences: SEQ ID NO: 162 and SEQ ID NO: 190 (L13H13).

The symbol "LxHy" can also be used herein to refer to the ETA antibody described herein, where "x" corresponds to the light chain variable region and "y" corresponds to the heavy chain variable region. For example, L2H1 refers to an antibody with a light chain variable region comprising the amino acid sequence SEQ ID NO: 140 (L2) and a heavy chain variable region comprising the amino acid sequence SEQ ID NO: 166 (H1).

In another embodiment, the ETA antibody described herein comprises a light chain variable region selected from L1-L14 or a heavy chain variable region selected from H1-H14, and fragments, derivatives, mutant proteins, or variants thereof.

In another embodiment, the ETA antibody described herein comprises a combination of light chain and heavy chain CDR3 amino acid sequences independently selected from the list below: SEQ ID NO: 138 and SEQ ID NO: 166, SEQ ID NO: 150 and SEQ ID NO: 178, SEQ ID NO: 152 and SEQ ID NO: 180, SEQ ID NO: 154 and SEQ ID NO: 182, SEQ ID NO: 156 and SEQ ID NO: 184, SEQ ID NO: 158 and SEQ ID NO: 186, SEQ ID NO: 160 and SEQ ID NO: 188, SEQ ID NO: 162 and SEQ ID NO: 190, and SEQ ID NO: 164 and SEQ ID NO: 192.

In one embodiment, the ETA antibody described herein comprises the light chain variable domain amino acid sequence SEQ ID NO: 138 or the heavy chain variable domain amino acid sequence SEQ ID NO: 166. In another embodiment, the ETA antibody described herein comprises a combination of the light chain variable domain amino acid sequence SEQ ID NO: 138 and the heavy chain variable domain amino acid sequence SEQ ID NO: 166. In another embodiment, the ETA antibody described herein further comprises constant amino acid sequences, wherein each constant amino acid sequence is independently selected from the amino acid sequences listed below: a. light chain constant amino acid sequences: SEQ ID NO: 194 and SEQ ID NO: 196; and b. heavy chain constant amino acid sequences: SEQ ID NO: 198 and SEQ ID NO: 206.

In another embodiment, the ETA antibody described herein further comprises constant amino acid sequences, wherein each constant amino acid sequence is independently selected from a combination of light chain and heavy chain constant amino acid sequences listed below:

a. a combination of the light chain constant amino acid sequence SEQ ID NO: 194 and the heavy chain constant amino acid sequence SEQ ID NO: 198;
b. a combination of the light chain constant amino acid sequence SEQ ID NO: 194 and the heavy chain constant amino acid sequence SEQ ID NO: 206;
c. a combination of the light chain constant amino acid sequence SEQ ID NO: 196 and the heavy chain constant amino acid sequence SEQ ID NO: 198;
d. a combination of the light chain constant amino acid sequence SEQ ID NO: 196 and the heavy chain constant amino acid sequence SEQ ID NO: 206.

In one embodiment, the antibody described herein comprises light chain and heavy chain CDR and FR (framework) amino acid sequences listed herein. In one embodiment, the antibody comprises the light chain CDR1 sequence listed herein. In another embodiment, the antibody comprises the light chain CDR2 sequence listed herein. In another embodiment, the antibody comprises the light chain CDR3 sequence listed herein. In another embodiment, the antibody comprises the heavy chain CDR1 sequence listed herein. In another embodiment, the antibody comprises the heavy chain CDR2 sequence listed herein. In another embodiment, the antibody comprises the heavy chain CDR3 sequence listed herein. In another embodiment, the antibody comprises the light chain FR1 sequence listed herein. In another embodiment, the antibody comprises the light chain FR2 sequence listed herein. In another embodiment, the antibody comprises the light chain FR3 sequence listed herein. In another embodiment, the antibody comprises the light chainFR4 sequence listed herein. In another embodiment, the antibody comprises the heavy chain FR1 sequence listed herein. In another embodiment, the antibody comprises the heavy chain FR2 sequence listed herein. In another embodiment, the antibody comprises the heavy chain FR3 sequence listed herein. In another embodiment, the antibody comprises the heavy chain FR4 sequence listed herein.

In one embodiment, the CDR3 sequence of the antibody differs from a combination of the light and heavy chain CDR3 amino acid sequences SEQ ID NO: 50 and SEQ ID NO: 116 listed herein by no more than six, five, four, three, two or one single amino acid addition, substitution and/or deletion. In another embodiment, the light chain CDR3 sequence of the antibody differs from the light chain CDR3 amino acid sequence SEQ ID NO: 50 listed herein by no more than six, five, four, three, two or one single amino acid addition, substitution and/or deletion. In another embodiment, the light chain CDR3 sequence of the antibody differs from the light chain CDR3 amino acid sequence SEQ ID NO: 50 listed herein by no more than six, five, four, three, two or one single amino acid addition, substitution and/or deletion, and the heavy chain CDR3 sequence of the antibody differs from the heavy chain CDR3 amino acid sequence SEQ ID NO: 116 or SEQ ID NO: 118 listed herein by no more than six, five, four, three, two or one single amino acid addition, substitution and/or deletion. In another embodiment, the antibody further comprises one, two, three, four, five or six combinations of the light and heavy chain CDR sequences listed herein. In another embodiment, the antibody further comprises one, two, three, four, five or six combinations of the light and heavy chain CDR sequences, and each sequence alone differs from a combination of the light and heavy chain CDR3 amino acid sequences SEQ ID NO: 50 and SEQ ID NO: 116 listed herein by no more than six, five, four, three, two or one single amino acid. In another embodiment, the antibody comprises the light chain variable region CDRs and the heavy chain variable region CDRs listed herein. In another embodiment, the antibody comprises one, two, three, four, five and/or six combinations of the light and heavy chain CDR sequences listed herein.

In one embodiment, the antibody (e.g., an antibody or antibody fragment) comprises the L1 light chain variable domain sequence listed herein. In one embodiment, the light chain variable domain comprises an amino acid sequence with fifteen, fourteen, thirteen, twelve, eleven, ten, nine, eight, seven, six, five, four, three, two or one amino acid difference from the L1 light chain variable domain sequence, wherein the difference in each sequence is independently a deletion, insertion or substitution of an amino acid residue. In another embodiment, the light chain variable domain comprises an amino acid sequence that is at least 70%, at least 75%, at least 80%, at least 85%, at least 90%, at least 95%, at least 97%, or at least 99% identical to the L1 light chain variable domain sequence. In another embodiment, the light chain variable domain polynucleotide coding sequence comprises a nucleotide coding sequence that is at least 70%, at least 75%, at least 80%, at least 85%, at least 90%, at least 95%, at least 97%, or at least 99% identical to the L1 polynucleotide coding sequence. In another embodiment, the light chain variable domain polynucleotide coding sequence comprises a polynucleotide sequence that hybridizes to the complementary sequence of the L1 light chain variable domain polynucleotide coding sequence under moderately stringent conditions. In another embodiment, the light chain variable domain polynucleotide coding sequence comprises a polynucleotide sequence that hybridizes to the complementary sequence of the L1 light chain variable domain polynucleotide coding sequence under stringent conditions.

In one embodiment, the antibody (e.g., an antibody or antibody fragment) comprises the H1 heavy chain variable domain sequence listed herein. In another embodiment, the variable domain comprises an amino acid sequence with fifteen, fourteen, thirteen, twelve, eleven, ten, nine, eight, seven, six, five, four, three, two or one amino acid difference from the H1 heavy chain variable domain sequence, wherein the difference in each sequence is independently a deletion, insertion or substitution of an amino acid residue. In another embodiment, the heavy chain variable domain comprises an amino acid sequence that is at least 70%, at least 75%, at least 80%, at least 85%, at least 90%, at least 95%, at least 97%, or at least 99% identical to the H1 heavy chain variable domain sequence. In another embodiment, the heavy chain variable domain polynucleotide coding sequence comprises a nucleotide coding sequence that is at least 70%, at least 75%, at least 80%, at least 85%, at least 90%, at least 95%, at least 97%, or at least 99% identical to the H1 polynucleotide coding sequence. In another embodiment, the heavy chain variable domain polynucleotide coding sequence comprises a polynucleotide sequence that hybridizes to the complementary sequence of the H1 heavy chain variable domain polynucleotide coding sequence under moderately stringent conditions. In one embodiment, the heavy chain variable domain polynucleotide coding sequence comprises a polynucleotide sequence that hybridizes to the complementary sequence of the H1 heavy chain variable domain polynucleotide coding sequence under stringent conditions.

In one embodiment, the antibody described herein includes an antibody comprising a combination of LiHi, L2H2, L3H3, L4H4, L5H5, L6H6, L7H7, L8H8, L9H9, L10H10, LIIH11, L12H12, L13H13, or L14H14, or a desired phenotype thereof (e.g., IgA, IgG1, IgG2a, IgG2b, IgG3, IgM, IgE, and IgD), or a Fab or $F(ab')_2$ fragment thereof.

In one embodiment, the antibody described herein includes an antibody comprising a combination of L1H1, or an antibody with class switch thereof (e.g., IgA, IgG1, IgG2a, IgG2b, IgG3, IgM, IgE, and IgD), or a Fab or $F(ab')_2$ fragment thereof.

The antibody described herein (e.g., an antibody, antibody fragment, and antibody derivative) may comprise any of the constant regions known in the art. The light chain constant region may be, for example, a κ or λ light chain constant region, such as a mouse κ or λ light chain constant region. The heavy chain constant region may be, for example, an α, δ, ε, γ, or μ heavy chain constant region, such as a mouse α, δ, ε, γ, or μ heavy chain constant region. In one embodiment, the light or heavy chain constant region is a fragment, derivative, variant, or mutant protein of a natural constant region.

In one embodiment, the antibody described herein further comprises a light chain κ or λ constant domain or a fragment thereof. The light chain constant region sequences and the polynucleotide coding sequences thereof are provided below: polynucleotide (κ), (SEQ ID NO: 193); amino acid (κ), (SEQ ID NO: 194); polynucleotide (λ), (SEQ ID NO: 195); amino acid (λ), (SEQ ID NO: 196).

In another embodiment, the antibody described herein further comprises a heavy chain constant domain or a fragment thereof. The heavy chain constant region sequences and the polynucleotide coding sequences thereof are provided below: polynucleotide (IgG4), (SEQ ID NO: 197); amino acid (IgG4), (SEQ ID NO: 198).

In one embodiment, the ETA antibody described herein is selected from a murine antibody, a humanized antibody, a chimeric antibody, a monoclonal antibody, a polyclonal antibody, a recombinant antibody, an antigen-binding antibody fragment, a single-chain antibody, a diabody, a triabody, a tetrabody, a Fab fragment, a $F(ab')_x$ fragment, a domain antibody, an IgD antibody, an IgE antibody, an IgM antibody, an IgG1 antibody, an IgG2 antibody, an IgG3 antibody, and an IgG4 antibody. In another embodiment, the ETA antibody described herein is an ETA monoclonal antibody. In another embodiment, the ETA antibody described herein is a murine ETA antibody. The ETA antibody described herein is a humanized ETA antibody.

In one embodiment, the ETA antibody described herein is a monoclonal antibody A-1 (comprising SEQ ID NO: 138 and SEQ ID NO: 166), A-7 (comprising SEQ ID NO: 150 and SEQ ID NO: 178), A-8 (comprising SEQ ID NO: 152 and SEQ ID NO: 180), A-9 (comprising SEQ ID NO: 154 and SEQ ID NO: 182), A-10 (comprising SEQ ID NO: 156 and SEQ ID NO: 184), A-11 (comprising SEQ ID NO: 158 and SEQ ID NO: 186), A-12 (comprising SEQ ID NO: 160 and SEQ ID NO: 188), A-13 (comprising SEQ ID NO: 162 and SEQ ID NO: 190), or A-14 (comprising SEQ ID NO: 164 and SEQ ID NO: 192).

Antibodies and Antibody Fragments

In one embodiment, the antibody described herein is an intact antibody (including polyclonal, monoclonal, chimeric, humanized or human antibodies with full length heavy and/or light chains). In another embodiment, the antibody described herein is an antibody fragment, for example, a $F(ab')_2$, Fab, Fab', Fv, Fc, or Fd fragment, and can be incorporated into single domain antibodies, single-chain antibodies, maxibodies, minibodies, intrabodies, diabodies, triabodies, tetrabodies, v-NAR and bis-scFv (see, for example, Hollinger and Hudson, 2005, Nature Biotechnology, 23:1126-1136). In another embodiment, the antibody described herein also includes antibody polypeptides such as those disclosed in U.S. Pat. No. U.S. Pat. No. 6,703,199, including fibronectin polypeptide monoclonal antibodies. In another embodiment, the antibody described herein also includes other antibody polypeptides such as those disclosed in U.S. Patent Application Publication No. US 2005/0238646, which are single-chain polypeptides.

In one embodiment, the variable regions of the genes expressing related monoclonal antibodies in hybridomas are amplified using nucleotide primers. These primers can be synthesized by one of ordinary skill in the art, or can be purchased from commercial sources (see, for example, Stratagene, La Jolla, and California), and these vendors sell murine and human variable region primers including $V_{Ha}$, $V_{Hb}$, $V_{Hc}$, $V_{Hd}$, $C_{H1}$, $V_L$, and $C_L$ region primers. These primers can be used to amplify heavy or light chain variable regions, which can then be inserted into vectors such as IMMUNOZAPTMH or ILLLFFLUNOZAPTML (Stratagene), respectively. These vectors can then be introduced into *E. coli*, yeast, or mammalian-based expression systems. Large amounts of fused single-chain proteins containing $V_H$ and $V_L$ domains can be produced using these methods (see Bird et al., 1988, Science 242:423-426).

Once antibody-producing cells according to the application are obtained using any of the above-mentioned immunization and other techniques, specific antibody genes can be cloned by isolating the genes and amplifying DNA or mRNA therefrom according to standard methods described herein. The antibody produced therefrom is sequenced, and the CDRs are identified. The DNA encoding the CDRs can be manipulated as previously described to generate other antibodies described herein.

The antibody described herein can preferably, in the cell-based assays described herein and/or in vivo assays described herein, modulate endothelin signaling and/or cross-block the binding of one of the antibodies described in the present application and/or be cross-blocked by binding with ETA via one of the antibodies described in the present application. Therefore, the assays described herein can be used to identify such binding agents.

In some embodiments, the antibody is generated by first identifying, in the cell-based and/or in vivo assays described herein, the antibody that binds to cells overexpressing ETA and/or neutralizes and/or cross-blocks the antibodies described in the present application and/or is cross-blocked by binding with ETA via one of the antibodies described in the present application.

It should be understood by one skilled in the art that certain proteins, such as antibodies, can undergo a variety of post-transcriptional modifications. The types and extents of these modifications depend on the host cell lines used to express the protein as well as the culture conditions. Such modifications include variations in glycosylation, methionine oxidation, diketopiperizine formation, aspartate isomerization and asparagine deamidation. Frequent modifications due to the action of carboxypeptidases lead to the loss of carboxy-terminal basic residues (such as lysine or arginine) (as described in Harris, 1995, Journal of Chromatography 705:129-134).

An alternative method of producing murine monoclonal antibodies is to inject hybridoma cells into the peritoneal cavity of syngeneic mice, for example, mice that have been treated (e.g., pristane primary immunization) to promote the formation of ascites containing monoclonal antibodies. Monoclonal antibodies can be isolated and purified by a variety of well-established techniques. Such isolation techniques include affinity chromatography with Protein-A Sepharose, size-exclusion chromatography, and ion-exchange chromatography (see, for example, Coligan, pages 2.7.1-2.7.12 and pages 2.9.1-2.9.3; and Baines et al., "Purification of Immunoglobulin G (IgG)", Methods in Molecular Biology, vol. 10, pages 79-104 (The Humana Press, Inc. 1992)). A monoclonal antibody can be purified by affinity chromatography using an appropriate ligand selected based on particular properties of the antibody (e.g., heavy or light chain isotype, binding specificity, etc.). Examples of appropriate ligands immobilized on a solid support include Protein A, Protein G, an anti-constant region (light chain or heavy chain) antibody, an anti-idiotype antibody, and a TGF-βbinding protein, or a fragment or a variant thereof.

Molecular evolution of the complementarity determining regions (CDRs) in the center of the antibody binding site has been used to isolate antibodies with increased affinities, for example, antibodies having increased affinities for c-erbB-2, as described by Schier et al., 1996, J. Mol. Biol. 263:551-567. Accordingly, such techniques are useful in preparing antibodies against human endothelin receptors. Antibodies against human endothelin receptors can be used, for example, in assays to detect the presence of the endothelin receptor, either in vitro or in vivo.

Antibodies can also be prepared by any of the conventional techniques. For example, these antibodies can be purified from cells that naturally express them (e.g., an antibody can be purified from a hybridoma that produces it) or produced in recombinant expression systems using any technique known in the art. See, for example, Monoclonal Antibodies, Hybridomas: A New Dimension in Biological Analyses, Kennet et al. (eds.), Plenum Press, (1980); and Antibodies: A Laboratory Manual, Harlow and Land (eds.), Cold Spring Harbor Laboratory Press (1988). This is discussed in the nucleic acid section below.

Antibodies can be prepared and screened for desired properties by any known techniques. Some techniques relate to the isolation of nucleic acids encoding polypeptide chains (or portions thereof) of related antibodies (e.g., anti-endothelin receptor antibodies) and the manipulation of the nucleic acids by recombinant DNA techniques. The nucleic acids can be fused with another relevant nucleic acid or modified (e.g., by mutagenesis or other conventional techniques) to add, delete or substitute one or more amino acid residues.

Where it is desired to improve the affinity of antibodies according to the invention containing one or more of the above-mentioned CDRs, a number of affinity maturation protocols can be used, including maintenance of the CDRs (Yang et al., 1995, J. Mol. Biol., 254:392-403), chain shuffling (Marks et al., 1992, Bio/Technology, 10:779-783), use of mutant strains of *E. coli*. (Low et al., 1996, J. Mol. Biol., 250:350-368), DNA rearrangement (Patten et al., 1997, Curr. Opin. Biotechnol., 8:724-733), phage display (Thompson et al., 1996, J. Mol. Biol., 256:7-88) and additional PCR techniques (Crameri et al., 1998, Nature, 391: 288-291). All of these affinity maturation methods are discussed in Vaughan et al., 1998, Nature Biotechnology, 16:535-539.

In one embodiment, the antibody described herein is an anti-endothelin receptor fragment. The fragment may consist entirely of antibody-derived sequences or may contain additional sequences. Examples of antigen-binding fragments include Fab, F(ab')$_2$, single chain antibodies, diabodies, triabodies, tetrabodies, and domain antibodies. Other examples are provided in Lunde et al., 2002, Biochem. Soc. Trans. 30:500-06.

Single chain antibodies can be formed by linking heavy and light chain variable domain (Fv region) fragments via an amino acid bridge (short peptide linker), resulting in a single polypeptide chain. Such single-chain Fvs (scFvs) have been prepared by fusing DNA encoding a peptide linker between DNAs encoding the two variable domain polypeptides ($V_L$ and $V_H$). The resulting polypeptides can fold back to themselves to form antigen-binding monomers, or they can form polymers (e.g., dimers, trimers, or tetramers), depending on the length of a flexible linker between the two variable domains (Kortt et al., 1997, Prot.Eng. 10:423; and Kortt et al., 2001, Biomol. Eng. 18:95-108). By combining different $V_L$ and $V_H$-comprising polypeptides, polymeric scFvs that bind to different phenotypes can be formed (Kriangkum et al., 2001, Biomol. Eng. 18:31-40). Techniques developed for the production of single chain antibodies include those described in U.S. Pat. No. 4,946,778; Bird, 1988, Science 242:423; Huston et al., 1988, PNAS USA 85:5879-5883; Ward et al., 1989, Nature 334:544-546; deGraaf et al., 2002, Methods Mol. Biol. 178:379-87. Single chain antibodies derived from antibodies described herein including, but not limited to, scFvs comprising the variable domain combination L1H1, are encompassed within the scopes described herein.

Antigen-binding fragments derived from antibodies can also be obtained by proteolytic hydrolysis of the antibodies, for example, pepsin or papain digestion of an intact antibody according to conventional methods. By way of example, antibody fragments can be produced by enzymatic cleavage of antibodies with pepsin to provide a SS fragment termed F(ab')$_2$. This fragment can be further cleaved using a sulfhydryl reducing agent to produce 3.5S Fab' monovalent fragments. An optional scheme is to perform the cleavage reaction with a sulfhydryl protecting group to obtain the cleavage of the disulfide bond; in addition, enzymatic cleavage with papain directly produces two monovalent Fab fragments and an Fc fragment. These methods are described, for example, in Goldenberg, U.S. Pat. No. 4,331,647; Nisonoffet et al., 1960, Arch. Biochem. Biophys. 89:230; Porter, 1959, Biochem. J. 73:119; Edelman et al., Methods in Enzymology 1:422 (Academic Press, 1967); and Andrews and Titus, J. A. Current Protocols in Immunology (Coligan et al., (eds)), John Wiley & Sons, 2003), pages 2.8.1-2.8.10 and 2.10A.1-2.10A.5. Other methods for cleaving antibodies, such as preparing heavy chains to form monovalent heavy and light chain fragments (Fds), further cleaving of fragments, or other enzymatic, chemical, or genetic techniques can also be used, provided that the fragments bind to the antigen that is recognized by the intact antibody.

Another form of an antibody fragment is a peptide comprising one or more complementarity determining regions (CDRs) of an antibody. CDRs can be obtained by constructing polynucleotides that encode the relevant CDRs. Such polynucleotides can be prepared, for example, by using the polymerase chain reaction to synthesize the variable region using mRNA of antibody-producing cells as a template (see, for example, Larrick et al., 1991, Methods: A Companion to Methods in Enzymology 2:106; Courtenay-Luck, "Genetic Manipulation of Monoclonal Antibodies", Monoclonal Antibodies: Production, Engineering and Clinical Application, Ritter et al. (eds.), page 166 (Cambridge University Press, 1995); and Ward et al., "Genetic Manipulation and Expression of Antibodies", Monoclonal Antibodies: Principles and Applications, Birch et al., (eds.), page 137 (Wiley-Liss, Inc. 1995). The antibody fragment can further comprise at least one variable domain of the antibody described herein. Thus, for example, the V region domain can be monomeric and be a $V_H$ or $V_L$ domain, which can independently bind to an endothelin receptor with an affinity of at least $1\times10^{-7}$ M or less as described below.

The variable region domain can be any naturally occurring variable domain or a genetically engineered version thereof. By genetically engineered version is meant a variable region domain produced by recombinant DNA engineering techniques. Such genetically engineered versions include those created, for example, from a specific antibody variable region by insertions, deletions, or changes in or to the amino acid sequences of the specific antibody. Particular examples include genetically engineered variable region domains containing only one CDR and optionally one or more framework amino acids from an antibody and the remainder of the variable region domain from another antibody.

The variable region domain can be covalently linked at the C-terminal amino acid to at least one other antibody domain or a fragment thereof. Thus, by way of example, a $V_H$ domain that is present in the variable region domain can be linked to an immunoglobulin $C_{H1}$ domain or a fragment thereof. Similarly, a $V_L$ domain can be linked to a $C_K$ domain or a fragment thereof. In this way, for example, the antibody can be a Fab fragment, wherein the antigen-binding domain contains combined $V_H$ and $V_L$ domains covalently linked at the C-terminal thereof to $C_{H1}$ and $C_K$ domains, respectively. The $C_{H1}$ domain can be extended with further amino acids, for example to provide a hinge region or a portion of a hinge region domain as found in a Fab' fragment, or to provide further domains, such as antibody $C_{H2}$ and $C_{H3}$ domains.

Derivatives and Variants of Antibodies

The nucleotide sequences L1 and H1 encoding the amino acid sequence A-1 can be altered, for example, by random mutagenesis or by site-directed mutagenesis (e.g., oligonucleotide-induced site-directed mutagenesis) to create an altered polynucleotide comprising one or more particular nucleotide substitutions, deletions, or insertions as compared to the non-mutated polynucleotide. Examples of techniques for making such alterations are described in Walder et al., 1986, Gene 42:133; Bauer et al., 1985, Gene 37:73; Craik, 1985, BioTechniques, 3:12-19; Smith et al., 1981, Genetic Engineering: Principles and Methods, Plenum Press; and U.S. Pat. Nos. 4,518,584 and 4,737,462. These and other methods can be used to produce, for example, derivatives of anti-endothelin receptor antibodies with desired properties, such as enhanced affinity, avidity or specificity for endothelin receptors, enhanced in vivo or in vitro activity or stability, or reduced in vivo side effects as compared to the underivatized antibody.

Other derivatives of anti-endothelin receptor antibodies in the art include covalent or aggregated conjugates of anti-endothelin receptor antibodies or fragments thereof, with other proteins or polypeptides, for example, by expression of recombinant fusion proteins comprising heterologous polypeptides fused to the N-terminus or C-terminus of an anti-endothelin receptor antibody polypeptide. For example, the conjugated peptide can be a heterologous signal (or leader) polypeptide, e.g., a yeast alpha-factor leader peptide or an epitope-tagged peptide. An antibody containing fusion proteins can comprise peptides added to facilitate purification or identification of the antibody (e.g., poly-His). An antibody also can be linked to a FLAG peptide as described in Hopp et al., 1988, Bio/Technology 6:1204, and U.S. Pat. No. U.S. Pat. No. 5,011,912. The FLAG peptide is highly antigenic and provides an epitope reversibly bound by a specific monoclonal antibody (mAb), enabling rapid assay and facile purification of an expressed recombinant protein. Reagents useful for preparing fusion proteins in which the FLAG peptide is fused to a given polypeptide are commercially available (Sigma-Aldrich, St. Louis, MO). In another embodiment, oligomers that contain one or more antibodies can be employed as endothelin receptor antagonists or higher oligomers. Oligomers can be in the form of covalently linked or non-covalently linked dimers, trimers, or higher oligomers. Oligomers comprising two or more antibodies are contemplated for use, with one example being a homodimer. Other oligomers include heterodimers, homotrimers, heterotrimers, homotetramers, heterotetramers, etc.

One embodiment is directed to oligomers comprising multiple antibodies, which are linked via covalent or non-covalent interactions between the peptide moieties fused to the antibodies. Such peptides can be peptide linkers (spacers), or peptides that have the property of promoting oligomerization. Leucine zippers and certain polypeptides derived from antibodies are peptides that can promote oligomerization of antibodies, as described in detail below.

In particular embodiments, oligomers comprise from two to four antibodies. The antibodies of the oligomers can be in any form, such as any of the forms described above, e.g., variants or fragments. Preferably, the oligomers comprise antibodies having endothelin receptor binding activity.

In one embodiment, oligomers are prepared using polypeptides derived from immunoglobulins. Preparation of fusion proteins comprising certain heterologous polypeptides fused to various portions of antibody-derived polypeptides (including the Fc domain) has been described, e.g., in Ashkenazi et al., 1991, PNAS USA 88:10535; Byrn et al., 1990, Nature 344:677; and Hollenbaugh et al., Construction of Immunoglobulin Fusion Proteins, Current Protocols in Immunology, Suppl. 4, pages 10.19.1-10.19.11. One embodiment herein is directed to a dimer comprising two fusion proteins produced by fusing an endothelin binding fragment of an anti-endothelin receptor antibody to the Fc region of the antibody. The dimer can be prepared in the following ways: for example, inserting a fusion gene encoding a fusion protein into an appropriate expression vector, expressing the fusion gene in host cells transformed with the recombinant expression vector, and allowing the expressed fusion protein to assemble like an antibody molecule, whereupon the inter-chain disulfide bonds between the Fc moieties form a dimer.

The term "Fc polypeptide" as used herein includes polypeptides in the form of natural proteins and mutant proteins derived from the Fc region of antibodies. Truncated forms of such polypeptides containing the hinge region that promotes dimerization also are included. Fusion proteins comprising Fc moieties (and oligomers formed therefrom) offer the advantage of facile purification by affinity chromatography over Protein A or Protein G columns.

A suitable Fc polypeptide, described in PCT application W0 93/10151 (incorporated herein by reference), is a single chain polypeptide extending from the N-terminal hinge region to the natural C-terminus of the Fc region of a human IgG1 antibody. Another useful Fc polypeptide is the Fc mutant protein described in U.S. Pat. No. U.S. Pat. No. 5,457,035 and in Baum et al., 1994, EMBO J. 13:3992-4001. The amino acid sequence of this mutant protein is identical to that of the natural Fc sequence shown in W0 93/10151, except that amino acid 19 has been changed from Leu to Ala, amino acid 20 has been changed from Leu to Glu, and amino acid 22 has been changed from Gly to Ala. The mutant protein exhibits reduced affinity for Fc receptors. In other embodiments, the heavy chain and/or light chain of an anti-endothelin receptor antibody may be substituted with the variable portion of the heavy chain and/or light chain thereof.

Alternatively, the oligomer is a fusion protein comprising multiple antibodies, with or without peptide linkers (spacer peptides). These suitable peptide linkers are described in U.S. Pat. Nos. U.S. Pat. Nos. 4,751,180 and 4,935,233.

Another method for preparing oligomeric antibodies involves use of a leucine zipper. Leucine zipper domains are peptides that promote oligomerization of the proteins in which they are found. Leucine zippers were originally identified in several DNA-binding proteins (Landschulz et al., 1988, Science 240:1759), and later found in a variety of different proteins. Among the known leucine zippers are naturally occurring peptides or derivatives thereof that can be dimerized or trimerized. Examples of leucine zipper domains suitable for producing soluble oligomeric proteins are described in PCT application W0 94/10308, and the leucine zippers derived from lung surfactant protein D (SPD) are described in Hoppe et al., 1994, FEBS Letters 344:191, incorporated herein by reference. The use of a modified leucine zipper that allows for stable trimerization of a heterologous protein fused thereto is described in Fanslow et al., 1994, Semin. Immunol. 6:267-78. In one method, recombinant fusion proteins comprising an anti-endothelin receptor antibody fragment or a derivative thereof fused to a leucine zipper peptide are expressed in suitable host cells, and a soluble oligomeric anti-endothelin receptor antibody fragment or a derivative thereof is collected from the culture supernatant.

In another embodiment, the antibody derivative can comprise at least one of the CDRs disclosed herein. By way of example, one or more CDRs can be integrated into known antibody framework regions (IgG1, IgG2, etc.), or conjugated to a suitable vehicle to enhance the half-life thereof. Suitable vehicles include, but are not limited to, Fc, albumin, transferrin, and the like. These and other suitable vehicles are known in the art. Such CDR conjugated peptides can be in monomeric, dimeric, tetrameric, or other forms. In one embodiment, one or more water-soluble polymers bind at one or more specific sites, for example at the amino terminus, of a binding agent. In an example, an antibody derivative comprises one or more water-soluble polymer attachments, including, but not limited to, polyethylene glycol, polyoxyethylene glycol, or polypropylene glycol. See, for example, U.S. Pat. Nos. U.S. Pat. Nos. 4,640,835, 4,496,689, 4,301,144, 4,670,417, 4,791,192 and 4,179,337. In some embodiments, the derivative comprises one or more of monomethoxy-polyethylene glycol, dextran, cellulose or other carbohydrate-based polymers, poly(N-vinyl pyrrolidone)-polyethylene glycol, polyoxyethylated polyols (e.g., glycerol) and polyvinyl alcohol, and mixtures of such polymers. In some embodiments, one or more water-soluble polymers are randomly attached to one or more side chains. In some embodiments, PEG can act to improve the therapeutic effect of a binding agent, such as an antibody. Certain such methods are described, for example, in U.S. Pat. No. 6,133,426, which is incorporated herein by reference for any purpose.

It will be appreciated that the antibody described herein may have at least one amino acid substitution, provided that the antibody retains the binding specificity. Therefore, modifications to the antibody structures are encompassed within the scopes described herein. These modifications can include amino acid substitutions, which may be conservative or non-conservative, that do not destroy the endothelin receptor binding capability of an antibody. Conservative amino acid substitutions may encompass non-naturally occurring amino acid residues, which are typically integrated by chemical peptide synthesis rather than by synthesis in biological systems. These amino acid residues include peptidomimetics and other reversed or inverted forms of amino acid moieties. Conservative amino acid substitutions can also involve a substitution of a naturally occurring amino acid residue with a non-naturally occurring residue such that there is little or no effect on the polarity or charge of the amino acid residue at that site. Non-conservative substitutions can involve the exchange of a member of one class of amino acids or amino acid analogs for a member from another class with different physical properties (e.g., size, polarity, hydrophobicity, and charge).

Moreover, one skilled in the art may generate variants to be tested, which contain an amino acid substitution at each desired amino acid residue. The variants can be screened using activity assays known to one skilled in the art. Such variants can be used to gather information about suitable variants. By way of example, if it is found that a change to a particular amino acid residue results in destroyed, undesirably reduced, or unsuitable activity, variants with such a change may be avoided. In other words, based on information gathered from such routine experiments, one skilled in the art can readily determine the amino acids where further substitutions should be avoided either alone or in combination with other mutations.

One skilled in the art will be able to determine suitable variants of the polypeptide as set forth herein using known techniques. In some embodiments, one skilled in the art may identify suitable regions of the molecule that may be changed without destroying the activity by targeting regions not to be important for activity. In some embodiments, residues or portions of molecules that are conserved among similar polypeptides can be identified. In some embodiments, even conservative substitutions for regions that are important for biological activity or structure do not destroy the biological activity or have an adverse effect on the polypeptide structure. Additionally, one skilled in the art can review structure-function studies to identify residues in similar polypeptides that are important for activity or structure. In view of such a comparison, the importance of amino acid residues in a protein that correspond to amino acid residues which are important for activity or structure in similar proteins can be predicted. One skilled in the art may opt for chemically similar amino acid substitutions for such predicted important amino acid residues.

One skilled in the art can also analyze the three-dimensional structure and amino acid sequence in relation to that structure in similar polypeptides. In view of such information, one skilled in the art may predict the alignment of amino acid residues of an antibody with respect to the three-dimensional structure thereof. In some embodiments, one skilled in the art may choose not to make radical changes to amino acid residues predicted to be on the surface of a protein, because such residues may be involved in important interactions with other molecules. A number of scientific publications have been devoted to the prediction of secondary structure. See Moult, 1996, Curr. Op. Biotech. 7:422-427; Chou et al., 1974, Biochemistry 13:222-245; Chou et al., 1974, Biochemistry 113:211-222; Chou et al., 1978, Adv. Enzymol. Relat. Areas Mol. Biol. 47:45-148; Chou et al., 1979, Ann. Rev. Biochem. 47:251-276 and Chou et al., Biophys. J. 26:367-384. Moreover, computer programs are currently available to assist with predicting secondary structure. By way of example, two polypeptides or proteins which have a sequence identity greater than 30%, or similarity greater than 40% often have similar high-level structures. The recent growth of the Protein Data Bank (PDB) has provided enhanced predictability of secondary structure, including the potential number of folds within the structure of a polypeptide or protein. See Holm et al., 1999, Nucl. Acid. Res. 27:244-247. It has been suggested (Brenner et al., 1997, Curr. Op. Struct. Biol. 7:369-376) that there are a limited number of folds in a given polypeptide or protein and that once a critical number of structures are determined, the structural prediction will become dramatically more accurate. Additional methods for predicting secondary structure include "threading" (Jones, 1997, Curr. Opin. Struct. Biol. 7:377-87; and Sippl et al., 1996, Structure 4:15-19); "profile analysis" (Bowie et al., 1991, Science 253:164-170; Gribskov et al., 1990, Meth. Enzym. 183:146-159; and Gribskov et al., 1987, PNAS USA 84:4355-4358, and "evolutionary linkage" (see Holm, supra (1999), and Brenner, supra (1997)). In some embodiments, antibody variants include glycosylation variants, wherein the number and/or type of glycosylation sites have been altered compared to the amino acid sequences of a parent polypeptide. In some embodiments, variants comprise a greater or lesser number of N-linked glycosylation sites than natural proteins. Alternatively, elimination of such a sequence by substitutions removes an existing N-linked carbohydrate chain. Also provided is a rearrangement of N-linked carbohydrate chains, wherein one or more N-linked carbohydrate chain sites (typically those that are naturally occurring) are eliminated and one or more new N-linked sites are created. Additional preferred antibody variants include cysteine variants, wherein one or more cysteine residues are deleted or substituted with another amino acid (e.g., serine) as compared to the parent amino acid sequence. Cysteine variants can be useful when antibodies must be folded into a biologically active conformation (for example, after isolation of soluble inclusion bodies). Cysteine variants generally have fewer cysteine residues than natural proteins, and typically have an even number of cysteines to minimize interactions resulting from unpaired cysteines.

Desired amino acid substitutions (whether conservative or non-conservative) can be determined by one skilled in the art at the time such substitutions are desired. In some embodiments, amino acid substitutions can be used to identify important residues of human endothelin receptor antibodies, or to increase or decrease the affinity of the human endothelin receptor antibodies described herein. According to some embodiments, preferred amino acid substitutions are those which: (1) reduce susceptibility to proteolysis, (2) reduce susceptibility to oxidation, (3) alter the binding affinity for forming protein complexes, (4) alter the binding affinity, and/or (4) confer or modify other physiochemical or functional properties on such polypeptides. According to some embodiments, single or multiple amino acid substitutions (in some embodiments, conservative amino acid substitutions) can be made in the naturally occurring sequences (in some embodiments, in the portion of the polypeptide outside the domain(s) forming intermolecular contacts). In some embodiments, conservative amino acid substitutions typically cannot substantially change the structural characteristics of the parent sequence (e.g., the substitution of amino acids shall not destroy the helices present in the parent sequence or interfere with other types of secondary structure that characterize the parent sequence). Examples of art-recognized polypeptide secondary and tertiary structures are described in Proteins, Structures and Molecular Principles, Creighton, ed., W. H. Freeman and Company, (1984); Introduction to Protein Structure, Branden and Tooze, eds., Garl and Publishing, (1991); and Thornton et al., 1991, Nature 354:105, each of which is incorporated herein by reference.

In some embodiments, the antibody described herein can be chemically bonded with polymers, lipids, or other moieties. The antigen-binding agents can comprise at least one of the CDRs described herein incorporated into a biocompatible framework structure. In an example, the biocompatible framework structure comprises a polypeptide or a portion thereof that is sufficient to form a conformationally stable structural support, or framework, or scaffold, which is able to present one or more amino acid sequences that bind to an antigen (e.g., CDRs, variable regions, etc.) in a localized surface region. Such structures can be a naturally occurring polypeptide or polypeptide "fold" (a structural motif), or can have one or more modifications, such as additions, deletions or substitutions of amino acids, relative to a naturally occurring polypeptide or fold. These scaffolds can be derived from a polypeptide of any species (or of more than one species), such as humans, other mammals, other vertebrates, invertebrates, bacteria or viruses. Typically, the biocompatible framework structure is based on a protein scaffold or framework rather than an immunoglobulin domain. By way of example, those protein scaffolds based on fibronectin, ankyrin, lipocalin, neocarzinostain, cytochrome b, CP1 zinc finger protein, PST1, coiled-coil protein, LACI-D1, Z domain and tendamistat domain can be used (see, for example, Nygren and Uhlen, 1997, Current Opinion in Structural Biology 7:463-469).

Additionally, one skilled in the art will recognize that suitable binding agents include portions of these antibodies, such as one or more of the heavy chain CDR1, CDR2 and CDR3, and light chain CDR1, CDR2 and CDR3 as specifically disclosed herein. At least one of the heavy chain CDR1, CDR2, CDR3, light chain CDR1, CDR2 and CDR3 regions can have at least one amino acid substitution, provided that the antibody retains the binding specificity of the non-substituted CDR. The non-CDR portion of the antibody may be a non-protein molecule, wherein the binding agent cross-blocks the binding of the antibody disclosed herein to human ETA and/or inhibits endothelin signaling via the receptor. The non-CDR portion of the antibody may be a non-protein molecule, wherein the antibody exhibits a binding type similar to that of at least one of the antibodies A-1/A-2 to human ETA peptide, and/or neutralizes the activity of endothelin in a competitive binding assay. The non-CDR portion of the antibody may be composed of amino acids, wherein the antibody is a recombinant binding protein or a synthetic peptide, and the recombinant binding protein cross-blocks the binding of the antibody disclosed herein to human ETA and/or neutralizes endothelin activity in vivo or in vitro. The non-CDR portion of the antibody may be composed of amino acids, wherein the antibody is a recombinant antibody, and the recombinant antibody exhibits a binding type similar to that of at least one of the antibodies A-1/A-2 to human ETA peptide, and/or neutralizes endothelin signaling in a competitive binding assay.

Nucleic Acids

In one aspect, provided herein is an isolated nucleic acid molecule. The nucleic acid molecule comprises, for example, polynucleotides that encode all or part of an antibody, such as one or both chains of the antibody described herein, or a fragment, derivative, mutant protein, or variant thereof, polynucleotides sufficient for use as hybridization probes; PCR primers or sequencing primers for identifying, analyzing, mutating or amplifying a polynucleotide encoding a polypeptide; anti-sense nucleic acids for inhibiting expression of a polynucleotide, and complementary sequences thereof. The nucleic acid can be in any length. The nucleic acid can be, for example, 5, 10, 15, 20, 25, 30, 35, 40, 45, 50, 75, 100, 125, 150, 175, 200, 250, 300, 350, 400, 450, 500, 750, 1000, 1500, 3000, 5000 or more nucleotides in length, and/or can comprise one or more additional sequences, for example, regulatory sequences, and/or can be part of a larger nucleic acid, for example, a vector. The nucleic acid can be single-stranded or double-stranded and can comprise RNA and/or DNA nucleotides, and artificial variants thereof (e.g., peptide nucleic acids).

A nucleic acid encoding an antibody polypeptide (e.g., heavy or light chain, variable domain only, or full length) can be isolated from B-cells of mice that have been immunized with an ETA antigen. The nucleic acid can be isolated by conventional methods such as the polymerase chain reaction (PCR).

The nucleic acid sequences encoding the heavy and light chain variable regions are shown above. The skilled artisan will appreciate that, due to the degeneracy of the genetic code, each of the polypeptide sequences disclosed herein can be encoded by a large number of other nucleic acid sequences. Provided herein is each degenerate nucleotide sequence encoding the antibody described herein.

Further provided herein are nucleic acids that hybridize to other nucleic acids (e.g., nucleic acids comprising a nucleotide sequence of any of A-1/A-2) under particular hybridization conditions. Methods for hybridizing nucleic acids are well-known in the art. See, for example, Current Protocols in Molecular Biology, John Wiley & Sons, N.Y. (1989), 6.3.1-6.3.6. As defined herein, for example, a moderately stringent hybridization condition uses a prewashing solution containing 5× sodium chloride/sodium citrate (SSC), 0.5% SDS, 1.0 mM EDTA (pH 8.0), a hybridization buffer of about 50% formamide, 6×SSC, a hybridization temperature of 55° C. (or other similar hybridization solutions, such as a solution containing about 50% formamide, with a hybridization temperature of 42° C.), and elution conditions of 60° C., 0.5×SSC and 0.1% SDS. A stringent hybridization condition hybridizes in 6×SSC at 45° C., followed by one or more washes in 0.1×SSC and 0.2% SDS at 68° C. Furthermore, one skilled in the art can manipulate the hybridization and/or washing conditions to increase or decrease the stringency of hybridization such that nucleic acids comprising nucleotide sequences that are at least 65%, 70%, 75%, 80%, 85%, 90%, 95%, 98% or 99% homologous to each other typically remain hybridized to each other. The basic parameters affecting the choice of hybridization conditions and guidance for designing suitable conditions are set forth in, for example, Sambrook, Fritsch and Maniatis, 1989, Molecular Cloning: A Laboratory Manual, Cold Spring Harbor Laboratory Press, chapters 9 and 11; and Current Protocols in Molecular Biology, 1995, Ausubel et al., eds., John Wiley & Sons, Inc., sections 2.10 and 6.3-6.4, and can be readily determined by one of ordinary skill in the art based on, for example, the length and/or base composition of the DNA. Changes can be introduced by mutations into a nucleic acid, thereby leading to changes in the amino acid sequence of the polypeptide (e.g., an antigen binding protein) encoded thereby. Mutations can be introduced using any technique known in the art. In one embodiment, one or more particular amino acid residues are altered using, for example, a site-directed mutagenesis protocol. In another embodiment, one or more randomly selected residues are altered using, for example, a random mutagenesis protocol. No matter how it is made, a mutant polypeptide can be expressed and screened for desired properties.

Mutations can be introduced into a nucleic acid without significantly altering the biological activity of a polypeptide encoded thereby. For example, nucleotide substitutions leading to amino acid substitutions at non-essential amino acid residues can be made. In one embodiment, nucleotide sequences provided herein for L-1 to L-2 and H-1 to H-2, or fragments, variants, or derivatives thereof, are mutated such that the amino acid sequence encoded thereby comprises, as compared to that encoded by L-1 to L-2 and H-1 to H-2 as shown herein, one or more deletions or substitutions of amino acid residues, resulting in sequences involving two or more different residues. In another embodiment, mutagenesis leads to insertion of an amino acid adjacent to one or more amino acid residues of L-1 to L-2 and H-1 to H-2 as shown herein, resulting in sequences involving two or more different residues. Alternatively, one or more mutations can be introduced into a nucleic acid to selectively alter the biological activity (e.g., binding to ETA) of a polypeptide encoded thereby. For example, the mutation can quantitatively or qualitatively change the biological activity. Examples of quantitative changes include increasing, reducing or eliminating the activity. Examples of qualitative changes include changing the antigen specificity of the antibody.

In another aspect, provided herein are nucleic acid molecules that are suitable for use as primers or hybridization probes for the detection of nucleic acid sequences herein. The nucleic acid molecule herein can comprise only a portion of a nucleic acid sequence encoding the full-length polypeptide herein, for example, a fragment that can be used as a probe or a primer or a fragment encoding an active portion (e.g., an ETA binding portion) of the polypeptide herein. Probes based on the nucleic acid sequence herein can be used to detect the nucleic acid or similar nucleic acids, for example, transcripts encoding the polypeptide herein. The probes can comprise a labelling group, e.g., a radioisotope, a fluorescent compound, an enzyme, or an enzyme co-factor. Such probes can be used to identify a cell that expresses the polypeptide.

In another aspect, provided herein is a vector comprising a nucleic acid encoding the polypeptide herein or a portion thereof. Examples of vectors include, but are not limited to, plasmids, viral vectors, non-episomal mammalian vectors and expression vectors, for example, recombinant expression vectors. The recombinant expression vectors herein can comprise the nucleic acid herein in a form suitable for expression of the nucleic acid in a host cell. The recombinant expression vectors include one or more regulatory sequences, which are screened based on the host cells used for expression, and are operably linked to the pre-expressed nucleic acid sequence. Regulatory sequences include those that direct constitutive expression of a nucleotide sequence in many types of host cells (e.g., an SV40 early gene enhancer, Rous sarcoma virus promoter and cytomegalovirus promoter), those that direct expression of the nucleotide sequence only in certain host cells (e.g., a tissue-specific regulatory sequence, see Voss et al., 1986, Trends Biochem. Sci. 11:287, and Maniatis et al., 1987, Science 236:1237, the disclosure of each of which is incorporated by reference herein in its entirety), and those that direct inducible expression of the nucleotide sequence in response to particular treatment or condition (e.g., a metallothionin promoter in mammalian cells and a tet-responsive and/or streptomycin responsive promoter in both prokaryotic and eukaryotic systems (supra)). It should be understood by one skilled in the art that the design of the expression vector can depend on factors such as the choice of the host cell to be transformed, and the level of expression of the protein desired. The expression vector herein can be introduced into a host cell, thereby producing the protein or peptide, including a fusion protein or peptide, encoded by the nucleic acid described herein.

In another aspect, provided herein is a host cell into which the expression vector herein can be introduced. The host cell can be any prokaryotic or eukaryotic cell. Prokaryotic host cells include Gram-negative or Gram-positive organisms, for example, *E. coli* or bacilli. Higher eukaryotic cells include insect cells, yeast cells, and established cell lines of mammalian origin. Examples of suitable mammalian host cell lines include Chinese hamster ovary (CHO) cells or derivatives thereof such as Veggie CHO and related cell lines which grow in serum-free media (see Rasmussen et al., 1998, Cytotechnology 28:31) or CHO strain DXB-11 which is deficient in DHFR (see Urlaub et al., 1980, PNAS USA 77:4216-20). Additional CHO cell lines include CHO-K1 (ATCC #CCL-61), EM9 (ATCC #CRL-1861), and UV20 (ATCC #CRL-1862). Additional host cells include monkey kidney COS-7 cell lines (ATCC #CRL-1651) (see Gluzman et al., 1981, Cell 23:175), L cells, C127 cells, 3T3 cells (ATCCCCL-163), AM-1/D cells (described in U.S. Pat. No. 6,210,924), HeLa cells, BHK (ATCCCRL-10) cell lines, the CV1/EBNA cell line derived from the African green monkey kidney cell line CV1 (ATCCCCL-70) (see McMahan et al., 1991, EMBO J. 10:2821), human embryonic kidney cells such as 293, 293EBNA or MSR293, human epidermal A431 cells, human C010220 cells, other transformed primate cell lines, normal diploid cells, cell strains derived from in vitro culture of primary tissue, primary explants, HL-60, U937, HaK or Jurkat cells. Suitable cloning and expression vectors for use with bacterial, fungal, yeast, and mammalian cell hosts are described by Pouwels et al. (Cloning Vectors: A Laboratory Manual, Elsevier, 1985).

Vector DNA can be introduced into prokaryotic or eukaryotic cells by conventional transformation or transfection techniques. For stable transfection of mammalian cells, it is known that, depending upon the expression vector and transfection technique used, only a small fraction of cells can integrate the foreign DNA into the genome thereof. In order to identify and screen for these integrants, a gene that encodes a selectable marker (e.g., for resistance to antibiotics) is generally introduced into a host cell along with the gene of interest. Preferred selectable markers include those which confer resistance to drugs, such as G418, hygromycin and methotrexate. Among other methods, cells stably transfected with the introduced nucleic acid can be identified by drug screening (for example, cells that have integrated the selectable gene will survive, while other cells die).

The transformed cells can be cultured under conditions that promote expression of a polypeptide, and the polypeptide can be recovered by conventional protein purification methods. One such purification method is described in the Examples below. Polypeptides contemplated for use herein include substantially homogeneous recombinant mammalian anti-endothelin receptor antibody polypeptides, which are substantially free of contaminating endogenous materials.

Antibody Activity

In one embodiment, the antibody described herein specifically binds to endothelin receptors, inhibits signaling and exhibits therapeutic biological effects, such as reducing pulmonary arterial hypertension in animal models. In another embodiment, the antibody described herein is a murine antibody or humanized antibody that can specifically bind to human endothelin receptors. Such antibodies include antagonistic or neutralizing antibodies that can reduce or neutralize endothelin signaling.

In one embodiment, the antibody described herein has a $K_d$ value of approximately 0.01 nM to 1000 nM, 0.1 nM to 500 nM, 0.5 nM to 200 nM, 1 nM to 200 nM, or 10 nM to 100 nM when binding to human endothelin receptor ETA. In another embodiment, the antibody described herein has a $K_d$ value of approximately 1 nM to 200 nM when binding to human endothelin receptor ETA. In another embodiment, the antibody described herein has a $K_d$ value of approximately 10 nM to 100 nM when binding to human endothelin receptor ETA. In another embodiment, the antibody described herein has a $K_d$ value of approximately 1 nM, 2 nM, 5 nM, 10 nM, 20 nM, 30 nM, 40 nM, 50 nM, 60 nM, 70 nM, 80 nM, 90 nM, or 100 nM when binding to human endothelin receptor ETA.

In one embodiment, the antibody described herein has an $IC_{50}$ value of approximately 0.01 nM to 500 nM, 0.1 nM to 200 nM, 0.5 nM to 200 nM, 1 nM to 200 nM, or 10 nM to 100 nM in reducing human endothelin signaling. In another embodiment, the antibody described herein has an $IC_{50}$ value of approximately 1 nM to 200 nM in reducing human endothelin signaling. In another embodiment, the antibody described herein has an $IC_{50}$ value of approximately 10 nM to 100 nM in reducing human endothelin signaling. In another embodiment, the antibody described herein has an $IC_{50}$ value of approximately 1 nM, 2 nM, 5 nM, 10 nM, 20 nM, 30 nM, 40 nM, 50 nM, 60 nM, 70 nM, 80 nM, 90 nM, or 100 nM in reducing human endothelin signaling.

In one embodiment, the ETA antibody has one or more of the following properties:

a. providing the same or better $K_d$ as or than the reference antibody when binding to human endothelin receptorETA;
b. providing the same or better $IC_{50}$ as or than the reference antibody when inhibiting the activation of human endothelin receptor ETA by endothelin; and
c. cross-competing binding with the reference antibody to human endothelin receptor ETA.

In another embodiment, the ETA antibody described herein is an antibody having one or more of the following properties:

a. providing the same or better $K_d$ as or than a reference ETA antibody when binding to human endothelin receptor ETA;
b. providing the same or better $IC_{50}$ as or than a reference ETA antibody when inhibiting the activation of human endothelin receptor ETA by endothelin; and c. cross-competing binding with a reference ETA antibody to human endothelin receptor ETA.

In one aspect, the reference antibody comprises a combination of the light chain variable domain amino acid sequence SEQ ID NO: 138 and the heavy chain variable domain amino acid sequence SEQ ID NO: 166. In another aspect, the reference antibody is a monoclonal antibody A-1, A-2, A-7, A-9, or A-12. Herein, the term "substantially similar" means that the $IC_{50}$ or $K_d$ value of the antibody described herein is comparable to that of the reference antibody, or is approximately 200%, 180%, 160%, 150%, 140%, 120%, 110%, 100%, 99%, 98%, 97%, 95%, 90%, 85%, 80%, 75%, 70%, 65%, or 50% of that of the reference antibody. In one embodiment, the reference antibody includes, for example, an antibody having a heavy chain and light chain combination L1H1 or L2H2. In another embodiment, the reference antibody includes an ETA antibody A-1. In one embodiment, the ETA antibody described herein can specifically bind to human endothelin receptors and can reduce pulmonary arterial hypertension in animal models. In one embodiment, the pulmonary arterial hypertension is reduced by 2% compared to untreated animals. In another embodiment, the pulmonary arterial hypertension is reduced by about 5% compared to untreated animals. In another embodiment, the pulmonary arterial hypertension is reduced by about 10% compared to untreated animals. In another embodiment, the pulmonary arterial hypertension is reduced by about 15% compared to untreated animals. In another embodiment, the pulmonary arterial hypertension is reduced by about 20% compared to untreated animals. In another embodiment, the pulmonary arterial hypertension is reduced by about 25% compared to untreated animals. The amount of reduction in pulmonary arterial hypertension is controlled by the dose. For animal or human patients, the therapeutically effective dose is a dose that reduces the pulmonary arterial hypertension to the normal range.

TGF-β Trap

In one embodiment, the TGF-β Trap described herein is a protein that can block the function of TGF-β. In another embodiment, the TGF-β Trap described herein comprises the amino acid sequence: SEQ ID NO: 207. In another embodiment, the amino acid sequence of the TGF-β Trap described herein is: SEQ ID NO: 207.

Peptide Linker (Linker)

In one embodiment, the peptide linker (Linker) described herein comprises an amino acid sequence each independently selected from one of the following: SEQ ID NO: 208, SEQ ID NO: 209, and SEQ ID NO: 210.

In one embodiment, the amino acid sequence of the peptide linker described herein is: SEQ ID NO: 208. In another embodiment, the amino acid sequence of the peptide linker described herein is: SEQ ID NO: 209. In another embodiment, the amino acid sequence of the peptide linker described herein is: SEQ ID NO: 210.

Fusion Protein of an ETA Antibody and a TGF-β Trap

In one embodiment, the fusion protein of an ETA antibody and a TGF-β Trap provided herein comprises an ETA antibody described herein and a TGF-β Trap fragment.

In another embodiment, the fusion protein of an ETA antibody and a TGF-βTrap provided herein comprises an ETA antibody described herein, one, two, three, four, five, six, seven or eight TGF-β Traps and the same number of peptide linkers (Linkers); the fusion protein connects the amino terminal of a TGF-β Trap with the carboxyl terminal of a light chain or a heavy chain of the ETA antibody via a peptide linker sequence, or the fusion protein connects the carboxyl terminal of a TGF-βTrap with the amino terminal of a light chain or a heavy chain of the ETA antibody via a peptide linker sequence.

In another embodiment, the fusion protein of an ETA antibody and a TGF-βTrap provided herein comprises an ETA antibody described herein, one, two, three or four TGF-β Traps and the same number of peptide linkers (Linkers); the fusion protein connects the amino terminal of a TGF-β Trap with the carboxyl terminal of a light chain or a heavy chain of the ETA antibody via a peptide linker sequence, or the fusion protein connects the carboxyl terminal of a TGF-β Trap with the amino terminal of a light chain or a heavy chain of the ETA antibody via a peptide linker sequence.

In another embodiment, the fusion protein of an ETA antibody and a TGF-βTrap provided herein comprises an ETA antibody described herein, one or two TGF-β Traps and the same number of peptide linkers (Linkers); the fusion protein connects the amino terminal of a TGF-β Trap with the carboxyl terminal of a light chain or a heavy chain of the ETA antibody via a peptide linker sequence, or the fusion protein connects the carboxyl terminal of a TGF-β Trap with the amino terminal of a light chain or a heavy chain of the ETA antibody via a peptide linker sequence.

In another embodiment, the fusion protein of an ETA antibody and a TGF-βTrap provided herein comprises an ETA antibody described herein, two TGF-βTraps and two peptide linkers (Linkers); the fusion protein connects the amino terminal of a TGF-β Trap with the carboxyl terminal of a light chain or a heavy chain of the ETA antibody via a peptide linker sequence, or the fusion protein connects the carboxyl terminal of a TGF-β Trap with the amino terminal of a light chain or a heavy chain of the ETA antibody via a peptide linker sequence.

In one embodiment, the fusion protein of an ETA antibody and a TGF-β Trap provided herein connects the amino terminal of a TGF-β Trap with the carboxyl terminal of a light chain or a heavy chain of the ETA antibody via a peptide linker sequence. In another embodiment, the fusion protein of an ETA antibody and a TGF-β Trap provided herein connects the amino terminal of a TGF-β Trap with the carboxyl terminal of a light chain of the ETA antibody via a peptide linker sequence. In another embodiment, the fusion protein of an ETA antibody and a TGF-β Trap provided herein connects the amino terminal of a TGF-β Trap with the carboxyl terminal of a heavy chain of the ETA antibody via a peptide linker sequence.

In one embodiment, the fusion protein of an ETA antibody and a TGF-β Trap provided herein comprises amino acid sequences: SEQ ID NO: 162, SEQ ID NO: 190, SEQ ID NO: 207, and SEQ ID NO: 210.

In one embodiment, provided herein is the fusion protein of an ETA antibody and a TGF-β Trap, wherein the ETA antibody, TGF-β Trap and peptide linker sequence are fused to form the fusion protein in one of the following ways:

(3) via a peptide linker sequence, the amino terminal of a TGF-β Trap is connected with the carboxyl terminal of a heavy chain/light chain of the ETA antibody: N'-R-Linker-TGF-β Trap-C'; and (4) via a peptide linker sequence, the carboxyl terminal of a TGF-β Trap is connected with the amino terminal of a light chain or a heavy chain of the ETA antibody: N'-TGF-β Trap-Linker-R-C';

wherein N' represents the amino terminal of a polypeptide chain, C' represents the carboxyl terminal of a polypeptide chain, TGF-β Trap represents a TGF-β Trap fragment, R is the amino acid sequence of a light chain or a heavy chain of the ETA antibody, and Linker represents a peptide linker.

In one embodiment, the fusion protein of an ETA antibody and a TGF-β Trap provided herein comprises the amino acid sequence: SEQ ID NO: 211 or SEQ ID NO: 212. In another embodiment, the fusion protein of an ETA antibody and a TGF-β Trap provided herein comprises amino acid sequences: SEQ ID NO: 211 and SEQ ID NO: 212.

Biological Activity of the Fusion Protein of an ETA Antibody and a TGF-β Trap

The biological activity of the fusion protein of an ETA antibody and a TGF-βTrap comprises the biological activity of the TGF-β Trap and the biological activity of the ETA antibody. Antibody inhibitors of ETA can effectively block the increase in vascular pressure caused by endothelin to relieve the symptoms of pulmonary arterial hypertension and improve the patient's exercise capacity and hemodynamics. The "biological activity of the TGF-β Trap" means that the fusion protein of an ETA antibody and a TGF-β Trap binds to TGF-β in vivo and blocks the cellular stress response caused thereby, and exhibits the biological activity of therapeutic effects on, such as other related symptoms of pulmonary arterial hypertension, pulmonary hypertension and pulmonary fibrosis. The aforementioned cellular stress response includes, but is not limited to, lowering pulmonary arterial pressure, lowering aortic pressure, and related changes in cardiac and pulmonary vascular remodeling. Because of combining the biological activities of a TGF-β Trap and an ETA antibody, the TGF-β Trap fusion protein described herein can be used to treat a variety of conditions and diseases associated with TGF-β and ETA. The fusion protein exerts its biological effects by acting on TGF-β and/or ETA, and therefore, the TGF-β Trap fusion protein described herein can be used to treat subjects with conditions and diseases who respond favorably to "reduced TGF-β stimulation" or "reduced ETA stimulation". These subjects are referred to as subjects who "need reduced TGF-β stimulation" or "need reduced ETA stimulation". Other related symptoms of pulmonary arterial hypertension, pulmonary hypertension, pulmonary fibrosis and cardiovascular fibrosis are included.

In one embodiment, the change in the biological activity of the fusion protein of an ETA antibody or a TGF-β Trap is detected by a calcium flux test and a reporter gene detection method to quantify the function of the fusion protein of the ETA antibody or the TGF-β Trap to inhibit the ETA and block the TGF-β in vitro.

Pharmaceutical Composition

In one embodiment, provided herein is a pharmaceutical composition comprising the fusion protein of an ETA antibody and a TGF-β Trap provided herein and one or more pharmaceutically acceptable carriers.

In one embodiment, the pharmaceutical composition described herein is to be injected intravenously or subcutaneously.

Treatment Methods

In one embodiment, provided herein is the use of the fusion protein of an ETA antibody and a TGF-β Trap described herein in the preparation of a medicament for treating, preventing or improving pulmonary arterial hypertension and pulmonary arterial hypertension-related diseases.

In another embodiment, provided herein is the use of the fusion protein of an ETA antibody and a TGF-β Trap described herein in the preparation of a medicament for treating, preventing or improving pulmonary hypertension and pulmonary hypertension-related diseases.

In another embodiment, provided herein is the use of the fusion protein of an ETA antibody and a TGF-β Trap described herein in the preparation of a medicament for treating, preventing or improving pulmonary fibrosis and pulmonary fibrosis-related diseases.

In another embodiment, provided herein is the use of the fusion protein of an ETA antibody and a TGF-β Trap described herein in the preparation of a medicament for treating, preventing or improving cardiovascular fibrosis and cardiovascular fibrosis-related diseases.

In a further embodiment, provided herein is the use of the fusion protein of an ETA antibody and a TGF-β Trap described herein in the preparation of a medicament for simultaneously treating, preventing or improving two or more diseases of pulmonary arterial hypertension, pulmonary hypertension, pulmonary fibrosis or cardiovascular fibrosis.

Herein, the term "subject" refers to mammals, including humans, and is used interchangeably with the term "patient".

The term "treatment" includes alleviating at least one symptom or other aspects of a condition, or alleviating the severity of the condition. The fusion protein of an ETA antibody and a TGF-β Trap provided herein can constitute an effective therapeutic agent without the need to produce a complete cure effect or eradicate all symptoms or manifestations of a condition. As recognized in the related art, a drug as a therapeutic agent can be used to reduce the severity of a given condition state, but does not need to eliminate all manifestations of the condition to be considered as an effective therapeutic agent. Similarly, prophylactic administration treatment does not need to be completely effective in preventing the appearance of symptoms to constitute an effective prophylactic agent. It is sufficient to reduce the impact of the condition (e.g., by reducing the number or severity of symptoms thereof, or by enhancing another treatment effect, or by producing another effective effect), or to reduce the likelihood of occurrence or aggravation of the condition in subjects. One embodiment herein relates to a method comprising giving a fusion protein of an ETA antibody and a TGF-β Trap to a patient in an amount and time sufficient to induce the continuous improvement of an indicator that reflects the severity of the specific disease above the baseline level.

The pharmaceutical composition of the fusion protein of an ETA antibody and a TGF-β Trap can be administered by any appropriate technique including but not limited to parenteral, topical or inhalation administration. In the case of injection, a pharmaceutical composition can be administered by, for example, intra-articular, intravenous, intramuscular, intralesional, intraperitoneal or subcutaneous route, as a rapid injection or continuous infusion. For example, local administration at the site of condition or injury may be considered, such as transdermal administration and sustained release administration of implants. Inhalation administration includes, for example, nasal or oral inhalation, sprays, inhalation of antibodies in the form of aerosols, and the like. Other options include oral formulations including tablets, syrups or lozenges.

It is advantageous to administer the fusion protein of an ETA antibody and a TGF-β Trap provided herein in the form of a composition comprising one or more other components, such as a physiologically acceptable carrier, excipient or diluent. The composition may optionally additionally comprise one or more physiologically active agents as described below. In various particular embodiments, the composition comprises one, two, three, four, five or six physiologically active agents other than one or more fusion proteins of an antibody (such as a murine antibody or a humanized antibody) and a TGF-βprovided herein.

In one embodiment, the pharmaceutical composition comprises the fusion protein of a murine antibody or a humanized antibody and a TGF-β Trap provided herein, and one or more substances selected from: buffers with pH suitable for the fusion protein of an antibody and a TGF-β Trap, antioxidants such as ascorbic acid, low molecular weight polypeptides (such as polypeptides comprising less than 10 amino acids), proteins, amino acids, carbohydrates such as dextrin, complexes such as EDTA, glutathione, stabilizers and excipients. According to appropriate industry standards, preservatives may also be added. The composition can be formulated into a freeze-dried powder using a suitable excipient solution as a diluent. Appropriate components are non-toxic to recipients at the dosage and concentration used. Further examples of components that can be used in pharmaceutical prescriptions are described in Remington's Pharmaceutical Sciences, 16th edition (1980) and 20th edition (2000). Mack Publishing Company provides a kit for use by medical practitioners, which includes one or more fusion proteins of an antibody and a TGF-β Trap provided herein, and tags or other instructions for treating any of the diseases discussed herein. In one embodiment, the kit includes a sterile preparation of one or more fusion proteins of an antibody and a TGF-β Trap in one or more tube-type bottles in the form of the above-mentioned composition.

The dosage and frequency of administration can vary based on the following factors: the route of administration, the fusion protein of the specific antibody and a TGF-β Trap used, the nature and severity of the disease to be treated, whether the symptoms are acute or chronic, and the size and overall symptoms of the patient. The appropriate dose can be determined by methods well known in the art, for example, dose scaling studies in clinical trials.

The fusion proteins of an antibody and a TGF-β Trap provided herein can be administered, for example, once or several times at regular intervals over a period of time. In particular embodiments, the fusion protein of a murine antibody or a humanized antibody and a TGF-β Trap is administered once in at least one month or longer, for example, one, two, or three months or even indefinitely. For the treatment of chronic symptoms, long-term treatment is usually the most effective. However, for the treatment of acute symptoms, short-term administration, for example, from one week to six weeks is sufficient. Generally, human antibodies are administered until the patient shows a medically relevant improvement of the selected sign or an indicator above the baseline level.

An example of the treatment regimen provided herein includes subcutaneous injection of the fusion protein of an antibody and a TGF-β Trap at an appropriate dose once a week or longer to treat symptoms of pulmonary arterial hypertension, pulmonary hypertension, pulmonary fibrosis and cardiovascular fibrosis. The fusion protein of an antibody and a TGF-β Trap can be administered weekly or monthly until the desired result is achieved, for example, the patient's symptoms disappear. The treatment can be renewed as needed, or, alternatively, a maintenance dose can be administered.

The patient's pulmonary arterial pressure can be monitored before, during and/or after treatment with the fusion protein of an antibody and a TGF-β Trap to detect any changes in the pressure. For some diseases, changes in pulmonary arterial pressure can vary with factors such as disease progression. Pulmonary arterial pressure can be measured by known techniques.

Particular embodiments of the methods and compositions provided herein involve the use of, for example, the fusion protein of an antibody and a TGF-β Trap and one or more endothelin antagonists, two or more fusion proteins of an antibody and a TGF-β Trap provided herein, or the fusion protein of an antibody and a TGF-β Trap provided herein and one or more other endothelin antagonists. In a further embodiment, the fusion protein of an antibody and a TGF-β Trap provided herein is administered alone or in combination with other agents for treating distressing symptoms of the patient. Examples of these agents include proteins and non-protein drugs. When multiple drugs are administered in combination, the dosage thereof should be adjusted accordingly as is well known in the art. "Combined administration" combination therapy is not limited to simultaneous administration, and also includes a treatment regimen in which the antigen and protein are administered at least once during a course of treatment involving the administration of at least one other therapeutic agent to the patient.

In another aspect, provided herein is a method for treating the symptoms of pulmonary arterial hypertension, pulmonary hypertension, and pulmonary fibrosis, comprising using a mixture of the fusion protein of an antibody and a TGF-β Trap provided herein and pharmaceutically acceptable excipients for treating related diseases of the above-mentioned conditions. The method for preparing the agents is as described above.

Further provided herein are compositions, kits and methods related to the fusion protein of an antibody that can specifically bind to human ETA and a TGF-β Trap. Provided are nucleic acid sequences and derivatives and fragments thereof, comprising polynucleotide sequences encoding all or part of the fusion protein of a human ETA-binding antibody and a TGF-β Trap, such as nucleic acid sequences encoding all or part of the fusion protein of a human ETA-binding antibody, an antibody fragment, an antibody derivative and a TGF-β Trap. Further provided herein is a vector comprising the nucleic acid sequence, and a cell comprising the nucleic acid and/or the vector. The methods provided include, for example, methods for preparing, identifying or isolating the fusion protein of a human ETA-binding antibody and a TGF-β Trap, methods for determining whether the fusion protein of a human ETA-binding antibody and a TGF-β Trap can still bind to ETA, methods for determining the signaling caused by the fusion protein of a human ETA-binding antibody and a TGF-βblocking TGF-β, and methods for administering the fusion protein of a human ETA-binding antibody and a TGF-β Trap to model animals to measure the biological activity in vivo.

The following specific examples are used to further illustrate the technical solutions herein.

Herein, unless otherwise specified, the raw materials, equipment and the like used can all be purchased from the market or are commonly used in the art. The methods in the following examples, unless otherwise specified, are conventional methods in the art.

1. Cloning and Subcloning of Antibody Genes

Hybridoma cells secreting antibodies are collected, and according to the manufacturer protocol of QIAGEN mRNA extraction kit, the mRNA of the hybridoma cells is extracted. Then the extracted mRNA is transcribed reversely into cDNA. The reverse transcription primers are specific primers for the light and heavy chain constant regions of a mouse, with the heavy chain reverse transcription primer being (5'-TTTGGRGGGAAGATGAAGAC-3') (SEQ ID NO:

199), and the light chain reverse transcription primers being (5'-TTAACACTCTCCCCTGTTGAA-3') (SEQ ID NO: 200) and (5'-TTAACACTCATTCCTGTTGAA-3') (SEQ ID NO: 201). The reaction conditions of RT-PCR are: 25° C., 5 min (minutes); 50° C., 60 min; 70° C., 15 min. The reversely-transcribed cDNA is diluted to 500 μL with 0.1 mM TE, added to an ultrafiltration centrifuge tube (Amicon Ultra-0.5), and centrifuged at 2000 g for 10 min; the filtrate is discarded, and 500 μL of 0.1 mM TE is added and centrifuged at 2000 g for 10 min; the filtrate is discarded, and the preparation tube is inverted into a new centrifuge tube and centrifuged at 2000 g for 10 min to obtain purified cDNA; 10 μL of the purified cDNA is taken as a template, and 4 μL of 5×tailing buffer (Promega, commercially available), 4 μL of dATP (1 mM) and 10 U of terminal transferase (Promega, commercially available) are added, mixed well, and incubated at 37° C. for 5 min and then at 65° C. for 5 min; and then the cDNA with PolyA tail is used as a template to amplify the genes of the light and heavy chain variable regions of the antibody by PCR. Upstream primers are all OligodT, and the heavy chain downstream primers are (5'-TGGACAGGGATCCAGAGTTCC-3') (SEQ ID NO: 202) and (5'-TGGACAGGGCTCCATAGTTCC-3') (SEQ ID NO: 203), and the light chain downstream primer is (5'-ACTCGTCCTTGGTCAACGTG-3') (SEQ ID NO: 204). The reaction conditions of PCR are: 95° C., 5 min; 95° C., 30 s (seconds), 56° C., 30 s, 72° C., 1 min, 40 cycles; 72° C., 7 min. The PCR product is ligated to the PMD 18-T vector (Takara Bio, commercially available) and then sequenced. The CDR sequences of the cloned antibody are shown in Table 1 and Table 2.

PCR primers are designed based on the sequenced DNA sequences of the antibody, and thus the complete light chain and heavy chain signal peptides and variable domains and mouse IgG1 constant region are connected with the expression vector pTM5.

2. Preparation of the Expression Plasmid for the Gene of the Antibody Fusion Protein Human TGF-β Trap (hTGF-β Trap) gene sequences are fused to the C-terminus of the heavy chain of an anti-ETA antibody by the overlapping PCR method. The Nhe1 restriction enzyme site is added to the 5'end of the heavy chain variable region of the fusion protein and the Not1 restriction enzyme site is added to the 3'end of the fusion protein by PCR primers, so that the complete heavy chain and the hTGF-β Trap fusion protein gene are loaded into the expression vector pTM5; similarly, the Nhe1 restriction enzyme site is added to the 5'end of the light chain variable region, and the Bsiw1 restriction enzyme site is added to the 3'end thereof, so that the complete light chain variable region sequence is connected to the expression vector pTM5 that has been loaded with the light chain constant region.

3. Transient Expression of the Antibody Fusion Protein $5\times10^5$/mL suspended HEK293 or CHO expressing cell lines are inoculated into a spinner flask, and cultured under rotation for 24 h (hours) at 37° C. and 5% $CO_2$ to reach a density of $1\times10^6$/mL, and then used for transfection. During the transfection process, polyethylenimine (PEI) is used as a transfection medium, and mixed with DNA (the amount of DNA is 0.5 μg per $1\times10^6$ cells, wherein the ratio of the light chain to the heavy chain of an antibody is 3:2), wherein the preferred ratio of PEI to DNA is 3:1. The mixture of the two is added to the cell culture after 15 minutes of standing incubation. After receiving the mixture of PEI and DNA, the cells are cultured under rotation for 24 h at 37° C. and 5% $CO_2$, and then 0.5% tryptone is added to the cell culture solution as an additive required for expression, and finally the cell supernatant is collected after the completion of the expression (above 96 h) for the purification and separation of antibodies.

4. Purification and Separation of the Antibody Fusion Protein

The collected cell supernatant is centrifuged at high speed (8000 rpm, 15 min) to remove cells and cell debris, and then filtered and clarified with a 0.45 μm filter membrane. The clarified supernatant is used for purification. The purification process is completed by a chromatograph. The supernatant first flows through the Protein G affinity chromatography column, during which the antibody contained in the supernatant binds to the ligand of the Protein G affinity chromatography column and is retained in the column. Then an elution buffer with low pH value (less than or equal to 3.0) is used to wash the chromatography column to dissociate the antibody bound thereto, and the collected antibody eluate with low pH value is quickly neutralized with 1 M Tris-HCl to protect the antibody from inactivation. The resulting antibody fusion protein eluate is replaced with a PBS buffer system after 16 h of dialysis.

5. Calcium Flow Test Detects the Biological Activity of the Fusion Protein of an ETA Antibody and a TGF-β Trap Blocking ETA In Vitro CHO-DHFR cells co-expressing hETA-Aequorin are inoculated with 25000 cells per well to a black 96-well cell culture plate, and cultured overnight at 37° C. On the next day, the cell supernatant is removed, and 50 μl of the substrate coelenterazine h (Promega, commercially available) is added and incubated for 2 h in the dark, and then 50 μl of the purified antibody or fusion protein is added and incubated for 30 min. An autosampler is used to perfuse Endothelin 1 on the SpectraMax L microplate reader of Molecular Devices. The instantaneous calcium flow change is detected within 40 s, and the peak time and peak value are recorded. As shown in FIG. 1, the ETA antibody and the fusion protein of an ETA antibody and a TGF-β Trap can both effectively inhibit the intracellular $Ca^{2+}$ changes mediated by human ETA.

Figure 2:
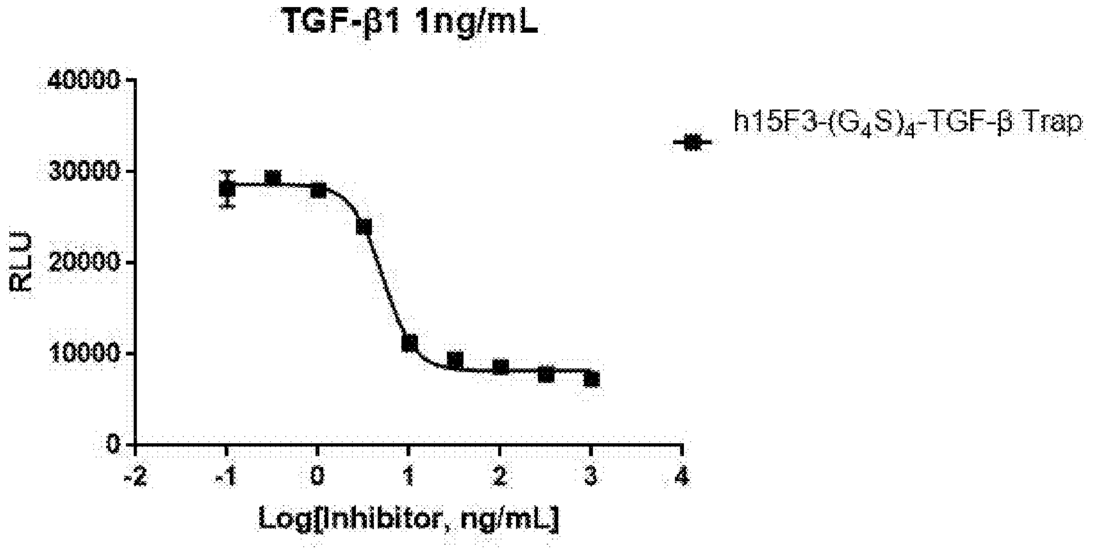
FIG. 2 shows the results of the fusion protein hi5F3-$(G_4S)_4$-TGF-β Trap of an ETA antibody and a TGF-β Trap blocking TGF-β1 from activating a TGF-β1 receptor.

6. Reporter Gene Experiment Detects the Fusion Protein of an ETA Antibody and a TGF-β Trap Blocking the TGF-β Signaling Pathway In Vitro 4T1 cells stably expressing SBE-Luciferase are inoculated with 34000 cells per well to a 96-well cell culture plate, and cultured overnight at 37° C. On the second day, 3 ng/ml TGF-β1 and the gradiently diluted fusion protein of an ETA antibody and a TGF-β Trap are pre-incubated in an equal volume for 30 min at room temperature. During the pre-incubation period, the medium supernatant is removed from the 96-well cell culture plate, and the cell surface is washed twice with a serum-free medium, and the remaining liquid is aspirated. 100 μL of the pre-reacted reaction solution is added to the 96-well cell culture plate, and the mixture is incubated at 37° C. for 6 hours. After the incubation, 100 μL Bright Glo chemiluminescent substrate (Promega) is added, and finally the cell lysate is transferred to a white 96-well plate, and the relative fluorescence intensity is read on the SpectraMax L microplate reader (Molecular Devices). FIG. 2 shows the inhibitory curve of the reporter gene experiment that detects the fusion protein of an ETA antibody and a TGF-β Trap blocking TGF-β1 from activating a TGF-β1 receptor.

Figure 3:
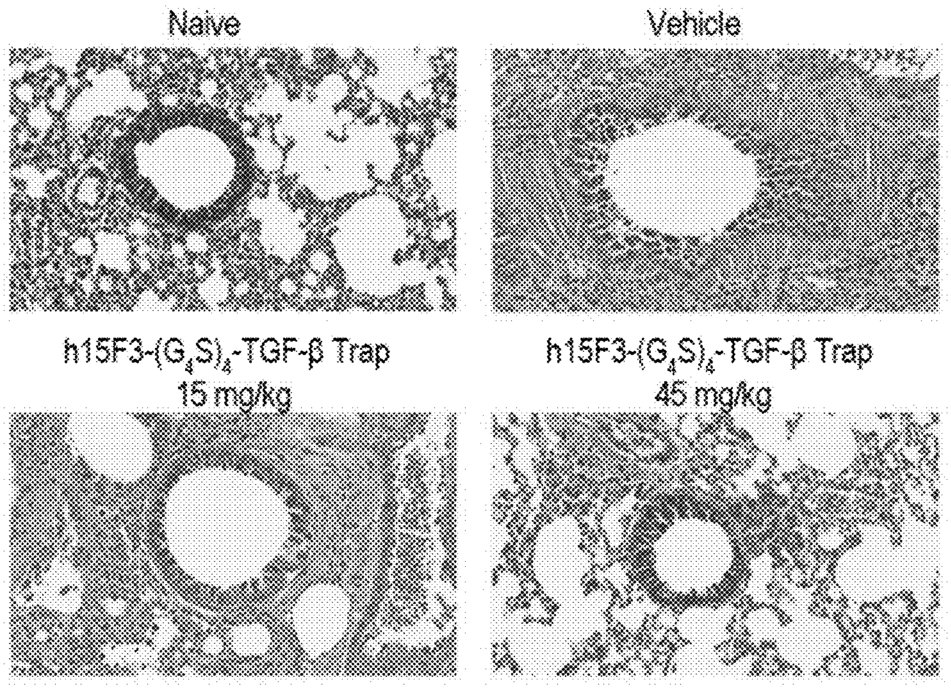
FIG. 3 shows that the fusion protein h15F3-$(G_4S)_4$-TGF-β Trap of an ETA antibody and a TGF-β Trap has a significantly improved effect on pulmonary fibrosis.
Figure 4:
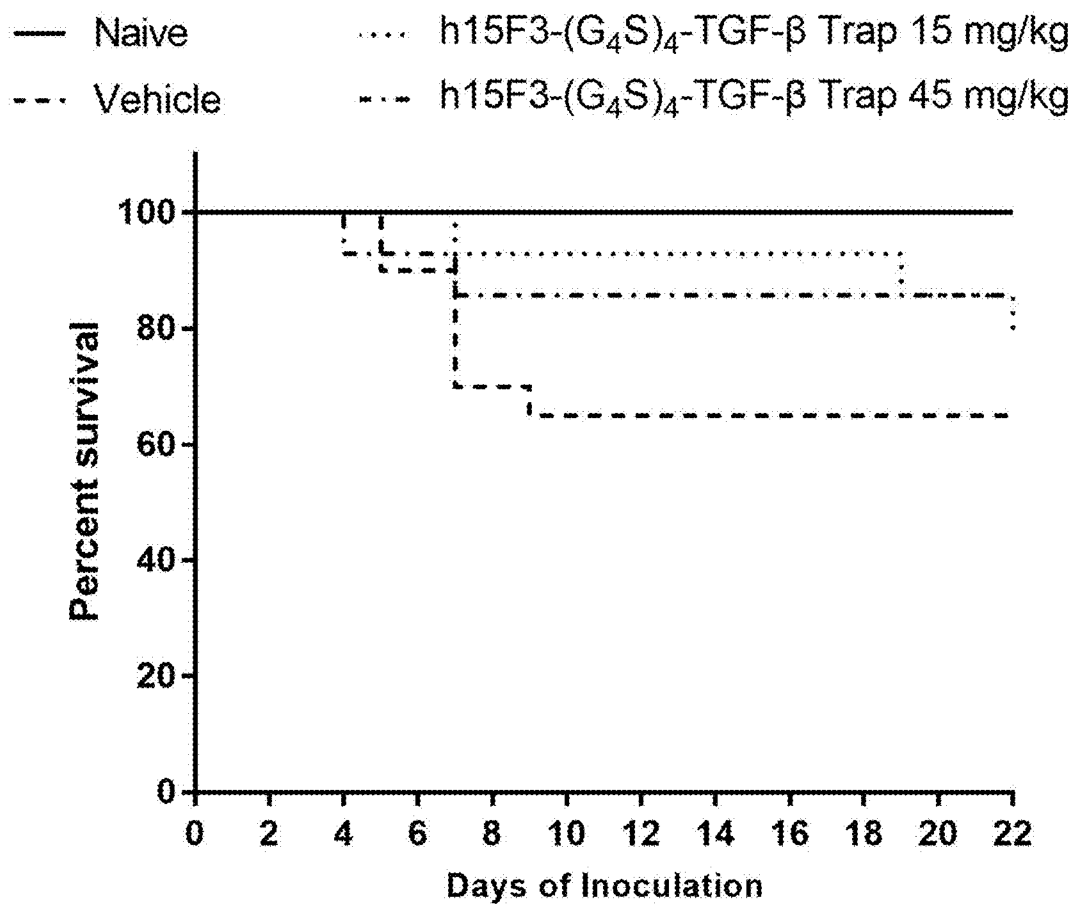
FIG. 4 shows that the fusion protein h15F3-$(G_4S)_4$-TGF-β Trap of an ETA antibody and a TGF-β Trap can significantly improve the survival rate/survival period of mice with pulmonary fibrosis.

7. In Vivo Activity of the Antibody Fusion Protein on Bleomycin-Induced Pulmonary Fibrosis in C57BL/6 Mice Bleomycin (BLM) is administered via the trachea to induce a normal C57BL/6 mouse pulmonary fibrosis model (BPF), which is used to evaluate the effect of intraperitoneal injection of hi5F3-$(G_4S)_4$-TGF-β Trap in the treatment of pulmonary fibrosis in this model. The mice are anesthetized with 2% isoflurane and fixed on the experimental table in the supine position, and an indwelling needle tube is quickly inserted into the trachea thereof. A 100 μL micro-syringe is taken to draw a certain amount of physiological saline solution (normal control group) or bleomycin solution (2.5 mg/kg) according to the body weight, and inserted through the indwelling needle tube into the cartilage ring space to inject the medical solution slowly into the trachea at a dose of 50 L/20 g. After the injection, the mice are quickly erected and rotated to make the medical solution evenly distributed in the lungs. The animals are randomly grouped according to the body weight thereof, with 12 in the normal group, 20 in the model group, and 14 in each of the h15F3-$(G_4S)_4$-TGF-β Trap low-dose and high-dose groups. The h15F3-$(G_4S)_4$-TGF-β Trap or a blank preparation is administered according to the protocol one day after modeling, and administered continuously for 3 weeks. The efficacy of the drug is evaluated by indicators such as animal survival and lung lesions. As shown in FIG. 3, in the model group, according to the Masson staining of lung pathology, most of the alveolar structure disappears, the alveolar septum is widened, and a large amount of collagen fibers are deposited, indicating that the bleomycin tracheal administration successfully induces pulmonary fibrosis in normal C57BL/6 mice; and h15F3-$(G_4S)_4$-TGF-β Trap low-dose and high-dose groups have a significant improvement effect on the above-mentioned pulmonary fibrosis indicators, and the dose-effect relationship is obvious. In addition, as shown in FIG. 4, h15F3-$(G_4S)_4$-TGF-β Trap treatment can prolong the survival time of mice, indicating that the drug can inhibit the process of pulmonary fibrosis.

The above-mentioned embodiments are only preferred solutions of the present invention which should not be construed as limiting the present invention in any way, and there are other variants and modifications as long as not beyond the scope of the technical solutions defined in the claims.

The invention claimed is:

1. A fusion protein of an anti-endothelin A receptor (anti-ETA) antibody and a transforming growth factor β (TGF-β) Trap or a fragment thereof, structurally characterized in that the fusion protein comprises an anti-ETA antibody and a TGF-β Trap or a fragment thereof, wherein the TGF-β Trap or fragment thereof comprises the amino acid sequence of SEQ ID NO: 207, and the anti-ETA antibody comprises:

(a) light chain CDR1 amino acid sequence: SEQ ID NO: 8;
light chain CDR2 amino acid sequence: SEQ ID NO: 32;
light chain CDR3 amino acid sequence: SEQ ID NO: 50 or SEQ ID NO: 205;
heavy chain CDR1 amino acid sequence: SEQ ID NO: 70;
heavy chain CDR2 amino acid sequence: SEQ ID NO: 92; and
heavy chain CDR3 amino acid sequence: SEQ ID NO: 116;

(b) light chain CDR1 amino acid sequence: SEQ ID NO: 10;
light chain CDR2 amino acid sequence: SEQ ID NO: 34;
light chain CDR3 amino acid sequence: SEQ ID NO: 52;
heavy chain CDR1 amino acid sequence: SEQ ID NO: 72;
heavy chain CDR2 amino acid sequence: SEQ ID NO: 94; and
heavy chain CDR3 amino acid sequence: SEQ ID NO: 118;

(c) light chain CDR1 amino acid sequence: SEQ ID NO: 12;
light chain CDR2 amino acid sequence: SEQ ID NO: 36;
light chain CDR3 amino acid sequence: SEQ ID NO: 54;
heavy chain CDR1 amino acid sequence: SEQ ID NO: 74;
heavy chain CDR2 amino acid sequence: SEQ ID NO: 96; and
heavy chain CDR3 amino acid sequence: SEQ ID NO: 120;

(d) light chain CDR1 amino acid sequence: SEQ ID NO: 14;
light chain CDR2 amino acid sequence: SEQ ID NO: 38;
light chain CDR3 amino acid sequence: SEQ ID NO: 56;
heavy chain CDR1 amino acid sequence: SEQ ID NO: 76;
heavy chain CDR2 amino acid sequence: SEQ ID NO: 98; and
heavy chain CDR3 amino acid sequence: SEQ ID NO: 122;

(e) light chain CDR1 amino acid sequence: SEQ ID NO: 16;
light chain CDR2 amino acid sequence: SEQ ID NO: 40;
light chain CDR3 amino acid sequence: SEQ ID NO: 58;
heavy chain CDR1 amino acid sequence: SEQ ID NO: 78;
heavy chain CDR2 amino acid sequence: SEQ ID NO: 100; and
heavy chain CDR3 amino acid sequence: SEQ ID NO: 124;

(f) light chain CDR1 amino acid sequence: SEQ ID NO: 18;
light chain CDR2 amino acid sequence: SEQ ID NO: 42;
light chain CDR3 amino acid sequence: SEQ ID NO: 60;
heavy chain CDR1 amino acid sequence: SEQ ID NO: 80;
heavy chain CDR2 amino acid sequence: SEQ ID NO: 102; and
heavy chain CDR3 amino acid sequence: SEQ ID NO: 126;

(g) light chain CDR1 amino acid sequence: SEQ ID NO: 20;
light chain CDR2 amino acid sequence: SEQ ID NO: 44;
light chain CDR3 amino acid sequence: SEQ ID NO: 62;
heavy chain CDR1 amino acid sequence: SEQ ID NO: 82;
heavy chain CDR2 amino acid sequence: SEQ ID NO: 104; and
heavy chain CDR3 amino acid sequence: SEQ ID NO: 128;

(h) light chain CDR1 amino acid sequence: SEQ ID NO: 22;
light chain CDR2 amino acid sequence: SEQ ID NO: 44;
light chain CDR3 amino acid sequence: SEQ ID NO: 62;
heavy chain CDR1 amino acid sequence: SEQ ID NO: 82;
heavy chain CDR2 amino acid sequence: SEQ ID NO: 106; and
heavy chain CDR3 amino acid sequence: SEQ ID NO: 128;

(i) light chain CDR1 amino acid sequence: SEQ ID NO: 24;
light chain CDR2 amino acid sequence: SEQ ID NO: 44;
light chain CDR3 amino acid sequence: SEQ ID NO: 62;
heavy chain CDR1 amino acid sequence: SEQ ID NO: 84;
heavy chain CDR2 amino acid sequence: SEQ ID NO: 108; and
heavy chain CDR3 amino acid sequence: SEQ ID NO: 130;

(j) light chain CDR1 amino acid sequence: SEQ ID NO: 26;
light chain CDR2 amino acid sequence: SEQ ID NO: 46;
light chain CDR3 amino acid sequence: SEQ ID NO: 64;
heavy chain CDR1 amino acid sequence: SEQ ID NO: 86;
heavy chain CDR2 amino acid sequence: SEQ ID NO: 110; and
heavy chain CDR3 amino acid sequence: SEQ ID NO: 132;

(k) light chain CDR1 amino acid sequence: SEQ ID NO: 28;
light chain CDR2 amino acid sequence: SEQ ID NO: 46;

light chain CDR3 amino acid sequence: SEQ ID NO: 66;

heavy chain CDR1 amino acid sequence: SEQ ID NO: 88;

heavy chain CDR2 amino acid sequence: SEQ ID NO: 112; and heavy chain CDR3 amino acid sequence: SEQ ID NO: 134; or (l) light chain CDR1 amino acid sequence: SEQ ID NO: 30;

light chain CDR2 amino acid sequence: SEQ ID NO: 48;

light chain CDR3 amino acid sequence: SEQ ID NO: 68;

heavy chain CDR1 amino acid sequence: SEQ ID NO: 90;

heavy chain CDR2 amino acid sequence: SEQ ID NO: 114; and heavy chain CDR3 amino acid sequence: SEQ ID NO: 136.

2. The fusion protein of claim 1, wherein the anti-ETA antibody comprises:

light chain CDR1 amino acid sequence: SEQ ID NO: 8;

light chain CDR2 amino acid sequence: SEQ ID NO: 32;

light chain CDR3 amino acid sequence: SEQ ID NO: 50 or SEQ ID NO: 205;

heavy chain CDR1 amino acid sequence: SEQ ID NO: 70;

heavy chain CDR2 amino acid sequence: SEQ ID NO: 2; and heavy chain CDR3 amino acid sequence: SEQ ID NO: 116.

3. The fusion protein of claim 1, wherein the anti-ETA antibody comprises a combination of amino acid sequences independently selected from the group consisting of SEQ ID NO: 138 and SEQ ID NO: 166, SEQ ID NO: 140 and SEQ ID NO: 168, SEQ ID NO: 142 and SEQ ID NO: 170, SEQ ID NO: 144 and SEQ ID NO: 172, SEQ ID NO: 146 and SEQ ID NO: 174, SEQ ID NO: 148 and SEQ ID NO: 176, SEQ ID NO: 150 and SEQ ID NO: 178, SEQ ID NO: 152 and SEQ ID NO: 180, SEQ ID NO: 154 and SEQ ID NO: 182, SEQ ID NO: 156 And SEQ ID NO: 184, SEQ ID NO: 158 and SEQ ID NO: 186, SEQ ID NO: 160 and SEQ ID NO: 188, SEQ ID NO: 162 and SEQ ID NO: 190, and SEQ ID NO: 164 and SEQ ID NO: 192.

4. The fusion protein of claim 1, wherein the anti-ETA antibody comprises a combination of the amino acid sequences SEQ ID NO: 138 and SEQ ID NO: 166.

5. The fusion protein of claim 1, wherein the anti-ETA antibody comprises a combination of the amino acid sequences SEQ ID NO: 162 and SEQ ID NO: 190.

6. The fusion protein of claim 1, wherein the anti-ETA antibody comprises one or two amino acid sequences, wherein each amino acid sequence is independently selected from the group consisting of:

a. a light chain constant region amino acid sequence selected from the group consisting of: SEQ ID NO: 194 and SEQ ID NO: 196;

b. a heavy chain constant region amino acid sequence selected from the group consisting of: SEQ ID NO: 198 and SEQ ID NO: 206.

7. The fusion protein of claim 1, wherein the anti-ETA antibody has one or more of the following properties:

a. providing the same or better $K_d$ as or than a reference anti-ETA antibody when binding to human endothelin receptor ETA;

b. providing the same or better $IC_{50}$ as or than a reference anti-ETA antibody when inhibiting the activation of human endothelin receptor ETA by endothelin; and c. cross-competing binding with a reference anti-ETA antibody to human endothelin receptor ETA, wherein optionally the reference anti-ETA antibody comprises the antibody of claim 1; and/or wherein optionally the reference anti-ETA antibody comprises a combination of the light chain variable domain amino acid sequence SEQ ID NO: 138 and the heavy chain variable domain amino acid sequence SEQ ID NO: 166, or a combination of the light chain variable domain amino acid sequence SEQ ID NO: 162 and the heavy chain variable domain amino acid sequence SEQ ID NO: 190.

8. The fusion protein of claim 1 wherein the anti-ETA antibody is a murine anti-ETA antibody or a humanized anti-ETA antibody;

wherein the anti-ETA antibody is an anti-ETA monoclonal antibody; and/or wherein the anti-ETA antibody has an $IC_{50}$ value of approximately 1 nM to 200 nM or 10 nM to 100 nM in reducing human endothelin signal transduction.

9. The fusion protein of claim 1, wherein either the amino terminal of the TGF-β Trap is connected with the carboxyl terminal of a light chain or a heavy chain of the anti-ETA antibody via a peptide linker, or the carboxyl terminal of the TGF-β Trap is connected with the amino terminal of a light chain or a heavy chain of the anti-ETA antibody via a peptide linker.

10. The fusion protein of claim 9, wherein the fusion protein further comprises one, two, three or four additional TGF-β Traps, wherein optionally the fusion protein comprises two TGF-β Traps, and two peptide linkers.

11. The fusion protein of claim 9, wherein the fusion protein comprises the amino acid sequences of:

(1) SEQ ID NO: 8, SEQ ID NO: 32, SEQ ID NO: 50, SEQ ID NO: 70, SEQ ID NO: 92, and SEQ ID NO: 116; or (2) SEQ ID NO: 8, SEQ ID NO: 32, SEQ ID NO: 205, SEQ ID NO: 70, SEQ ID NO: 92, and SEQ ID NO: 116.

12. The fusion protein of claim 9, wherein the fusion protein comprises the amino acid sequences of: SEQ ID NO: 162, SEQ ID NO: 190, SEQ ID NO: 207, and SEQ ID NO: 210.

13. The fusion protein of claim 9, wherein the anti-ETA antibody, the TGF-β Trap and the peptide linker are fused to form the fusion protein in one of the following ways:

(1) via the peptide linker, wherein the amino terminal of the TGF-β Trap is connected with the carboxyl terminal of a heavy chain/light chain of the anti-ETA antibody: N'-R-Linker-TGF-β Trap-C'; and (2) via the peptide linker, wherein the carboxyl terminal of the TGF-β Trap is connected with the amino terminal of a light chain or a heavy chain of the anti-ETA antibody: N'-TGF-β Trap-Linker-R-C';

wherein N' represents the amino terminal of a polypeptide chain, C' represents the carboxyl terminal of a polypeptide chain, TGF-β Trap represents the TGF-β Trap fragment, R represents the amino acid sequence of a light chain or a heavy chain of the anti-ETA antibody, and Linker represents the peptide linker.

14. The fusion protein of claim 9, wherein the peptide linker (Linker) comprises an amino acid sequence independently selected from the group consisting of: SEQ ID NO: 208, SEQ ID NO: 209, and SEQ ID NO: 210.

15. The fusion protein of claim 14, wherein the peptide linker (Linker) comprises the amino acid sequence SEQ ID NO: 210.

16. A pharmaceutical composition comprising the fusion protein of claim 1 and a pharmaceutically acceptable carrier.

17. A method for preventing, improving, or treating a disease selected from the group consisting of pulmonary arterial hypertension, pulmonary hypertension, pulmonary fibrosis, and cardiovascular fibrosis, comprising administering the pharmaceutical composition of claim 16 to a patient having the disease.

18. The method of claim 17, wherein the pharmaceutical composition is to be injected intravenously or subcutaneously.

19. A method for preventing, improving, or treating two or more diseases selected from the group consisting of: pulmonary arterial hypertension, pulmonary hypertension, pulmonary fibrosis or cardiovascular fibrosis, comprising administering the pharmaceutical composition of claim 16 to a patient having the diseases.

* * * * *

SEQUENCE LISTING

<160> NUMBER OF SEQ ID NOS: 212

<210> SEQ ID NO 1
<211> LENGTH: 1868
<212> TYPE: DNA
<213> ORGANISM: Homo sapiens

<400> SEQUENCE: 1
gaattcggga aaaagtgaag gtgtaaaagc agcacaagtg caataagaga tatttcctca 60
aatttgcctc aagatggaaa ccctttgcct cagggcatcc ttttggctgg cactggttgg 120
atgtgtaatc agtgataatc ctgagagata cagcacaaat ctaagcaatc atgtggatga 180
tttcaccact tttcgtggca cagagctcag cttcctggtt accactcatc aacccactaa 240
tttggtccta cccagcaatg gctcaatgca caactattgc ccacagcaga ctaaaattac 300
ttcagctttc aaatacatta acactgtgat atcttgtact attttcatcg tgggaatggt 360
ggggaatgca actctgctca ggatcattta ccagaacaaa tgtatgagga atggccccaa 420
cgcgctgata gccagtcttg cccttggaga ccttatctat gtggtcattg atctccctat 480
caatgtattt aagctgctgg ctgggcgctg gccttttgat cacaatgact ttggcgtatt 540
tctttgcaag ctgttcccct ttttgcagaa gtcctcggtg gggatcaccg tcctcaacct 600
ctgcgctctt agtgttgaca ggtacagagc agttgcctcc tggagtcgtg ttcagggaat 660
tgggattcct ttggtaactg ccattgaaat tgtctccatc tggatcctgt cctttatcct 720
ggccattcct gaagcgattg gcttcgtcat ggtacccttt gaatataggg gtgaacagca 780
taaaacctgt atgctcaatg ccacatcaaa attcatggag ttctaccaag atgtaaagga 840
ctggtggctc ttcgggttct atttctgtat gcccttggtg tgcactgcga tcttctacac 900
cctcatgact tgtgagatgt tgaacagaag gaatggcagc ttgagaattg ccctcagtga 960
acatcttaag cagcgtcgag aagtggcaaa aacagttttc tgcttggttg taatttttgc 1020
tctttgctgg ttccctcttc atttaagccg tatattgaag aaaactgtgt ataacgagat 1080
ggacaagaac cgatgtgaat tacttagttt cttactgctc atggattaca tcggtattaa 1140
cttggcaacc atgaattcat gtataaaccc catagctctg tattttgtga gcaagaaatt 1200
taaaaattgt ttccagtcat gcctctgctg ctgctgttac cagtccaaaa gtctgatgac 1260
ctcggtcccc atgaacggaa caagcatcca gtggaagaac cacgatcaaa acaaccacaa 1320

```
cacagaccgg agcagccata aggacagcat gaactgacca cccttagaag cactcctcgg   1380

tactcccata atcctctcgg agaaaaaaat cacaaggcaa ctgtgagtcc gggaatctct   1440

tctctgatcc ttcttcctta attcactccc acacccaaga agaaatgctt tccaaaaccg   1500

caagggtaga ctggtttatc cacccacaac atctacgaat cgtacttctt taattgatct   1560

aatttacata ttctgcgtgt tgtattcagc actaaaaaat ggtgggagct gggggagaat   1620

gaagactgtt aaatgaaacc agaaggatat ttactacttt tgcatgaaaa tagagctttc   1680

aagtacatgg ctagctttta tggcagttct ggtgaatgtt caatgggaac tggtcaccat   1740

gaaactttag agattaacga caagattttc tacttttttt aagtgatttt tttgtccttc   1800

agccaaacac aatatgggct caagtcactt ttatttgaaa tgtcatttgg tgccagtatc   1860

ccgaattc                                                            1868


<210> SEQ ID NO 2
<211> LENGTH: 427
<212> TYPE: PRT
<213> ORGANISM: Homo sapiens

<400> SEQUENCE: 2

Met Glu Thr Leu Cys Leu Arg Ala Ser Phe Trp Leu Ala Leu Val Gly
1               5                   10                  15

Cys Val Ile Ser Asp Asn Pro Glu Arg Tyr Ser Thr Asn Leu Ser Asn
            20                  25                  30

His Val Asp Asp Phe Thr Thr Phe Arg Gly Thr Glu Leu Ser Phe Leu
        35                  40                  45

Val Thr Thr His Gln Pro Thr Asn Leu Val Leu Pro Ser Asn Gly Ser
    50                  55                  60

Met His Asn Tyr Cys Pro Gln Gln Thr Lys Ile Thr Ser Ala Phe Lys
65                  70                  75                  80

Tyr Ile Asn Thr Val Ile Ser Cys Thr Ile Phe Ile Val Gly Met Val
                85                  90                  95

Gly Asn Ala Thr Leu Leu Arg Ile Ile Tyr Gln Asn Lys Cys Met Arg
            100                 105                 110

Asn Gly Pro Asn Ala Leu Ile Ala Ser Leu Ala Leu Gly Asp Leu Ile
        115                 120                 125

Tyr Val Val Ile Asp Leu Pro Ile Asn Val Phe Lys Leu Leu Ala Gly
    130                 135                 140

Arg Trp Pro Phe Asp His Asn Asp Phe Gly Val Phe Leu Cys Lys Leu
145                 150                 155                 160

Phe Pro Phe Leu Gln Lys Ser Ser Val Gly Ile Thr Val Leu Asn Leu
                165                 170                 175

Cys Ala Leu Ser Val Asp Arg Tyr Arg Ala Val Ala Ser Trp Ser Arg
            180                 185                 190

Val Gln Gly Ile Gly Ile Pro Leu Val Thr Ala Ile Glu Ile Val Ser
        195                 200                 205

Ile Trp Ile Leu Ser Phe Ile Leu Ala Ile Pro Glu Ala Ile Gly Phe
    210                 215                 220

Val Met Val Pro Phe Glu Tyr Arg Gly Glu Gln His Lys Thr Cys Met
225                 230                 235                 240

Leu Asn Ala Thr Ser Lys Phe Met Glu Phe Tyr Gln Asp Val Lys Asp
                245                 250                 255

Trp Trp Leu Phe Gly Phe Tyr Phe Cys Met Pro Leu Val Cys Thr Ala
            260                 265                 270
```

```
Ile Phe Tyr Thr Leu Met Thr Cys Glu Met Leu Asn Arg Arg Asn Gly
        275                 280                 285

Ser Leu Arg Ile Ala Leu Ser Glu His Leu Lys Gln Arg Arg Glu Val
    290                 295                 300

Ala Lys Thr Val Phe Cys Leu Val Val Ile Phe Ala Leu Cys Trp Phe
305                 310                 315                 320

Pro Leu His Leu Ser Arg Ile Leu Lys Lys Thr Val Tyr Asn Glu Met
                325                 330                 335

Asp Lys Asn Arg Cys Glu Leu Leu Ser Phe Leu Leu Leu Met Asp Tyr
            340                 345                 350

Ile Gly Ile Asn Leu Ala Thr Met Asn Ser Cys Ile Asn Pro Ile Ala
        355                 360                 365

Leu Tyr Phe Val Ser Lys Lys Phe Lys Asn Cys Phe Gln Ser Cys Leu
    370                 375                 380

Cys Cys Cys Cys Tyr Gln Ser Lys Ser Leu Met Thr Ser Val Pro Met
385                 390                 395                 400

Asn Gly Thr Ser Ile Gln Trp Lys Asn His Asp Gln Asn Asn His Asn
                405                 410                 415

Thr Asp Arg Ser Ser His Lys Asp Ser Met Asn
            420                 425


<210> SEQ ID NO 3
<211> LENGTH: 2493
<212> TYPE: DNA
<213> ORGANISM: Cynomolgus monkey

<400> SEQUENCE: 3

cgggggtggc tgtgtcccag gatagctgga aggttaggac gctcttgcgg tcccagagtg      60

gagtggaagt tctggagctt tgggaggaga cggggaggac agactggagg cgtgttcctc     120

cggagttttc ttttccgtgc gagccctcgc gcgcgcgtac agtcatcccg ctggtctgac     180

gattgtggag aggaggtgga gaggcttcat ccatccccacc cggtcgtcgc ggggaattgg    240

ggtcccagcg agacctcccc cggagaagca gtgcccagga agttttctga agccggggta     300

gctgtgcagc cggagccgcc gccgcgccgg agcccgggac accggccacc ctccgcgcca     360

cccaccccttg ccggctccgg cttcctctgg cccaggcgcc tcgcggaccc ggcagctgtc    420

tgcgcccgcc gagctccacg gtgaaaaaaa tagtgaaggt gtaaaagcag cacaagtgca     480

ataagagata tttcctcaaa tttgcctcaa gatggaaacc gtttgcctca gggcatcctt     540

ttggctggca ctggttggat gtgtaatcag tgataatgct gagagataca gcacaaatct     600

aagcaatcat gtggatgatt tcaccacttt tcatggcaca gagctcagcc tcctggttac     660

cactcatcaa cccactaact tggtcctacc cagcaatggc tcaatgcaca actattgccc     720

acagcagact aaaattactt cagcttttaa atacattaac actgtgatat cttgtactat     780

tttcatcgtg ggaatggtgg ggaatgcaac tctgctcagg atcatttacc agaacaaatg     840

tatgaggaat ggccccaacg cgctgatagc cagccttgcc cttggagacc ttatctatgt     900

ggtcattgat ctccctatca atgtatttaa gctgctggct gggcgctggc cttttgatca     960

caatgacttt ggcgtatttc tttgcaagct gttccccttt ttgcagaagt cctcagtggg    1020

gatcaccgtc ctcaacctct gcgctcttag tgttgacagg tacagagcag ttgcctcctg    1080

gagtcgtgtt cagggaattg ggattccttt ggtaactgcc attgaaattg tctccatctg    1140

gatcctgtcc ttcatcctgg ccattcctga agcgattggc ttcgtcatgg taccctttga    1200
```

```
atataggggt gaacagcata aaacctgtat gctcaatgct acgtcaaaat tcatggagtt   1260
ctaccaagat gtaaaggact ggtggctctt tgggttctat ttctgtatgc ccttggtgtg   1320
cactgcgatc ttctacaccc tcatgacttg tgagatgttg aacagaagga atggcagctt   1380
gagaattgcc ctcagtgaac atcttaagca gcgtcgagaa gtggcaaaaa cagttttctg   1440
cttggtcgta atttttgctc tgtgctggtt ccctcttcat ttaagccgta tattgaagaa   1500
aaccgtgtat aatgagatgg acaagaaccg atgtgaatta cttagtttct tgctgctcat   1560
ggattacatc ggtattaact tggcaaccat gaattcatgt ataaacccca tagctctgta   1620
ttttgtgagc aagaaattta aaaattgttt ccagtcatgc ctctgctgct gctgttacca   1680
gtccaaaagt ctgatgacct cggtccccat gaacggaaca agcatccagt ggaagaacca   1740
cgaacaaaac aaccacaaca cagaccggag cagccacaag gacagcatga actgaccacc   1800
ctgcgaagca ctcctgggta ctcccataat cctctgggag aaaaaaatca caaggcaact   1860
gtgactccgg aaatctcttc tctgatcctt cttccttaac tcactcccac acccaagaag   1920
aaatgctttc caaaaccgca agggtagacc ggtttagcca cccacgacat ctaccaatcg   1980
tacttcttta attaatctga tttacatatt ccgcgtgttg tattcagcac taaaaaatgg   2040
tgggagctgg gagagaatga agactgttca atgaaaccag aaggatattt actacttttg   2100
catgaaaata gagctttcaa gtacatgggt agcttttatg gcagttctgg tgaatgttca   2160
gtgggaactg gtcaccatga aactttagag attatgacaa gattttctac tttttttaac   2220
tgatttttttg tccttcagcc aaacacaata tgggctcaag ttacttttat ttgaaatgtc   2280
atttggtgcc agtatttttt aactgcataa tagcctaaca tgactatttg aacttattta   2340
cacatagttt gcaaaaaaaa aaagacaaaa atagtattca ggtgagcaat taggttagta   2400
ttttctatgt cactgtttat ttttttaaaa cacaaattct aaagctacaa caaatactac   2460
aggcccttaa aacacagtct gatgatacat ttg                                 2493
```

<210> SEQ ID NO 4
<211> LENGTH: 427
<212> TYPE: PRT
<213> ORGANISM: Cynomolgus monkey

<400> SEQUENCE: 4

```
Met Glu Thr Val Cys Leu Arg Ala Ser Phe Trp Leu Ala Leu Val Gly
1               5                   10                  15

Cys Val Ile Ser Asp Asn Ala Glu Arg Tyr Ser Thr Asn Leu Ser Asn
            20                  25                  30

His Val Asp Asp Phe Thr Thr Phe His Gly Thr Glu Leu Ser Leu Leu
        35                  40                  45

Val Thr Thr His Gln Pro Thr Asn Leu Val Leu Pro Ser Asn Gly Ser
    50                  55                  60

Met His Asn Tyr Cys Pro Gln Gln Thr Lys Ile Thr Ser Ala Phe Lys
65                  70                  75                  80

Tyr Ile Asn Thr Val Ile Ser Cys Thr Ile Phe Ile Val Gly Met Val
                85                  90                  95

Gly Asn Ala Thr Leu Leu Arg Ile Ile Tyr Gln Asn Lys Cys Met Arg
            100                 105                 110

Asn Gly Pro Asn Ala Leu Ile Ala Ser Leu Ala Leu Gly Asp Leu Ile
        115                 120                 125

Tyr Val Val Ile Asp Leu Pro Ile Asn Val Phe Lys Leu Leu Ala Gly
    130                 135                 140
```

-continued

```
Arg Trp Pro Phe Asp His Asn Asp Phe Gly Val Phe Leu Cys Lys Leu
145                 150                 155                 160

Phe Pro Phe Leu Gln Lys Ser Ser Val Gly Ile Thr Val Leu Asn Leu
                165                 170                 175

Cys Ala Leu Ser Val Asp Arg Tyr Arg Ala Val Ala Ser Trp Ser Arg
            180                 185                 190

Val Gln Gly Ile Gly Ile Pro Leu Val Thr Ala Ile Glu Ile Val Ser
        195                 200                 205

Ile Trp Ile Leu Ser Phe Ile Leu Ala Ile Pro Glu Ala Ile Gly Phe
    210                 215                 220

Val Met Val Pro Phe Glu Tyr Arg Gly Glu Gln His Lys Thr Cys Met
225                 230                 235                 240

Leu Asn Ala Thr Ser Lys Phe Met Glu Phe Tyr Gln Asp Val Lys Asp
                245                 250                 255

Trp Trp Leu Phe Gly Phe Tyr Phe Cys Met Pro Leu Val Cys Thr Ala
            260                 265                 270

Ile Phe Tyr Thr Leu Met Thr Cys Glu Met Leu Asn Arg Arg Asn Gly
        275                 280                 285

Ser Leu Arg Ile Ala Leu Ser Glu His Leu Lys Gln Arg Arg Glu Val
    290                 295                 300

Ala Lys Thr Val Phe Cys Leu Val Val Ile Phe Ala Leu Cys Trp Phe
305                 310                 315                 320

Pro Leu His Leu Ser Arg Ile Leu Lys Lys Thr Val Tyr Asn Glu Met
                325                 330                 335

Asp Lys Asn Arg Cys Glu Leu Leu Ser Phe Leu Leu Leu Met Asp Tyr
            340                 345                 350

Ile Gly Ile Asn Leu Ala Thr Met Asn Ser Cys Ile Asn Pro Ile Ala
        355                 360                 365

Leu Tyr Phe Val Ser Lys Lys Phe Lys Asn Cys Phe Gln Ser Cys Leu
    370                 375                 380

Cys Cys Cys Cys Tyr Gln Ser Lys Ser Leu Met Thr Ser Val Pro Met
385                 390                 395                 400

Asn Gly Thr Ser Ile Gln Trp Lys Asn His Glu Gln Asn Asn His Asn
                405                 410                 415

Thr Asp Arg Ser Ser His Lys Asp Ser Met Asn
            420                 425
```

<210> SEQ ID NO 5
<211> LENGTH: 1436
<212> TYPE: DNA
<213> ORGANISM: Rattus norvegicus

<400> SEQUENCE: 5

```
gtgagaccaa cataacagga cgtttcttca gatccacatt aagatgggtg tcctttgctt      60

tctggcgtcc ttttggctgg ccctggtggg aggcgcaatc gctgacaatg ctgagagata     120

cagtgctaat ctaagcagcc acgtggagga cttcacccct tttccaggga cagagttcga     180

ctttctgggc accacccttc gaccccctaa tttggccctg cctagcaatg gctcaatgca     240

tggctattgc ccacagcaga caaaaatcac gacggctttc aaatatatca acactgtgat     300

atcctgtacc attttcatcg tgggaatggt ggggaacgcc actctcctaa gaatcattta     360

ccaaaacaag tgtatgagga acggccccaa tgcgctcata gccagcctgg cccttggaga     420

ccttatctac gtggtcattg atctccccat caatgtgttt aagctgttgg cggggcgctg     480

gccttttgac cacaatgatt ttggagtgtt tctctgcaag ctgttcccct ttttgcagaa     540
```

```
gtcgtccgtg ggcatcactg tcctgaatct ctgcgctctc agtgtggaca ggtacagagc    600

agtggcttcc tggagccggg ttcaaggaat cgggatcccc ttgattaccg ccattgaaat    660

tgtctccatc tggatccttt cctttatctt ggccatccca gaagcaatcg gcttcgtcat    720

ggtacccttc gaatacaagg gcgagcagca caggacctgc atgctcaacg ccacgaccaa    780

gttcatggag ttttaccaag acgtgaagga ctggtggctc tttggattct acttctgcat    840

gcccttggtg tgcacagcaa tcttctatac cctcatgacc tgtgagatgc tcaacagaag    900

gaatgggagc ttgcggattg ccctcagcga acacctcaag cagcgtcgag aggtggcaaa    960

gaccgtcttc tgcttggttg tcatcttcgc cctgtgctgg ttccctcttc acttaagccg   1020

aattttgaag aaaaccgtct atgatgagat ggataagaac cggtgtgaac tgctcagctt   1080

cttgctgctc atggattaca ttggcattaa cctggcaacc atgaactctt gcataaaccc   1140

aatagctctg tattttgtga gcaagaaatt caaaaattgt tttcagtcat gcctctgttg   1200

ctgttgtcac cagtccaaaa gcctcatgac ctcggtcccc atgaatggaa cgagtatcca   1260

gtggaagaac caggagcaga accacaacac agaacggagc agccacaagg acagcatgaa   1320

ctaaccctgt gcagaagcac cgagcagtgt gccttcgagt cccaggatga aacggtcacg   1380

cagcagctgc gctcccaaaa cctcccaggt ctctcccctg ctttttgtct aagctt       1436
```

```
<210> SEQ ID NO 6
<211> LENGTH: 426
<212> TYPE: PRT
<213> ORGANISM: Rattus norvegicus

<400> SEQUENCE: 6

Met Gly Val Leu Cys Phe Leu Ala Ser Phe Trp Leu Ala Leu Val Gly
1               5                   10                  15

Gly Ala Ile Ala Asp Asn Ala Glu Arg Tyr Ser Ala Asn Leu Ser Ser
            20                  25                  30

His Val Glu Asp Phe Thr Pro Phe Pro Gly Thr Glu Phe Asp Phe Leu
        35                  40                  45

Gly Thr Thr Leu Arg Pro Pro Asn Leu Ala Leu Pro Ser Asn Gly Ser
    50                  55                  60

Met His Gly Tyr Cys Pro Gln Gln Thr Lys Ile Thr Thr Ala Phe Lys
65                  70                  75                  80

Tyr Ile Asn Thr Val Ile Ser Cys Thr Ile Phe Ile Val Gly Met Val
                85                  90                  95

Gly Asn Ala Thr Leu Leu Arg Ile Ile Tyr Gln Asn Lys Cys Met Arg
            100                 105                 110

Asn Gly Pro Asn Ala Leu Ile Ala Ser Leu Ala Leu Gly Asp Leu Ile
        115                 120                 125

Tyr Val Val Ile Asp Leu Pro Ile Asn Val Phe Lys Leu Leu Ala Gly
    130                 135                 140

Arg Trp Pro Phe Asp His Asn Asp Phe Gly Val Phe Leu Cys Lys Leu
145                 150                 155                 160

Phe Pro Phe Leu Gln Lys Ser Ser Val Gly Ile Thr Val Leu Asn Leu
                165                 170                 175

Cys Ala Leu Ser Val Asp Arg Tyr Arg Ala Val Ala Ser Trp Ser Arg
            180                 185                 190

Val Gln Gly Ile Gly Ile Pro Leu Ile Thr Ala Ile Glu Ile Val Ser
        195                 200                 205

Ile Trp Ile Leu Ser Phe Ile Leu Ala Ile Pro Glu Ala Ile Gly Phe
```

```
    210                 215                 220

Val Met Val Pro Phe Glu Tyr Lys Gly Glu Gln His Arg Thr Cys Met
225                 230                 235                 240

Leu Asn Ala Thr Thr Lys Phe Met Glu Phe Tyr Gln Asp Val Lys Asp
                245                 250                 255

Trp Trp Leu Phe Gly Phe Tyr Phe Cys Met Pro Leu Val Cys Thr Ala
            260                 265                 270

Ile Phe Tyr Thr Leu Met Thr Cys Glu Met Leu Asn Arg Arg Asn Gly
        275                 280                 285

Ser Leu Arg Ile Ala Leu Ser Glu His Leu Lys Gln Arg Arg Glu Val
    290                 295                 300

Ala Lys Thr Val Phe Cys Leu Val Val Ile Phe Ala Leu Cys Trp Phe
305                 310                 315                 320

Pro Leu His Leu Ser Arg Ile Leu Lys Lys Thr Val Tyr Asp Glu Met
                325                 330                 335

Asp Lys Asn Arg Cys Glu Leu Leu Ser Phe Leu Leu Leu Met Asp Tyr
            340                 345                 350

Ile Gly Ile Asn Leu Ala Thr Met Asn Ser Cys Ile Asn Pro Ile Ala
        355                 360                 365

Leu Tyr Phe Val Ser Lys Lys Phe Lys Asn Cys Phe Gln Ser Cys Leu
    370                 375                 380

Cys Cys Cys Cys His Gln Ser Lys Ser Leu Met Thr Ser Val Pro Met
385                 390                 395                 400

Asn Gly Thr Ser Ile Gln Trp Lys Asn Gln Glu Gln Asn His Asn Thr
                405                 410                 415

Glu Arg Ser Ser His Lys Asp Ser Met Asn
            420                 425


<210> SEQ ID NO 7
<211> LENGTH: 33
<212> TYPE: DNA
<213> ORGANISM: Mus musculus

<400> SEQUENCE: 7

agggccagtc agaacattgg cacaagcata cac                                33


<210> SEQ ID NO 8
<211> LENGTH: 11
<212> TYPE: PRT
<213> ORGANISM: Mus musculus

<400> SEQUENCE: 8

Arg Ala Ser Gln Asn Ile Gly Thr Ser Ile His
1               5                   10


<210> SEQ ID NO 9
<211> LENGTH: 33
<212> TYPE: DNA
<213> ORGANISM: Mus musculus

<400> SEQUENCE: 9

cgagcaagtg aaaatattta cagttattta gca                                33


<210> SEQ ID NO 10
<211> LENGTH: 11
<212> TYPE: PRT
<213> ORGANISM: Mus musculus

<400> SEQUENCE: 10
```

Arg Ala Ser Glu Asn Ile Tyr Ser Tyr Leu Ala
1 5 10

<210> SEQ ID NO 11
<211> LENGTH: 39
<212> TYPE: DNA
<213> ORGANISM: Mus musculus

<400> SEQUENCE: 11
cagagcctct ttgatattga tggaaagaca tatttgaat 39

<210> SEQ ID NO 12
<211> LENGTH: 13
<212> TYPE: PRT
<213> ORGANISM: Mus musculus

<400> SEQUENCE: 12

Gln Ser Leu Phe Asp Ile Asp Gly Lys Thr Tyr Leu Asn
1 5 10

<210> SEQ ID NO 13
<211> LENGTH: 33
<212> TYPE: DNA
<213> ORGANISM: Mus musculus

<400> SEQUENCE: 13
cgggcaagtc aggacattgg tggtagctta aac 33

<210> SEQ ID NO 14
<211> LENGTH: 11
<212> TYPE: PRT
<213> ORGANISM: Mus musculus

<400> SEQUENCE: 14

Arg Ala Ser Gln Asp Ile Gly Gly Ser Leu Asn
1 5 10

<210> SEQ ID NO 15
<211> LENGTH: 33
<212> TYPE: DNA
<213> ORGANISM: Mus musculus

<400> SEQUENCE: 15
agggccagcc agactattag cgacttctta cac 33

<210> SEQ ID NO 16
<211> LENGTH: 11
<212> TYPE: PRT
<213> ORGANISM: Mus musculus

<400> SEQUENCE: 16

Arg Ala Ser Gln Thr Ile Ser Asp Phe Leu His
1 5 10

<210> SEQ ID NO 17
<211> LENGTH: 33
<212> TYPE: DNA
<213> ORGANISM: Mus musculus

<400> SEQUENCE: 17
agggcaagtg aggacataca cactcaatta gcc 33

<210> SEQ ID NO 18

<211> LENGTH: 11
<212> TYPE: PRT
<213> ORGANISM: Mus musculus

<400> SEQUENCE: 18

Arg Ala Ser Glu Asp Ile His Thr Gln Leu Ala
1 5 10

<210> SEQ ID NO 19
<211> LENGTH: 48
<212> TYPE: DNA
<213> ORGANISM: Mus musculus

<400> SEQUENCE: 19
agatctagtc agtacattgt tcatagtact ggaaccacct atttagaa 48

<210> SEQ ID NO 20
<211> LENGTH: 16
<212> TYPE: PRT
<213> ORGANISM: Mus musculus

<400> SEQUENCE: 20

Arg Ser Ser Gln Tyr Ile Val His Ser Thr Gly Thr Thr Tyr Leu Glu
1 5 10 15

<210> SEQ ID NO 21
<211> LENGTH: 48
<212> TYPE: DNA
<213> ORGANISM: Mus musculus

<400> SEQUENCE: 21
agatctagtc attaccttgt tcatgataac ggaaacacct atgttgaa 48

<210> SEQ ID NO 22
<211> LENGTH: 16
<212> TYPE: PRT
<213> ORGANISM: Mus musculus

<400> SEQUENCE: 22

Arg Ser Ser His Tyr Leu Val His Asp Asn Gly Asn Thr Tyr Val Glu
1 5 10 15

<210> SEQ ID NO 23
<211> LENGTH: 48
<212> TYPE: DNA
<213> ORGANISM: Mus musculus

<400> SEQUENCE: 23
agatctagtc agaacattgt ccatagtact ggaaacacct atttagaa 48

<210> SEQ ID NO 24
<211> LENGTH: 16
<212> TYPE: PRT
<213> ORGANISM: Mus musculus

<400> SEQUENCE: 24

Arg Ser Ser Gln Asn Ile Val His Ser Thr Gly Asn Thr Tyr Leu Glu
1 5 10 15

<210> SEQ ID NO 25
<211> LENGTH: 30
<212> TYPE: DNA
<213> ORGANISM: Mus musculus

<400> SEQUENCE: 25
agtgtcagct caagtgtaag ttacatacac 30

<210> SEQ ID NO 26
<211> LENGTH: 10
<212> TYPE: PRT
<213> ORGANISM: Mus musculus

<400> SEQUENCE: 26

Ser Val Ser Ser Ser Val Ser Tyr Ile His
1 5 10

<210> SEQ ID NO 27
<211> LENGTH: 30
<212> TYPE: DNA
<213> ORGANISM: Mus musculus

<400> SEQUENCE: 27
agtgccagct caagtgtaag ttacatgtgc 30

<210> SEQ ID NO 28
<211> LENGTH: 10
<212> TYPE: PRT
<213> ORGANISM: Mus musculus

<400> SEQUENCE: 28

Ser Ala Ser Ser Ser Val Ser Tyr Met Cys
1 5 10

<210> SEQ ID NO 29
<211> LENGTH: 18
<212> TYPE: DNA
<213> ORGANISM: Mus musculus

<400> SEQUENCE: 29
cagggcatta acaattat 18

<210> SEQ ID NO 30
<211> LENGTH: 6
<212> TYPE: PRT
<213> ORGANISM: Mus musculus

<400> SEQUENCE: 30

Gln Gly Ile Asn Asn Tyr
1 5

<210> SEQ ID NO 31
<211> LENGTH: 21
<212> TYPE: DNA
<213> ORGANISM: Mus musculus

<400> SEQUENCE: 31
tatgcttcta agtctatatc t 21

<210> SEQ ID NO 32
<211> LENGTH: 7
<212> TYPE: PRT
<213> ORGANISM: Mus musculus

<400> SEQUENCE: 32

Tyr Ala Ser Lys Ser Ile Ser
1 5

<210> SEQ ID NO 33

<211> LENGTH: 21
<212> TYPE: DNA
<213> ORGANISM: Mus musculus

<400> SEQUENCE: 33
aatgcaaaaa ccttagcaga a 21

<210> SEQ ID NO 34
<211> LENGTH: 7
<212> TYPE: PRT
<213> ORGANISM: Mus musculus

<400> SEQUENCE: 34

Asn Ala Lys Thr Leu Ala Glu
1 5

<210> SEQ ID NO 35
<211> LENGTH: 21
<212> TYPE: DNA
<213> ORGANISM: Mus musculus

<400> SEQUENCE: 35
ctggtgtctg aattggactc t 21

<210> SEQ ID NO 36
<211> LENGTH: 7
<212> TYPE: PRT
<213> ORGANISM: Mus musculus

<400> SEQUENCE: 36

Leu Val Ser Glu Leu Asp Ser
1 5

<210> SEQ ID NO 37
<211> LENGTH: 21
<212> TYPE: DNA
<213> ORGANISM: Mus musculus

<400> SEQUENCE: 37
gccacatcca gcttagattc t 21

<210> SEQ ID NO 38
<211> LENGTH: 7
<212> TYPE: PRT
<213> ORGANISM: Mus musculus

<400> SEQUENCE: 38

Ala Thr Ser Ser Leu Asp Ser
1 5

<210> SEQ ID NO 39
<211> LENGTH: 21
<212> TYPE: DNA
<213> ORGANISM: Mus musculus

<400> SEQUENCE: 39
tatgcttccc aatccatctc t 21

<210> SEQ ID NO 40
<211> LENGTH: 7
<212> TYPE: PRT
<213> ORGANISM: Mus musculus

<400> SEQUENCE: 40

Tyr Ala Ser Gln Ser Ile Ser
1               5

<210> SEQ ID NO 41
<211> LENGTH: 21
<212> TYPE: DNA
<213> ORGANISM: Mus musculus

<400> SEQUENCE: 41
ggtgcagcca gtttgaaaag t 21

<210> SEQ ID NO 42
<211> LENGTH: 7
<212> TYPE: PRT
<213> ORGANISM: Mus musculus

<400> SEQUENCE: 42

Gly Ala Ala Ser Leu Lys Ser
1               5

<210> SEQ ID NO 43
<211> LENGTH: 21
<212> TYPE: DNA
<213> ORGANISM: Mus musculus

<400> SEQUENCE: 43
aaagtttcca accgattttc t 21

<210> SEQ ID NO 44
<211> LENGTH: 7
<212> TYPE: PRT
<213> ORGANISM: Mus musculus

<400> SEQUENCE: 44

Lys Val Ser Asn Arg Phe Ser
1               5

<210> SEQ ID NO 45
<211> LENGTH: 21
<212> TYPE: DNA
<213> ORGANISM: Mus musculus

<400> SEQUENCE: 45
gacacatcca aactggcttc t 21

<210> SEQ ID NO 46
<211> LENGTH: 7
<212> TYPE: PRT
<213> ORGANISM: Mus musculus

<400> SEQUENCE: 46

Asp Thr Ser Lys Leu Ala Ser
1               5

<210> SEQ ID NO 47
<211> LENGTH: 21
<212> TYPE: DNA
<213> ORGANISM: Mus musculus

<400> SEQUENCE: 47
tatacatcaa ctttacagtc a 21

<210> SEQ ID NO 48
<211> LENGTH: 7

<212> TYPE: PRT
<213> ORGANISM: Mus musculus

<400> SEQUENCE: 48

Tyr Thr Ser Thr Leu Gln Ser
1 5

<210> SEQ ID NO 49
<211> LENGTH: 27
<212> TYPE: DNA
<213> ORGANISM: Mus musculus

<400> SEQUENCE: 49
caacatagtt atagcttccc gtggacg 27

<210> SEQ ID NO 50
<211> LENGTH: 9
<212> TYPE: PRT
<213> ORGANISM: Mus musculus

<400> SEQUENCE: 50

Gln His Ser Tyr Ser Phe Pro Trp Thr
1 5

<210> SEQ ID NO 51
<211> LENGTH: 27
<212> TYPE: DNA
<213> ORGANISM: Mus musculus

<400> SEQUENCE: 51
cagcatcatt atggtattcc gttcacg 27

<210> SEQ ID NO 52
<211> LENGTH: 9
<212> TYPE: PRT
<213> ORGANISM: Mus musculus

<400> SEQUENCE: 52

Gln His His Tyr Gly Ile Pro Phe Thr
1 5

<210> SEQ ID NO 53
<211> LENGTH: 27
<212> TYPE: DNA
<213> ORGANISM: Mus musculus

<400> SEQUENCE: 53
tggcaaggta cacattttcc gctcacg 27

<210> SEQ ID NO 54
<211> LENGTH: 9
<212> TYPE: PRT
<213> ORGANISM: Mus musculus

<400> SEQUENCE: 54

Trp Gln Gly Thr His Phe Pro Leu Thr
1 5

<210> SEQ ID NO 55
<211> LENGTH: 27
<212> TYPE: DNA
<213> ORGANISM: Mus musculus

<400> SEQUENCE: 55
ctacaatatg ctagttctcc gtatacg 27

<210> SEQ ID NO 56
<211> LENGTH: 9
<212> TYPE: PRT
<213> ORGANISM: Mus musculus

<400> SEQUENCE: 56

Leu Gln Tyr Ala Ser Ser Pro Tyr Thr
1 5

<210> SEQ ID NO 57
<211> LENGTH: 27
<212> TYPE: DNA
<213> ORGANISM: Mus musculus

<400> SEQUENCE: 57
caaagtggta acacctttcc gtggacg 27

<210> SEQ ID NO 58
<211> LENGTH: 9
<212> TYPE: PRT
<213> ORGANISM: Mus musculus

<400> SEQUENCE: 58

Gln Ser Gly Asn Thr Phe Pro Trp Thr
1 5

<210> SEQ ID NO 59
<211> LENGTH: 27
<212> TYPE: DNA
<213> ORGANISM: Mus musculus

<400> SEQUENCE: 59
caacagtata ggagtattcc gtggacg 27

<210> SEQ ID NO 60
<211> LENGTH: 9
<212> TYPE: PRT
<213> ORGANISM: Mus musculus

<400> SEQUENCE: 60

Gln Gln Tyr Arg Ser Ile Pro Trp Thr
1 5

<210> SEQ ID NO 61
<211> LENGTH: 27
<212> TYPE: DNA
<213> ORGANISM: Mus musculus

<400> SEQUENCE: 61
tttcaaggtt cacattttcc attcacg 27

<210> SEQ ID NO 62
<211> LENGTH: 9
<212> TYPE: PRT
<213> ORGANISM: Mus musculus

<400> SEQUENCE: 62

Phe Gln Gly Ser His Phe Pro Phe Thr
1 5

<210> SEQ ID NO 63
<211> LENGTH: 27

<212> TYPE: DNA
<213> ORGANISM: Mus musculus

<400> SEQUENCE: 63
tttcaaggtt cacatttccc attcacg 27

<210> SEQ ID NO 64
<211> LENGTH: 9
<212> TYPE: PRT
<213> ORGANISM: Mus musculus

<400> SEQUENCE: 64

His Gln Trp Ser Thr Asn Pro Pro Thr
1 5

<210> SEQ ID NO 65
<211> LENGTH: 27
<212> TYPE: DNA
<213> ORGANISM: Mus musculus

<400> SEQUENCE: 65
cagcagtgga gtagtaaccc acccacg 27

<210> SEQ ID NO 66
<211> LENGTH: 9
<212> TYPE: PRT
<213> ORGANISM: Mus musculus

<400> SEQUENCE: 66

Gln Gln Trp Ser Ser Asn Pro Pro Thr
1 5

<210> SEQ ID NO 67
<211> LENGTH: 24
<212> TYPE: DNA
<213> ORGANISM: Mus musculus

<400> SEQUENCE: 67
cagcagttta gtaaacttcg gaca 24

<210> SEQ ID NO 68
<211> LENGTH: 8
<212> TYPE: PRT
<213> ORGANISM: Mus musculus

<400> SEQUENCE: 68

Gln Gln Phe Ser Lys Leu Arg Thr
1 5

<210> SEQ ID NO 69
<211> LENGTH: 36
<212> TYPE: DNA
<213> ORGANISM: Mus musculus

<400> SEQUENCE: 69
gggttctcac tgaccacttc tggcttgggt gttgcc 36

<210> SEQ ID NO 70
<211> LENGTH: 12
<212> TYPE: PRT
<213> ORGANISM: Mus musculus

<400> SEQUENCE: 70

Gly Phe Ser Leu Thr Thr Ser Gly Leu Gly Val Ala 1 5 10

<210> SEQ ID NO 71
<211> LENGTH: 30
<212> TYPE: DNA
<213> ORGANISM: Mus musculus

<400> SEQUENCE: 71
ggctacacct ttactagcta ctggatacac 30

<210> SEQ ID NO 72
<211> LENGTH: 10
<212> TYPE: PRT
<213> ORGANISM: Mus musculus

<400> SEQUENCE: 72

Gly Tyr Thr Phe Thr Ser Tyr Trp Ile His
1 5 10

<210> SEQ ID NO 73
<211> LENGTH: 30
<212> TYPE: DNA
<213> ORGANISM: Mus musculus

<400> SEQUENCE: 73
ggcctcaaca ttaaagacat ctatattcac 30

<210> SEQ ID NO 74
<211> LENGTH: 10
<212> TYPE: PRT
<213> ORGANISM: Mus musculus

<400> SEQUENCE: 74

Gly Leu Asn Ile Lys Asp Ile Tyr Ile His
1 5 10

<210> SEQ ID NO 75
<211> LENGTH: 30
<212> TYPE: DNA
<213> ORGANISM: Mus musculus

<400> SEQUENCE: 75
ggttactcat tcaccaacta ctggatacac 30

<210> SEQ ID NO 76
<211> LENGTH: 10
<212> TYPE: PRT
<213> ORGANISM: Mus musculus

<400> SEQUENCE: 76

Gly Tyr Ser Phe Thr Asn Tyr Trp Ile His
1 5 10

<210> SEQ ID NO 77
<211> LENGTH: 30
<212> TYPE: DNA
<213> ORGANISM: Mus musculus

<400> SEQUENCE: 77
ggattcactt tcagtgacta tcccatgtct 30

<210> SEQ ID NO 78
<211> LENGTH: 10
<212> TYPE: PRT

<213> ORGANISM: Mus musculus

<400> SEQUENCE: 78

Gly Phe Thr Phe Ser Asp Tyr Pro Met Ser
1               5                   10

<210> SEQ ID NO 79
<211> LENGTH: 30
<212> TYPE: DNA
<213> ORGANISM: Mus musculus

<400> SEQUENCE: 79
ggattcactt tcagtagctt tggcatgtct 30

<210> SEQ ID NO 80
<211> LENGTH: 10
<212> TYPE: PRT
<213> ORGANISM: Mus musculus

<400> SEQUENCE: 80

Gly Phe Thr Phe Ser Ser Phe Gly Met Ser
1               5                   10

<210> SEQ ID NO 81
<211> LENGTH: 30
<212> TYPE: DNA
<213> ORGANISM: Mus musculus

<400> SEQUENCE: 81
ggattcactt tcagtaccta tggcatgtct 30

<210> SEQ ID NO 82
<211> LENGTH: 10
<212> TYPE: PRT
<213> ORGANISM: Mus musculus

<400> SEQUENCE: 82

Gly Phe Thr Phe Ser Thr Tyr Gly Met Ser
1               5                   10

<210> SEQ ID NO 83
<211> LENGTH: 30
<212> TYPE: DNA
<213> ORGANISM: Mus musculus

<400> SEQUENCE: 83
ggattcactt tcagtagtta tggcatgtct 30

<210> SEQ ID NO 84
<211> LENGTH: 10
<212> TYPE: PRT
<213> ORGANISM: Mus musculus

<400> SEQUENCE: 84

Gly Phe Thr Phe Ser Ser Tyr Gly Met Ser
1               5                   10

<210> SEQ ID NO 85
<211> LENGTH: 36
<212> TYPE: DNA
<213> ORGANISM: Mus musculus

<400> SEQUENCE: 85
gggttttcac tgaccacttc tggtatgggt gtaggc 36

<210> SEQ ID NO 86
<211> LENGTH: 12
<212> TYPE: PRT
<213> ORGANISM: Mus musculus

<400> SEQUENCE: 86

Gly Phe Ser Leu Thr Thr Ser Gly Met Gly Val Gly
1 5 10

<210> SEQ ID NO 87
<211> LENGTH: 36
<212> TYPE: DNA
<213> ORGANISM: Mus musculus

<400> SEQUENCE: 87
ggattttcac tgagcacttc tggtttgggt gtaggc 36

<210> SEQ ID NO 88
<211> LENGTH: 12
<212> TYPE: PRT
<213> ORGANISM: Mus musculus

<400> SEQUENCE: 88

Gly Phe Ser Leu Ser Thr Ser Gly Leu Gly Val Gly
1 5 10

<210> SEQ ID NO 89
<211> LENGTH: 24
<212> TYPE: DNA
<213> ORGANISM: Mus musculus

<400> SEQUENCE: 89
ggattcacct tcagtgatta ttac 24

<210> SEQ ID NO 90
<211> LENGTH: 8
<212> TYPE: PRT
<213> ORGANISM: Mus musculus

<400> SEQUENCE: 90

Gly Phe Thr Phe Ser Asp Tyr Tyr
1 5

<210> SEQ ID NO 91
<211> LENGTH: 48
<212> TYPE: DNA
<213> ORGANISM: Mus musculus

<400> SEQUENCE: 91
cacatttggt cggatggtga cacgcgctat tacccagccc tgaagaac 48

<210> SEQ ID NO 92
<211> LENGTH: 16
<212> TYPE: PRT
<213> ORGANISM: Mus musculus

<400> SEQUENCE: 92

His Ile Trp Ser Asp Gly Asp Thr Arg Tyr Tyr Pro Ala Leu Lys Asn
1 5 10 15

<210> SEQ ID NO 93
<211> LENGTH: 36
<212> TYPE: DNA

<213> ORGANISM: Mus musculus

<400> SEQUENCE: 93
tacattaatc ctgacactga ttatagtgag tacaat 36

<210> SEQ ID NO 94
<211> LENGTH: 12
<212> TYPE: PRT
<213> ORGANISM: Mus musculus

<400> SEQUENCE: 94

Tyr Ile Asn Pro Asp Thr Asp Tyr Ser Glu Tyr Asn
1 5 10

<210> SEQ ID NO 95
<211> LENGTH: 36
<212> TYPE: DNA
<213> ORGANISM: Mus musculus

<400> SEQUENCE: 95
aggattgatc ctgcgaacgg taagactgca tatgac 36

<210> SEQ ID NO 96
<211> LENGTH: 12
<212> TYPE: PRT
<213> ORGANISM: Mus musculus

<400> SEQUENCE: 96

Arg Ile Asp Pro Ala Asn Gly Lys Thr Ala Tyr Asp
1 5 10

<210> SEQ ID NO 97
<211> LENGTH: 36
<212> TYPE: DNA
<213> ORGANISM: Mus musculus

<400> SEQUENCE: 97
atgattgatc cttccgatgc tgaaactggg ttaaat 36

<210> SEQ ID NO 98
<211> LENGTH: 12
<212> TYPE: PRT
<213> ORGANISM: Mus musculus

<400> SEQUENCE: 98

Met Ile Asp Pro Ser Asp Ala Glu Thr Gly Leu Asn
1 5 10

<210> SEQ ID NO 99
<211> LENGTH: 24
<212> TYPE: DNA
<213> ORGANISM: Mus musculus

<400> SEQUENCE: 99
gttagtgatg gtggtggttc cacc 24

<210> SEQ ID NO 100
<211> LENGTH: 8
<212> TYPE: PRT
<213> ORGANISM: Mus musculus

<400> SEQUENCE: 100

Val Ser Asp Gly Gly Gly Ser Thr
1 5

<210> SEQ ID NO 101
<211> LENGTH: 24
<212> TYPE: DNA
<213> ORGANISM: Mus musculus

<400> SEQUENCE: 101
attagtagtg ctggtagttt cacc 24

<210> SEQ ID NO 102
<211> LENGTH: 8
<212> TYPE: PRT
<213> ORGANISM: Mus musculus

<400> SEQUENCE: 102

Ile Ser Ser Ala Gly Ser Phe Thr
1 5

<210> SEQ ID NO 103
<211> LENGTH: 51
<212> TYPE: DNA
<213> ORGANISM: Mus musculus

<400> SEQUENCE: 103
accattaata ctaatggtgg taccacctat tatcgagaca gtgtgaaggg c 51

<210> SEQ ID NO 104
<211> LENGTH: 17
<212> TYPE: PRT
<213> ORGANISM: Mus musculus

<400> SEQUENCE: 104

Thr Ile Asn Thr Asn Gly Gly Thr Thr Tyr Tyr Arg Asp Ser Val Lys
1 5 10 15

Gly

<210> SEQ ID NO 105
<211> LENGTH: 51
<212> TYPE: DNA
<213> ORGANISM: Mus musculus

<400> SEQUENCE: 105
accataaata ctaatggtgg taacacctat tattcagaca atgtgaaggg c 51

<210> SEQ ID NO 106
<211> LENGTH: 17
<212> TYPE: PRT
<213> ORGANISM: Mus musculus

<400> SEQUENCE: 106

Thr Ile Asn Thr Asn Gly Gly Asn Thr Tyr Tyr Ser Asp Asn Val Lys
1 5 10 15

Gly

<210> SEQ ID NO 107
<211> LENGTH: 51
<212> TYPE: DNA
<213> ORGANISM: Mus musculus

<400> SEQUENCE: 107
accattagta ctaatggtgc caccgccaat tatccagaca gtgtgaaggg c 51

<210> SEQ ID NO 108
<211> LENGTH: 17
<212> TYPE: PRT
<213> ORGANISM: Mus musculus

<400> SEQUENCE: 108

Thr Ile Ser Thr Asn Gly Ala Thr Ala Asn Tyr Pro Asp Ser Val Lys
1 5 10 15

Gly

<210> SEQ ID NO 109
<211> LENGTH: 48
<212> TYPE: DNA
<213> ORGANISM: Mus musculus

<400> SEQUENCE: 109
cacatttggt gggatgatga taagtactat aatccatccc tgaagagc 48

<210> SEQ ID NO 110
<211> LENGTH: 16
<212> TYPE: PRT
<213> ORGANISM: Mus musculus

<400> SEQUENCE: 110

His Ile Trp Trp Asp Asp Asp Lys Tyr Tyr Asn Pro Ser Leu Lys Ser
1 5 10 15

<210> SEQ ID NO 111
<211> LENGTH: 48
<212> TYPE: DNA
<213> ORGANISM: Mus musculus

<400> SEQUENCE: 111
cacatttggt gggatgatga taagtactat aatccatccc ttaagaga 48

<210> SEQ ID NO 112
<211> LENGTH: 16
<212> TYPE: PRT
<213> ORGANISM: Mus musculus

<400> SEQUENCE: 112

His Ile Trp Trp Asp Asp Asp Lys Tyr Tyr Asn Pro Ser Leu Lys Arg
1 5 10 15

<210> SEQ ID NO 113
<211> LENGTH: 30
<212> TYPE: DNA
<213> ORGANISM: Mus musculus

<400> SEQUENCE: 113
attagaaatc gggctaatgg ttacacaaca 30

<210> SEQ ID NO 114
<211> LENGTH: 10
<212> TYPE: PRT
<213> ORGANISM: Mus musculus

<400> SEQUENCE: 114

Ile Arg Asn Arg Ala Asn Gly Tyr Thr Thr
1 5 10

<210> SEQ ID NO 115
<211> LENGTH: 30
<212> TYPE: DNA

<213> ORGANISM: Mus musculus

<400> SEQUENCE: 115
atgaaggatg atagtcttta ctttgacaac 30

<210> SEQ ID NO 116
<211> LENGTH: 10
<212> TYPE: PRT
<213> ORGANISM: Mus musculus

<400> SEQUENCE: 116

Met Lys Asp Asp Ser Leu Tyr Phe Asp Asn
1 5 10

<210> SEQ ID NO 117
<211> LENGTH: 30
<212> TYPE: DNA
<213> ORGANISM: Mus musculus

<400> SEQUENCE: 117
gcaagtgctg gttattattt ttttgacttc 30

<210> SEQ ID NO 118
<211> LENGTH: 10
<212> TYPE: PRT
<213> ORGANISM: Mus musculus

<400> SEQUENCE: 118

Ala Ser Ala Gly Tyr Tyr Phe Phe Asp Phe
1 5 10

<210> SEQ ID NO 119
<211> LENGTH: 15
<212> TYPE: DNA
<213> ORGANISM: Mus musculus

<400> SEQUENCE: 119
ggtagggggg cccac 15

<210> SEQ ID NO 120
<211> LENGTH: 5
<212> TYPE: PRT
<213> ORGANISM: Mus musculus

<400> SEQUENCE: 120

Gly Arg Gly Ala His
1 5

<210> SEQ ID NO 121
<211> LENGTH: 33
<212> TYPE: DNA
<213> ORGANISM: Mus musculus

<400> SEQUENCE: 121
gcaagaattg gcgattacta taatatggac tac 33

<210> SEQ ID NO 122
<211> LENGTH: 11
<212> TYPE: PRT
<213> ORGANISM: Mus musculus

<400> SEQUENCE: 122

Ala Arg Ile Gly Asp Tyr Tyr Asn Met Asp Tyr
1 5 10

<210> SEQ ID NO 123
<211> LENGTH: 45
<212> TYPE: DNA
<213> ORGANISM: Mus musculus

<400> SEQUENCE: 123
acaagacatg cttcctacta tagctacgac cattctatgg actac 45

<210> SEQ ID NO 124
<211> LENGTH: 15
<212> TYPE: PRT
<213> ORGANISM: Mus musculus

<400> SEQUENCE: 124

Thr Arg His Ala Ser Tyr Tyr Ser Tyr Asp His Ser Met Asp Tyr
1 5 10 15

<210> SEQ ID NO 125
<211> LENGTH: 36
<212> TYPE: DNA
<213> ORGANISM: Mus musculus

<400> SEQUENCE: 125
gcaagacggg ggtacgacgt tgggtgcttt gaccac 36

<210> SEQ ID NO 126
<211> LENGTH: 12
<212> TYPE: PRT
<213> ORGANISM: Mus musculus

<400> SEQUENCE: 126

Ala Arg Arg Gly Tyr Asp Val Gly Cys Phe Asp His
1 5 10

<210> SEQ ID NO 127
<211> LENGTH: 27
<212> TYPE: DNA
<213> ORGANISM: Mus musculus

<400> SEQUENCE: 127
gcaagagact acggggctat ggactac 27

<210> SEQ ID NO 128
<211> LENGTH: 9
<212> TYPE: PRT
<213> ORGANISM: Mus musculus

<400> SEQUENCE: 128

Ala Arg Asp Tyr Gly Ala Met Asp Tyr
1 5

<210> SEQ ID NO 129
<211> LENGTH: 27
<212> TYPE: DNA
<213> ORGANISM: Mus musculus

<400> SEQUENCE: 129
gcaactgaaa agggagctat gggctac 27

<210> SEQ ID NO 130
<211> LENGTH: 9
<212> TYPE: PRT
<213> ORGANISM: Mus musculus

<400> SEQUENCE: 130

Ala Thr Glu Lys Gly Ala Met Gly Tyr
1               5

<210> SEQ ID NO 131
<211> LENGTH: 57
<212> TYPE: DNA
<213> ORGANISM: Mus musculus

<400> SEQUENCE: 131
gctcgaagaa ctgagactat gattacgaca gtgctatatt actatgctat ggactac        57

<210> SEQ ID NO 132
<211> LENGTH: 19
<212> TYPE: PRT
<213> ORGANISM: Mus musculus

<400> SEQUENCE: 132

Ala Arg Arg Thr Glu Thr Met Ile Thr Thr Val Leu Tyr Tyr Tyr Ala
1               5                   10                  15

Met Asp Tyr

<210> SEQ ID NO 133
<211> LENGTH: 54
<212> TYPE: DNA
<213> ORGANISM: Mus musculus

<400> SEQUENCE: 133
gctcgaagga gggaagttaa cttcggtatt aactattact attctatgga ctac           54

<210> SEQ ID NO 134
<211> LENGTH: 18
<212> TYPE: PRT
<213> ORGANISM: Mus musculus

<400> SEQUENCE: 134

Ala Arg Arg Arg Glu Val Asn Phe Gly Ile Asn Tyr Tyr Tyr Ser Met
1               5                   10                  15

Asp Tyr

<210> SEQ ID NO 135
<211> LENGTH: 36
<212> TYPE: DNA
<213> ORGANISM: Mus musculus

<400> SEQUENCE: 135
gtaagagatt cctatcacta cgggtacttc gatgtc                               36

<210> SEQ ID NO 136
<211> LENGTH: 12
<212> TYPE: PRT
<213> ORGANISM: Mus musculus

<400> SEQUENCE: 136

Val Arg Asp Ser Tyr His Tyr Gly Tyr Phe Asp Val
1               5                   10

<210> SEQ ID NO 137
<211> LENGTH: 324
<212> TYPE: DNA
<213> ORGANISM: Mus musculus

<400> SEQUENCE: 137
gacatcttgc tgactcagtc tccagccatc ctgtctgtga gtccaggaaa aagagtcagt 60
ttctcctgca gggccagtca gaacattggc acaagcatac actggtatca gcaaagaaca 120
aatggttctc caaggcttct cataaagtat gcttctaagt ctatatctgg gatttcttcc 180
aggtttagtg gcagtggctc agggacagat tttactctta gtatcaacag tgtggagtct 240
gaagatattg cagcttatta ctgtcaacat agttatagct tcccgtggac gttcggtgga 300
ggcaccaagc tggaaatcaa acgg 324

<210> SEQ ID NO 138
<211> LENGTH: 108
<212> TYPE: PRT
<213> ORGANISM: Mus musculus

<400> SEQUENCE: 138

Asp Ile Leu Leu Thr Gln Ser Pro Ala Ile Leu Ser Val Ser Pro Gly
1 5 10 15

Lys Arg Val Ser Phe Ser Cys Arg Ala Ser Gln Asn Ile Gly Thr Ser
20 25 30

Ile His Trp Tyr Gln Gln Arg Thr Asn Gly Ser Pro Arg Leu Leu Ile
35 40 45

Lys Tyr Ala Ser Lys Ser Ile Ser Gly Ile Ser Ser Arg Phe Ser Gly
50 55 60

Ser Gly Ser Gly Thr Asp Phe Thr Leu Ser Ile Asn Ser Val Glu Ser
65 70 75 80

Glu Asp Ile Ala Ala Tyr Tyr Cys Gln His Ser Tyr Ser Phe Pro Trp
85 90 95

Thr Phe Gly Gly Gly Thr Lys Leu Glu Ile Lys Arg
100 105

<210> SEQ ID NO 139
<211> LENGTH: 324
<212> TYPE: DNA
<213> ORGANISM: Mus musculus

<400> SEQUENCE: 139
gacatccaga tgactcagtc tccagcctcc ctatctacat ctgtgggaga aactgtcacc 60
atcacatgtc gagcaagtga aaatatttac agttatttag catggtatca gcagagacag 120
ggaaaatctc ctcacctcct ggtcaataat gcaaaaacct tagcagaagg tgtgccatca 180
aggttcagtg gcagtggatc aggcacacat ttttctctga ggatcagcgg cctgcagcct 240
gaagattttg ggagttatta ctgtcagcat cattatggta ttccgttcac gttcggaggg 300
gggaccaagt tgtcaataaa acgg 324

<210> SEQ ID NO 140
<211> LENGTH: 108
<212> TYPE: PRT
<213> ORGANISM: Mus musculus

<400> SEQUENCE: 140

Asp Ile Gln Met Thr Gln Ser Pro Ala Ser Leu Ser Thr Ser Val Gly
1 5 10 15

Glu Thr Val Thr Ile Thr Cys Arg Ala Ser Glu Asn Ile Tyr Ser Tyr
20 25 30

Leu Ala Trp Tyr Gln Gln Arg Gln Gly Lys Ser Pro His Leu Leu Val
35 40 45

Asn Asn Ala Lys Thr Leu Ala Glu Gly Val Pro Ser Arg Phe Ser Gly
    50                  55                  60

Ser Gly Ser Gly Thr His Phe Ser Leu Arg Ile Ser Gly Leu Gln Pro
65                  70                  75                  80

Glu Asp Phe Gly Ser Tyr Tyr Cys Gln His His Tyr Gly Ile Pro Phe
                85                  90                  95

Thr Phe Gly Gly Gly Thr Lys Leu Ser Ile Lys Arg
            100                 105

<210> SEQ ID NO 141
<211> LENGTH: 339
<212> TYPE: DNA
<213> ORGANISM: Mus musculus

<400> SEQUENCE: 141
gatgttgtga tgacccagat tccactcact ttgtcggtta ccattggaca accagcctcc     60
atctcttgca agtcaagtca gagcctcttt gatattgatg gaaagacata tttgaattgg    120
ttgttacaga ggccaggcca gtctccaaag cgcctaatct atctggtgtc tgaattggac    180
tctggagtcc ctgacaggtt cactggcagt ggatcaggga cagatttcac actgaaaatc    240
agcagagtgg aggctgagga tttgggagtt tactattgtt ggcaaggtac acattttccg    300
ctcacgttcg gtgctgggac caagctggag ctgaaacgg                           339

<210> SEQ ID NO 142
<211> LENGTH: 113
<212> TYPE: PRT
<213> ORGANISM: Mus musculus

<400> SEQUENCE: 142

Asp Val Val Met Thr Gln Ile Pro Leu Thr Leu Ser Val Thr Ile Gly
1               5                   10                  15

Gln Pro Ala Ser Ile Ser Cys Lys Ser Ser Gln Ser Leu Phe Asp Ile
            20                  25                  30

Asp Gly Lys Thr Tyr Leu Asn Trp Leu Leu Gln Arg Pro Gly Gln Ser
        35                  40                  45

Pro Lys Arg Leu Ile Tyr Leu Val Ser Glu Leu Asp Ser Gly Val Pro
    50                  55                  60

Asp Arg Phe Thr Gly Ser Gly Ser Gly Thr Asp Phe Thr Leu Lys Ile
65                  70                  75                  80

Ser Arg Val Glu Ala Glu Asp Leu Gly Val Tyr Tyr Cys Trp Gln Gly
                85                  90                  95

Thr His Phe Pro Leu Thr Phe Gly Ala Gly Thr Lys Leu Glu Leu Lys
            100                 105                 110

Arg

<210> SEQ ID NO 143
<211> LENGTH: 324
<212> TYPE: DNA
<213> ORGANISM: Mus musculus

<400> SEQUENCE: 143
gacatccaga tgacccagtc tccatcctcc ttatctgcct ctctgggaga aagagtcagt     60
ctcacttgtc gggcaagtca ggacattggt ggtagcttaa actggcttca gcagaaacca    120
gatggaacta ttaaacgcct gatctacgcc acatccagct tagattctgg tgtccccaaa    180
aggttcagtg gcagtaggtc tgggtcagtt ttttctctca ccatcaccag ccttgagtct    240

```
gaagattttg tagactattt ctgtctacaa tatgctagtt ctccgtatac gttcggaggg    300

gggaccaagc tggaaataaa acgg                                           324


<210> SEQ ID NO 144
<211> LENGTH: 108
<212> TYPE: PRT
<213> ORGANISM: Mus musculus

<400> SEQUENCE: 144

Asp Ile Gln Met Thr Gln Ser Pro Ser Ser Leu Ser Ala Ser Leu Gly
1               5                   10                  15

Glu Arg Val Ser Leu Thr Cys Arg Ala Ser Gln Asp Ile Gly Gly Ser
            20                  25                  30

Leu Asn Trp Leu Gln Gln Lys Pro Asp Gly Thr Ile Lys Arg Leu Ile
        35                  40                  45

Tyr Ala Thr Ser Ser Leu Asp Ser Gly Val Pro Lys Arg Phe Ser Gly
    50                  55                  60

Ser Arg Ser Gly Ser Val Phe Ser Leu Thr Ile Thr Ser Leu Glu Ser
65                  70                  75                  80

Glu Asp Phe Val Asp Tyr Phe Cys Leu Gln Tyr Ala Ser Ser Pro Tyr
                85                  90                  95

Thr Phe Gly Gly Gly Thr Lys Leu Glu Ile Lys Arg
            100                 105


<210> SEQ ID NO 145
<211> LENGTH: 324
<212> TYPE: DNA
<213> ORGANISM: Mus musculus

<400> SEQUENCE: 145

gacattgtga tgactcagtc tccagccacc ctgtctgtga ctccaggaga tagagtctct     60

ctttcctgca gggccagcca gactattagc gacttcttac actggtatca acaaaaatca    120

catgagtctc caaggcttct catcaaatat gcttcccaat ccatctctgg gatcccctcc    180

aggttcagtg gcactggatc agggtcagat ttcactctca ctatcaacag tgtggaacct    240

gaagatgttg gagtgtatta ctgtcaaagt ggtaacacct ttccgtggac gttcggtgga    300

ggcaccaagc tggaaatcaa acgg                                           324


<210> SEQ ID NO 146
<211> LENGTH: 108
<212> TYPE: PRT
<213> ORGANISM: Mus musculus

<400> SEQUENCE: 146

Asp Ile Val Met Thr Gln Ser Pro Ala Thr Leu Ser Val Thr Pro Gly
1               5                   10                  15

Asp Arg Val Ser Leu Ser Cys Arg Ala Ser Gln Thr Ile Ser Asp Phe
            20                  25                  30

Leu His Trp Tyr Gln Gln Lys Ser His Glu Ser Pro Arg Leu Leu Ile
        35                  40                  45

Lys Tyr Ala Ser Gln Ser Ile Ser Gly Ile Pro Ser Arg Phe Ser Gly
    50                  55                  60

Thr Gly Ser Gly Ser Asp Phe Thr Leu Thr Ile Asn Ser Val Glu Pro
65                  70                  75                  80

Glu Asp Val Gly Val Tyr Tyr Cys Gln Ser Gly Asn Thr Phe Pro Trp
                85                  90                  95
```

```
Thr Phe Gly Gly Gly Thr Lys Leu Glu Ile Lys Arg
            100                 105


<210> SEQ ID NO 147
<211> LENGTH: 324
<212> TYPE: DNA
<213> ORGANISM: Mus musculus

<400> SEQUENCE: 147

gacatccaga tgacacaatc ttcatcctcc ttttctggat ttctaggaga cagagtcacc      60

attacttgca gggcaagtga ggacatacac actcaattag cctggtatca gcagaaacca     120

ggaaatgctc ctaggctctt aatatctggt gcagccagtt tgaaaagtgg ggttccttca     180

agattcagtg gcactggatc tggaaaggat tacactctca gcattaccag tcttcagact     240

gaagatgttg ctacatatta ctgtcaacag tataggagta ttccgtggac gttcggtgga     300

ggcaccaagc tggaaatcaa acgg                                            324


<210> SEQ ID NO 148
<211> LENGTH: 108
<212> TYPE: PRT
<213> ORGANISM: Mus musculus

<400> SEQUENCE: 148

Asp Ile Gln Met Thr Gln Ser Ser Ser Ser Phe Ser Gly Phe Leu Gly
1               5                   10                  15

Asp Arg Val Thr Ile Thr Cys Arg Ala Ser Glu Asp Ile His Thr Gln
            20                  25                  30

Leu Ala Trp Tyr Gln Gln Lys Pro Gly Asn Ala Pro Arg Leu Leu Ile
        35                  40                  45

Ser Gly Ala Ala Ser Leu Lys Ser Gly Val Pro Ser Arg Phe Ser Gly
    50                  55                  60

Thr Gly Ser Gly Lys Asp Tyr Thr Leu Ser Ile Thr Ser Leu Gln Thr
65                  70                  75                  80

Glu Asp Val Ala Thr Tyr Tyr Cys Gln Gln Tyr Arg Ser Ile Pro Trp
                85                  90                  95

Thr Phe Gly Gly Gly Thr Lys Leu Glu Ile Lys Arg
            100                 105


<210> SEQ ID NO 149
<211> LENGTH: 339
<212> TYPE: DNA
<213> ORGANISM: Mus musculus

<400> SEQUENCE: 149

gatgttttga tgacccaaac tccgctctcc ctgcctgtca gtcttggaga tcacgcctcc      60

atctcttgca gatctagtca gtacattgtt catagtactg gaaccaccta tttagaatgg     120

tacctacaga aaccaggcca gtctccacag ctcctgatct acaaagtttc caaccgattt     180

tctggggtcc cagacaggtt cactggcagt ggatcaggga cagatttcac actcaggatc     240

agcagagtgg aggctgagga tctgggagtt tatttctgct ttcaaggttc acattttcca     300

ttcacgttcg gctcggggac aaagttggaa ataaaacgg                            339


<210> SEQ ID NO 150
<211> LENGTH: 113
<212> TYPE: PRT
<213> ORGANISM: Mus musculus
```

<400> SEQUENCE: 150

Asp Val Leu Met Thr Gln Thr Pro Leu Ser Leu Pro Val Ser Leu Gly
1 5 10 15

Asp His Ala Ser Ile Ser Cys Arg Ser Ser Gln Tyr Ile Val His Ser
20 25 30

Thr Gly Thr Thr Tyr Leu Glu Trp Tyr Leu Gln Lys Pro Gly Gln Ser
35 40 45

Pro Gln Leu Leu Ile Tyr Lys Val Ser Asn Arg Phe Ser Gly Val Pro
50 55 60

Asp Arg Phe Thr Gly Ser Gly Ser Gly Thr Asp Phe Thr Leu Arg Ile
65 70 75 80

Ser Arg Val Glu Ala Glu Asp Leu Gly Val Tyr Phe Cys Phe Gln Gly
85 90 95

Ser His Phe Pro Phe Thr Phe Gly Ser Gly Thr Lys Leu Glu Ile Lys
100 105 110

Arg

<210> SEQ ID NO 151
<211> LENGTH: 339
<212> TYPE: DNA
<213> ORGANISM: Mus musculus

<400> SEQUENCE: 151
gaagttgtga tgacccaaac tccactctcc ttgcctgtca gtcttggaga tcaagcctcc 60
atctcttgca gatctagtca ttaccttgtt catgataacg gaaacaccta tgttgaatgg 120
tacctgcaga agccaggcca gtctccaaag ctcctgatct acaaggtttc caaccgattt 180
tctggagtcc cagacaggtt tactggcagt ggttcaggga cagatttcac actcaagatc 240
agcagagtgg agtctgagga tctgggaatt tattactgct ttcaaggttc acatttccca 300
ttcacgttcg gctcggggac agagttggaa ataaaacgg 339

<210> SEQ ID NO 152
<211> LENGTH: 113
<212> TYPE: PRT
<213> ORGANISM: Mus musculus

<400> SEQUENCE: 152

Glu Val Val Met Thr Gln Thr Pro Leu Ser Leu Pro Val Ser Leu Gly
1 5 10 15

Asp Gln Ala Ser Ile Ser Cys Arg Ser Ser His Tyr Leu Val His Asp
20 25 30

Asn Gly Asn Thr Tyr Val Glu Trp Tyr Leu Gln Lys Pro Gly Gln Ser
35 40 45

Pro Lys Leu Leu Ile Tyr Lys Val Ser Asn Arg Phe Ser Gly Val Pro
50 55 60

Asp Arg Phe Thr Gly Ser Gly Ser Gly Thr Asp Phe Thr Leu Lys Ile
65 70 75 80

Ser Arg Val Glu Ser Glu Asp Leu Gly Ile Tyr Tyr Cys Phe Gln Gly
85 90 95

Ser His Phe Pro Phe Thr Phe Gly Ser Gly Thr Glu Leu Glu Ile Lys
100 105 110

Arg

<210> SEQ ID NO 153
<211> LENGTH: 339

<212> TYPE: DNA
<213> ORGANISM: Mus musculus

<400> SEQUENCE: 153
gatgttttga tgacccaaac tccactctcc ctgcctgtca gtcttggaga tcaagcctcc 60
atctcttgca gatctagtca gaacattgtc catagtactg gaaacaccta tttagaatgg 120
tacctgcaga aaccaggcca gtctccaaag ctcctgattt ataaagtttc caaccgattt 180
tctggggtcc caaacaggtt ccgtggcagt ggatcaggga cagatttcac actcaagatc 240
accagagtgg aggctgagga tctgggaatt tattactgct ttcaaggttc acattttcca 300
ttcacgttcg gctcggggac aaagttggaa ataaaacgg 339

<210> SEQ ID NO 154
<211> LENGTH: 113
<212> TYPE: PRT
<213> ORGANISM: Mus musculus

<400> SEQUENCE: 154

Asp Val Leu Met Thr Gln Thr Pro Leu Ser Leu Pro Val Ser Leu Gly
1 5 10 15

Asp Gln Ala Ser Ile Ser Cys Arg Ser Ser Gln Asn Ile Val His Ser
20 25 30

Thr Gly Asn Thr Tyr Leu Glu Trp Tyr Leu Gln Lys Pro Gly Gln Ser
35 40 45

Pro Lys Leu Leu Ile Tyr Lys Val Ser Asn Arg Phe Ser Gly Val Pro
50 55 60

Asn Arg Phe Arg Gly Ser Gly Ser Gly Thr Asp Phe Thr Leu Lys Ile
65 70 75 80

Thr Arg Val Glu Ala Glu Asp Leu Gly Ile Tyr Tyr Cys Phe Gln Gly
85 90 95

Ser His Phe Pro Phe Thr Phe Gly Ser Gly Thr Lys Leu Glu Ile Lys
100 105 110

Arg

<210> SEQ ID NO 155
<211> LENGTH: 321
<212> TYPE: DNA
<213> ORGANISM: Mus musculus

<400> SEQUENCE: 155
caaattgttc tcacccagtc tccagcaatc atgtctgcat ctccagggga gaaggtcacc 60
atgacctgca gtgtcagctc aagtgtaagt tacatacact ggtaccaaca gaagtcaggc 120
acctccccca aaagatggat ttatgacaca tccaaactgg cttctggagt ccctgctcgc 180
ttcagtggca gtgggtctgg gacctcttac tctctcacaa tcagcagcat ggaggctgaa 240
gatgctgcca cttattactg ccaccagtgg agtactaacc cacccacgtt cggaggggggg 300 accaagctgg aaataagacg g 321

<210> SEQ ID NO 156
<211> LENGTH: 107
<212> TYPE: PRT
<213> ORGANISM: Mus musculus

<400> SEQUENCE: 156

Gln Ile Val Leu Thr Gln Ser Pro Ala Ile Met Ser Ala Ser Pro Gly
1 5 10 15

```
Glu Lys Val Thr Met Thr Cys Ser Val Ser Ser Ser Val Ser Tyr Ile
            20                  25                  30

His Trp Tyr Gln Gln Lys Ser Gly Thr Ser Pro Lys Arg Trp Ile Tyr
        35                  40                  45

Asp Thr Ser Lys Leu Ala Ser Gly Val Pro Ala Arg Phe Ser Gly Ser
    50                  55                  60

Gly Ser Gly Thr Ser Tyr Ser Leu Thr Ile Ser Ser Met Glu Ala Glu
65                  70                  75                  80

Asp Ala Ala Thr Tyr Tyr Cys His Gln Trp Ser Thr Asn Pro Pro Thr
                85                  90                  95

Phe Gly Gly Gly Thr Lys Leu Glu Ile Arg Arg
            100                 105


<210> SEQ ID NO 157
<211> LENGTH: 321
<212> TYPE: DNA
<213> ORGANISM: Mus musculus

<400> SEQUENCE: 157

caaattgttc tcacccagtc tccagcactc atgtctgcat ctccagggga gaaggtcacc     60

atgacctgca gtgccagctc aagtgtaagt tacatgtgct ggtaccagca gaagccaaga    120

tcctccccca aaccctggat ttatctcaca tccaacctgg cttctggagt ccctgctcgc    180

ttcagtggca gtgggtctgg gacctcttac tctctcacaa tcagtagcat ggaggctgaa    240

gatgctgcca cttattactg ccagcagtgg agtagtaacc cacccacgtt cggtgctggg    300

accaagctgg agctgaaacg g                                              321


<210> SEQ ID NO 158
<211> LENGTH: 107
<212> TYPE: PRT
<213> ORGANISM: Mus musculus

<400> SEQUENCE: 158

Gln Ile Val Leu Thr Gln Ser Pro Ala Leu Met Ser Ala Ser Pro Gly
1               5                   10                  15

Glu Lys Val Thr Met Thr Cys Ser Ala Ser Ser Ser Val Ser Tyr Met
            20                  25                  30

Cys Trp Tyr Gln Gln Lys Pro Arg Ser Ser Pro Lys Pro Trp Ile Tyr
        35                  40                  45

Leu Thr Ser Asn Leu Ala Ser Gly Val Pro Ala Arg Phe Ser Gly Ser
    50                  55                  60

Gly Ser Gly Thr Ser Tyr Ser Leu Thr Ile Ser Ser Met Glu Ala Glu
65                  70                  75                  80

Asp Ala Ala Thr Tyr Tyr Cys Gln Gln Trp Ser Ser Asn Pro Pro Thr
                85                  90                  95

Phe Gly Ala Gly Thr Lys Leu Glu Leu Lys Arg
            100                 105


<210> SEQ ID NO 159
<211> LENGTH: 321
<212> TYPE: DNA
<213> ORGANISM: Mus musculus

<400> SEQUENCE: 159

gaaatccaga tgacacagac tccatcctcc ctgtctgcct ctctgggaga cagagtcacc     60

atcacttgca gtgcaagtca gggcattaac aattatttga actggtatca gcagaaacca    120
```

```
ggtggaaaga ctagactcct catctattat acatcaactt tacagtcagg agtcccatca    180

aggttcagtg gcagtgggtc tgggacacat tattctctca ccatcagcaa tctggaacct    240

gaagatattg ccacttacta ttgtcagcag tttagtaaac ttcggacatt cggtggaggc    300

accaggctgg aaatcaaacg g                                              321
```

```
<210> SEQ ID NO 160
<211> LENGTH: 107
<212> TYPE: PRT
<213> ORGANISM: Mus musculus

<400> SEQUENCE: 160

Glu Ile Gln Met Thr Gln Thr Pro Ser Ser Leu Ser Ala Ser Leu Gly
1               5                   10                  15

Asp Arg Val Thr Ile Thr Cys Ser Ala Ser Gln Gly Ile Asn Asn Tyr
            20                  25                  30

Leu Asn Trp Tyr Gln Gln Lys Pro Gly Gly Lys Thr Arg Leu Leu Ile
        35                  40                  45

Tyr Tyr Thr Ser Thr Leu Gln Ser Gly Val Pro Ser Arg Phe Ser Gly
    50                  55                  60

Ser Gly Ser Gly Thr His Tyr Ser Leu Thr Ile Ser Asn Leu Glu Pro
65                  70                  75                  80

Glu Asp Ile Ala Thr Tyr Tyr Cys Gln Gln Phe Ser Lys Leu Arg Thr
                85                  90                  95

Phe Gly Gly Gly Thr Arg Leu Glu Ile Lys Arg
            100                 105
```

```
<210> SEQ ID NO 161
<211> LENGTH: 324
<212> TYPE: DNA
<213> ORGANISM: Homo sapiens

<400> SEQUENCE: 161

gagattgtgc tgactcagag tccagacttc cagtcagtga cccccaagga gaaagtcacc     60

atcacatgcc gggcaagcca gaacatcggc acaagcattc actggtacca gcagaagccc    120

gatcagtccc ctaagctgct gatcaaatat gcctctaaga gtatttcagg ggtgccctct    180

agattcagcg gctccgggtc tggaacagac tttactctga ccattaactc cctggaggct    240

gaagatgccg ctacttacta ttgtcagcat agctactcat tcccttggac attcgggcag    300

gggaccaaag tggaaatcaa acgt                                           324
```

```
<210> SEQ ID NO 162
<211> LENGTH: 108
<212> TYPE: PRT
<213> ORGANISM: Homo sapiens

<400> SEQUENCE: 162

Glu Ile Val Leu Thr Gln Ser Pro Asp Phe Gln Ser Val Thr Pro Lys
1               5                   10                  15

Glu Lys Val Thr Ile Thr Cys Arg Ala Ser Gln Asn Ile Gly Thr Ser
            20                  25                  30

Ile His Trp Tyr Gln Gln Lys Pro Asp Gln Ser Pro Lys Leu Leu Ile
        35                  40                  45

Lys Tyr Ala Ser Lys Ser Ile Ser Gly Val Pro Ser Arg Phe Ser Gly
    50                  55                  60

Ser Gly Ser Gly Thr Asp Phe Thr Leu Thr Ile Asn Ser Leu Glu Ala
65                  70                  75                  80
```

Glu Asp Ala Ala Thr Tyr Tyr Cys Gln His Ser Tyr Ser Phe Pro Trp
85 90 95

Thr Phe Gly Gln Gly Thr Lys Val Glu Ile Lys Arg
100 105

<210> SEQ ID NO 163
<211> LENGTH: 339
<212> TYPE: DNA
<213> ORGANISM: Homo sapiens

<400> SEQUENCE: 163
gatattgtga tgacccaaac tccgctctcc ctgtccgtca cccctggaca gccggcctcc 60
atctcttgca gatctagtca gaacattgtt catagtactg gaaacaccta tttagaatgg 120
tacctacaga aaccaggcca gtctccacag ctcctgatct acaaagtttc caaccgattt 180
tctggggtcc cagacaggtt cagtggcagt ggatcaggga cagatttcac actcaaaatc 240
agcagagtgg aggctgagga tgttggagtt tattactgct ttcaaggttc acattttcca 300
ttcacgttcg gccaagggac caaggtggaa atcaaacgt 339

<210> SEQ ID NO 164
<211> LENGTH: 113
<212> TYPE: PRT
<213> ORGANISM: Homo sapiens

<400> SEQUENCE: 164

Asp Ile Val Met Thr Gln Thr Pro Leu Ser Leu Ser Val Thr Pro Gly
1 5 10 15

Gln Pro Ala Ser Ile Ser Cys Arg Ser Ser Gln Asn Ile Val His Ser
20 25 30

Thr Gly Asn Thr Tyr Leu Glu Trp Tyr Leu Gln Lys Pro Gly Gln Ser
35 40 45

Pro Gln Leu Leu Ile Tyr Lys Val Ser Asn Arg Phe Ser Gly Val Pro
50 55 60

Asp Arg Phe Ser Gly Ser Gly Ser Gly Thr Asp Phe Thr Leu Lys Ile
65 70 75 80

Ser Arg Val Glu Ala Glu Asp Val Gly Val Tyr Tyr Cys Phe Gln Gly
85 90 95

Ser His Phe Pro Phe Thr Phe Gly Gln Gly Thr Lys Val Glu Ile Lys
100 105 110

Arg

<210> SEQ ID NO 165
<211> LENGTH: 360
<212> TYPE: DNA
<213> ORGANISM: Mus musculus

<400> SEQUENCE: 165
caggttactc tgaaagagtc tggccctggg atattgcagc cctcccagac cctcagtctg 60
acttgttctt tctctgggtt ctcactgacc acttctggct tgggtgttgc ctggattcgt 120
cagccttcag ggaagggtct ggagtggctg gcacacattt ggtcggatgg tgacacgcgc 180
tattacccag ccctgaagaa ccgactgaca atctccaagg attcctccag caaccaggtc 240
ttcctcaaga tcgcccgtgt ggacactgca gatactgcca catactactg tgctcgaatg 300
aaggatgata gtctttactt tgacaactgg ggccaaggca ctattttcac agtctcctca 360

<210> SEQ ID NO 166
<211> LENGTH: 120
<212> TYPE: PRT
<213> ORGANISM: Mus musculus

<400> SEQUENCE: 166

Gln Val Thr Leu Lys Glu Ser Gly Pro Gly Ile Leu Gln Pro Ser Gln
1 5 10 15

Thr Leu Ser Leu Thr Cys Ser Phe Ser Gly Phe Ser Leu Thr Thr Ser
20 25 30

Gly Leu Gly Val Ala Trp Ile Arg Gln Pro Ser Gly Lys Gly Leu Glu
35 40 45

Trp Leu Ala His Ile Trp Ser Asp Gly Asp Thr Arg Tyr Tyr Pro Ala
50 55 60

Leu Lys Asn Arg Leu Thr Ile Ser Lys Asp Ser Ser Ser Asn Gln Val
65 70 75 80

Phe Leu Lys Ile Ala Arg Val Asp Thr Ala Asp Thr Ala Thr Tyr Tyr
85 90 95

Cys Ala Arg Met Lys Asp Asp Ser Leu Tyr Phe Asp Asn Trp Gly Gln
100 105 110

Gly Thr Ile Phe Thr Val Ser Ser
115 120

<210> SEQ ID NO 167
<211> LENGTH: 351
<212> TYPE: DNA
<213> ORGANISM: Mus musculus

<400> SEQUENCE: 167
cagatccagt tggtgcagtc tggggctgaa ctggcaaaac ctggggcctc agtgaggatg 60
tcctgcgaga cttctggcta cacctttact agctactgga tacactggat aaaagagagg 120
cctggacagg gtctggaatg gattggatac attaatcctg acactgatta tagtgagtac 180
aatcagaaat tcaaggacaa ggccagattg actgcagaca aatcctccac cacagcctac 240
atggagctga acagcctgac atttgatgat tctgcagtct attactgtgc aagtgctggt 300
tattattttt ttgacttctg gggccaaggc accactctca cagtctcctc a 351

<210> SEQ ID NO 168
<211> LENGTH: 117
<212> TYPE: PRT
<213> ORGANISM: Mus musculus

<400> SEQUENCE: 168

Gln Ile Gln Leu Val Gln Ser Gly Ala Glu Leu Ala Lys Pro Gly Ala
1 5 10 15

Ser Val Arg Met Ser Cys Glu Thr Ser Gly Tyr Thr Phe Thr Ser Tyr
20 25 30

Trp Ile His Trp Ile Lys Glu Arg Pro Gly Gln Gly Leu Glu Trp Ile
35 40 45

Gly Tyr Ile Asn Pro Asp Thr Asp Tyr Ser Glu Tyr Asn Gln Lys Phe
50 55 60

Lys Asp Lys Ala Arg Leu Thr Ala Asp Lys Ser Ser Thr Thr Ala Tyr
65 70 75 80

Met Glu Leu Asn Ser Leu Thr Phe Asp Asp Ser Ala Val Tyr Tyr Cys
85 90 95

Ala Ser Ala Gly Tyr Tyr Phe Phe Asp Phe Trp Gly Gln Gly Thr Thr
100 105 110

Leu Thr Val Ser Ser
        115

<210> SEQ ID NO 169
<211> LENGTH: 336
<212> TYPE: DNA
<213> ORGANISM: Mus musculus

<400> SEQUENCE: 169
gaggttcagc tgcagcagtc tggggcagaa cttgtgaaac caggggcctc agtcaagttg 60
tcctgtacaa cttctggcct caacattaaa gacatctata ttcactgggt gaagcagagg 120
cctgaacagg gcctggagtg gattgggagg attgatcctg cgaacggtaa gactgcatat 180
gacctgaagt tccaggccaa ggccactata acagcagaca catcttccaa aacagcctac 240
ctgcacctca gcagcctgac atctgaggac actgccgtct attactgtgg tagggggggcc 300 cactggggcc aaggcaccac tctcacagtc tcctca 336

<210> SEQ ID NO 170
<211> LENGTH: 112
<212> TYPE: PRT
<213> ORGANISM: Mus musculus

<400> SEQUENCE: 170

Glu Val Gln Leu Gln Gln Ser Gly Ala Glu Leu Val Lys Pro Gly Ala
1               5                   10                  15

Ser Val Lys Leu Ser Cys Thr Thr Ser Gly Leu Asn Ile Lys Asp Ile
            20                  25                  30

Tyr Ile His Trp Val Lys Gln Arg Pro Glu Gln Gly Leu Glu Trp Ile
        35                  40                  45

Gly Arg Ile Asp Pro Ala Asn Gly Lys Thr Ala Tyr Asp Leu Lys Phe
    50                  55                  60

Gln Ala Lys Ala Thr Ile Thr Ala Asp Thr Ser Ser Lys Thr Ala Tyr
65                  70                  75                  80

Leu His Leu Ser Ser Leu Thr Ser Glu Asp Thr Ala Val Tyr Tyr Cys
                85                  90                  95

Gly Arg Gly Ala His Trp Gly Gln Gly Thr Thr Leu Thr Val Ser Ser
            100                 105                 110

<210> SEQ ID NO 171
<211> LENGTH: 354
<212> TYPE: DNA
<213> ORGANISM: Mus musculus

<400> SEQUENCE: 171
cagatccagt tggtgcagtc tgggcctcag ctggttaggc ctggggcttc agtgaagata 60
tcctgcgagg cttctggtta ctcattcacc aactactgga tacactgggt gaagcagagg 120
cctggacagg gtcttgagtg gattggcatg attgatcctt ccgatgctga aactgggtta 180
aatcagaagt tcaaggacaa ggccacattg actgtagaca aatcctccag cacagcctac 240
atgcaactca gcagcccgac atctgaagac tctgcggtct attactgtgc aagaattggc 300
gattactata atatggacta ctggggtcaa ggaacctcag tcaccgtctc ctca 354

<210> SEQ ID NO 172
<211> LENGTH: 118
<212> TYPE: PRT
<213> ORGANISM: Mus musculus

<400> SEQUENCE: 172

```
Gln Ile Gln Leu Val Gln Ser Gly Pro Gln Leu Val Arg Pro Gly Ala
1               5                   10                  15

Ser Val Lys Ile Ser Cys Glu Ala Ser Gly Tyr Ser Phe Thr Asn Tyr
            20                  25                  30

Trp Ile His Trp Val Lys Gln Arg Pro Gly Gln Gly Leu Glu Trp Ile
        35                  40                  45

Gly Met Ile Asp Pro Ser Asp Ala Glu Thr Gly Leu Asn Gln Lys Phe
    50                  55                  60

Lys Asp Lys Ala Thr Leu Thr Val Asp Lys Ser Ser Ser Thr Ala Tyr
65                  70                  75                  80

Met Gln Leu Ser Ser Pro Thr Ser Glu Asp Ser Ala Val Tyr Tyr Cys
                85                  90                  95

Ala Arg Ile Gly Asp Tyr Tyr Asn Met Asp Tyr Trp Gly Gln Gly Thr
            100                 105                 110

Ser Val Thr Val Ser Ser
        115
```

<210> SEQ ID NO 173
<211> LENGTH: 366
<212> TYPE: DNA
<213> ORGANISM: Mus musculus

<400> SEQUENCE: 173

```
gaagtgaagg tggtggagtc tgggggaggt ttagtgcagc ctggagggtc cctgaaactc     60

tcctgtgcag cctctggatt cactttcagt gactatccca tgtcttgggt tcgccagact    120

ccagagaaga gactggagtg ggtcgcatac gttagtgatg gtggtggttc cacctactat    180

ccagacattg taaagggccg attcaccatc tcccgagaca atgccaagaa caccctgtac    240

cttcaaatga gcagtctgaa gtctgaggac acggccatgt atttctgtac aagacatgct    300

tcctactata gctacgacca ttctatggac tactggggtc agggaacctc agtcaccgtc    360

tcatca                                                                366
```

<210> SEQ ID NO 174
<211> LENGTH: 122
<212> TYPE: PRT
<213> ORGANISM: Mus musculus

<400> SEQUENCE: 174

```
Glu Val Lys Val Val Glu Ser Gly Gly Gly Leu Val Gln Pro Gly Gly
1               5                   10                  15

Ser Leu Lys Leu Ser Cys Ala Ala Ser Gly Phe Thr Phe Ser Asp Tyr
            20                  25                  30

Pro Met Ser Trp Val Arg Gln Thr Pro Glu Lys Arg Leu Glu Trp Val
        35                  40                  45

Ala Tyr Val Ser Asp Gly Gly Gly Ser Thr Tyr Tyr Pro Asp Ile Val
    50                  55                  60

Lys Gly Arg Phe Thr Ile Ser Arg Asp Asn Ala Lys Asn Thr Leu Tyr
65                  70                  75                  80

Leu Gln Met Ser Ser Leu Lys Ser Glu Asp Thr Ala Met Tyr Phe Cys
                85                  90                  95

Thr Arg His Ala Ser Tyr Tyr Ser Tyr Asp His Ser Met Asp Tyr Trp
            100                 105                 110

Gly Gln Gly Thr Ser Val Thr Val Ser Ser
        115                 120
```

<210> SEQ ID NO 175
<211> LENGTH: 357
<212> TYPE: DNA
<213> ORGANISM: Mus musculus

<400> SEQUENCE: 175
cagatccagt tggtgcagtc tgggggagac ttagtgaggc ctggagggtc cctgaaactc 60
tcctgtgcag cctctggatt cactttcagt agctttggca tgtcttggat tcgccagact 120
ccagacaaga ggctggagtg ggtcgcaacc attagtagtg ctggtagttt cacctactat 180
ccagacagtg tgaagggccg attcaccatc tccagagaca atgccaggaa caccctgtat 240
ctacaaatga acagtctgaa gtctgaggac tcagccatgt attactgtgc aagacggggg 300
tacgacgttg ggtgctttga ccactggggc cgaggcacca ctctcacagt ctcctca 357

<210> SEQ ID NO 176
<211> LENGTH: 119
<212> TYPE: PRT
<213> ORGANISM: Mus musculus

<400> SEQUENCE: 176

Gln Ile Gln Leu Val Gln Ser Gly Gly Asp Leu Val Arg Pro Gly Gly
1 5 10 15

Ser Leu Lys Leu Ser Cys Ala Ala Ser Gly Phe Thr Phe Ser Ser Phe
20 25 30

Gly Met Ser Trp Ile Arg Gln Thr Pro Asp Lys Arg Leu Glu Trp Val
35 40 45

Ala Thr Ile Ser Ser Ala Gly Ser Phe Thr Tyr Tyr Pro Asp Ser Val
50 55 60

Lys Gly Arg Phe Thr Ile Ser Arg Asp Asn Ala Arg Asn Thr Leu Tyr
65 70 75 80

Leu Gln Met Asn Ser Leu Lys Ser Glu Asp Ser Ala Met Tyr Tyr Cys
85 90 95

Ala Arg Arg Gly Tyr Asp Val Gly Cys Phe Asp His Trp Gly Arg Gly
100 105 110

Thr Thr Leu Thr Val Ser Ser
115

<210> SEQ ID NO 177
<211> LENGTH: 348
<212> TYPE: DNA
<213> ORGANISM: Mus musculus

<400> SEQUENCE: 177
gaggtgcacc tggtggagtc tgggggaggc ttagtgcagc ctggagggtc cctgaaactc 60
tcctgtgcag cctctggatt cactttcagt acctatggca tgtcttgggt tcgccagact 120
ccagacaaga ggctggagtt ggtcgcgacc attaatacta atggtggtac cacctattat 180
cgagacagtg tgaagggccg attcaccatc tccagagaca atgccaagaa caccctgtac 240
ctgcaaatga gcagtctgaa gtctgatgac acagccatgt attactgtgc aagagactac 300
ggggctatgg actactgggg tcaaggaacc tcagtcaccg tctcctca 348

<210> SEQ ID NO 178
<211> LENGTH: 116
<212> TYPE: PRT
<213> ORGANISM: Mus musculus

<400> SEQUENCE: 178

```
Glu Val His Leu Val Glu Ser Gly Gly Gly Leu Val Gln Pro Gly Gly
1               5                   10                  15

Ser Leu Lys Leu Ser Cys Ala Ala Ser Gly Phe Thr Phe Ser Thr Tyr
            20                  25                  30

Gly Met Ser Trp Val Arg Gln Thr Pro Asp Lys Arg Leu Glu Leu Val
        35                  40                  45

Ala Thr Ile Asn Thr Asn Gly Gly Thr Thr Tyr Tyr Arg Asp Ser Val
    50                  55                  60

Lys Gly Arg Phe Thr Ile Ser Arg Asp Asn Ala Lys Asn Thr Leu Tyr
65                  70                  75                  80

Leu Gln Met Ser Ser Leu Lys Ser Asp Asp Thr Ala Met Tyr Tyr Cys
                85                  90                  95

Ala Arg Asp Tyr Gly Ala Met Asp Tyr Trp Gly Gln Gly Thr Ser Val
            100                 105                 110

Thr Val Ser Ser
        115
```

<210> SEQ ID NO 179
<211> LENGTH: 345
<212> TYPE: DNA
<213> ORGANISM: Mus musculus

<400> SEQUENCE: 179

```
gatgtgcacc tggtggagtc tgggggaggc ttagtgcagc ctggagggtc cctgacagtc      60

tcctgcgcag cctctggatt cactttcagt acctatggca tgtcttgggt tcgccagact     120

cgagacaaga ggctggagtt ggtcgcaacc ataaatacta atggtggtaa cacctattat     180

tcagacaatg tgaagggccg attcaccatt tccagagaca atgccaagaa caccctgtat     240

ttggaaatga gaggtctgag gtctggggac acagccatgt attactgtgc aagagactac     300

ggggctatgg actactgggg tcaaggaacc tcagtcaccg tctct                     345
```

<210> SEQ ID NO 180
<211> LENGTH: 115
<212> TYPE: PRT
<213> ORGANISM: Mus musculus

<400> SEQUENCE: 180

```
Asp Val His Leu Val Glu Ser Gly Gly Gly Leu Val Gln Pro Gly Gly
1               5                   10                  15

Ser Leu Thr Val Ser Cys Ala Ala Ser Gly Phe Thr Phe Ser Thr Tyr
            20                  25                  30

Gly Met Ser Trp Val Arg Gln Thr Arg Asp Lys Arg Leu Glu Leu Val
        35                  40                  45

Ala Thr Ile Asn Thr Asn Gly Gly Asn Thr Tyr Tyr Ser Asp Asn Val
    50                  55                  60

Lys Gly Arg Phe Thr Ile Ser Arg Asp Asn Ala Lys Asn Thr Leu Tyr
65                  70                  75                  80

Leu Glu Met Arg Gly Leu Arg Ser Gly Asp Thr Ala Met Tyr Tyr Cys
                85                  90                  95

Ala Arg Asp Tyr Gly Ala Met Asp Tyr Trp Gly Gln Gly Thr Ser Val
            100                 105                 110

Thr Val Ser
        115
```

<210> SEQ ID NO 181
<211> LENGTH: 348
<212> TYPE: DNA
<213> ORGANISM: Mus musculus

<400> SEQUENCE: 181
gaggtgcagc tgcagcagcc tggggggaggc ttagtacagc ctggagggtc cctgacactc 60
tcctgtgcaa cctctggatt cactttcagt agttatggca tgtcttgggt tcgccagact 120
ccagccaaga ggctggagtt ggtcgcaacc attagtacta atggtgccac cgccaattat 180
ccagacagtg tgaagggccg attcaccatc tccagagaca atgccaagag caccctgtac 240
ctacaaatgc gcagtctgaa gtctgaggac acagccatgt attactgtgc aactgaaaag 300
ggagctatgg gctactgggg tcaaggaacc tcagtcaccg tctcctca 348

<210> SEQ ID NO 182
<211> LENGTH: 116
<212> TYPE: PRT
<213> ORGANISM: Mus musculus

<400> SEQUENCE: 182

Glu Val Gln Leu Gln Gln Pro Gly Gly Gly Leu Val Gln Pro Gly Gly
1 5 10 15

Ser Leu Thr Leu Ser Cys Ala Thr Ser Gly Phe Thr Phe Ser Ser Tyr
20 25 30

Gly Met Ser Trp Val Arg Gln Thr Pro Ala Lys Arg Leu Glu Leu Val
35 40 45

Ala Thr Ile Ser Thr Asn Gly Ala Thr Ala Asn Tyr Pro Asp Ser Val
50 55 60

Lys Gly Arg Phe Thr Ile Ser Arg Asp Asn Ala Lys Ser Thr Leu Tyr
65 70 75 80

Leu Gln Met Arg Ser Leu Lys Ser Glu Asp Thr Ala Met Tyr Tyr Cys
85 90 95

Ala Thr Glu Lys Gly Ala Met Gly Tyr Trp Gly Gln Gly Thr Ser Val
100 105 110

Thr Val Ser Ser
115

<210> SEQ ID NO 183
<211> LENGTH: 381
<212> TYPE: DNA
<213> ORGANISM: Mus musculus

<400> SEQUENCE: 183
caagttactc taaaagagtc tggccctggg atattgaagc cctcacagac cctcagtctg 60
acttgttctt tctctgggtt ttcactgacc acttctggta tgggtgtagg ctggattcgt 120
cagccttcag ggaagggtct ggagtggctg gcacacattt ggtgggatga tgataagtac 180
tataatccat ccctgaagag ccaggtcaca atctccaagg acacctccag aaaccaggta 240
ttcctcaaga tcaccagtgt ggacactgca gatactgcca cttactactg tgctcgaaga 300
actgagacta tgattacgac agtgctatat tactatgcta tggactactg gggtcaagga 360
acctcagtca ccgtctcctc a 381

<210> SEQ ID NO 184
<211> LENGTH: 127
<212> TYPE: PRT
<213> ORGANISM: Mus musculus

<400> SEQUENCE: 184

Gln Val Thr Leu Lys Glu Ser Gly Pro Gly Ile Leu Lys Pro Ser Gln
1               5                   10                  15

Thr Leu Ser Leu Thr Cys Ser Phe Ser Gly Phe Ser Leu Thr Thr Ser
            20                  25                  30

Gly Met Gly Val Gly Trp Ile Arg Gln Pro Ser Gly Lys Gly Leu Glu
        35                  40                  45

Trp Leu Ala His Ile Trp Trp Asp Asp Asp Lys Tyr Tyr Asn Pro Ser
    50                  55                  60

Leu Lys Ser Gln Val Thr Ile Ser Lys Asp Thr Ser Arg Asn Gln Val
65                  70                  75                  80

Phe Leu Lys Ile Thr Ser Val Asp Thr Ala Asp Thr Ala Thr Tyr Tyr
                85                  90                  95

Cys Ala Arg Arg Thr Glu Thr Met Ile Thr Thr Val Leu Tyr Tyr Tyr
            100                 105                 110

Ala Met Asp Tyr Trp Gly Gln Gly Thr Ser Val Thr Val Ser Ser
        115                 120                 125

<210> SEQ ID NO 185
<211> LENGTH: 378
<212> TYPE: DNA
<213> ORGANISM: Mus musculus

<400> SEQUENCE: 185
caagttactc taaaagagtc tggccctggg atattgaagc cctcacagac cctcagtctg 60
acttgttctt tctctggatt ttcactgagc acttctggtt tgggtgtagg ctggattcgt 120
cagccttcag ggaagggtct ggagtggctg gcacacattt ggtgggatga tgataagtac 180
tataatccat cccttaagag acagatcaca atctccaagg attcctccag aaaccaggta 240
ttcctcaaga tcaccaatgt ggacactgca gatactgcca cttactactg tgctcgaagg 300
agggaagtta acttcggtat taactattac tattctatgg actactgggg tcaaggaacc 360
tcagtcaccg tctcctca 378

<210> SEQ ID NO 186
<211> LENGTH: 126
<212> TYPE: PRT
<213> ORGANISM: Mus musculus

<400> SEQUENCE: 186

Gln Val Thr Leu Lys Glu Ser Gly Pro Gly Ile Leu Lys Pro Ser Gln
1               5                   10                  15

Thr Leu Ser Leu Thr Cys Ser Phe Ser Gly Phe Ser Leu Ser Thr Ser
            20                  25                  30

Gly Leu Gly Val Gly Trp Ile Arg Gln Pro Ser Gly Lys Gly Leu Glu
        35                  40                  45

Trp Leu Ala His Ile Trp Trp Asp Asp Asp Lys Tyr Tyr Asn Pro Ser
    50                  55                  60

Leu Lys Arg Gln Ile Thr Ile Ser Lys Asp Ser Ser Arg Asn Gln Val
65                  70                  75                  80

Phe Leu Lys Ile Thr Asn Val Asp Thr Ala Asp Thr Ala Thr Tyr Tyr
                85                  90                  95

Cys Ala Arg Arg Arg Glu Val Asn Phe Gly Ile Asn Tyr Tyr Tyr Ser
            100                 105                 110

Met Asp Tyr Trp Gly Gln Gly Thr Ser Val Thr Val Ser Ser
        115                 120                 125

<210> SEQ ID NO 187
<211> LENGTH: 363
<212> TYPE: DNA
<213> ORGANISM: Mus musculus

<400> SEQUENCE: 187
gaggtgaagc tggtggagtc tggaggacgc ttggtacagc ctgggaattc tctgagactc 60
tcctgtgcaa cttctggatt caccttcagt gattattaca tgagttgggt ccgccagact 120
ccaggaaggg cacttgagtg gttgagtttt attagaaatc gggctaatgg ttacacaaca 180
gagtacagtg catctgtgaa gggtcgattc accatctcca gagataattc ccaaagcatc 240
ctctatcttc acatgagcac cctgagacct gaggacagtg ccacttatta ctgtgtaaga 300
gattcctatc actacgggta cttcgatgtc tggggcgcag ggaccacggt caccgtctcc 360
tca 363

<210> SEQ ID NO 188
<211> LENGTH: 121
<212> TYPE: PRT
<213> ORGANISM: Mus musculus

<400> SEQUENCE: 188

Glu Val Lys Leu Val Glu Ser Gly Gly Arg Leu Val Gln Pro Gly Asn
1 5 10 15

Ser Leu Arg Leu Ser Cys Ala Thr Ser Gly Phe Thr Phe Ser Asp Tyr
20 25 30

Tyr Met Ser Trp Val Arg Gln Thr Pro Gly Arg Ala Leu Glu Trp Leu
35 40 45

Ser Phe Ile Arg Asn Arg Ala Asn Gly Tyr Thr Thr Glu Tyr Ser Ala
50 55 60

Ser Val Lys Gly Arg Phe Thr Ile Ser Arg Asp Asn Ser Gln Ser Ile
65 70 75 80

Leu Tyr Leu His Met Ser Thr Leu Arg Pro Glu Asp Ser Ala Thr Tyr
85 90 95

Tyr Cys Val Arg Asp Ser Tyr His Tyr Gly Tyr Phe Asp Val Trp Gly
100 105 110

Ala Gly Thr Thr Val Thr Val Ser Ser
115 120

<210> SEQ ID NO 189
<211> LENGTH: 360
<212> TYPE: DNA
<213> ORGANISM: Homo sapiens

<400> SEQUENCE: 189
caggtgaccc tgaaggaatc cgggcctact ctggtgaaac ctacccagac tctgactctg 60
acttgtactt ttagcggctt ctcactgacc acatctggac tgggagtggc ttggatcaga 120
cagcctcctg gaaaggccct ggagtggctg gctcacattt ggagcgacgg cgatactcgg 180
tactatccag ccctgaaaaa cagactgact atcaccaagg acacatccaa aaaccaggtg 240
gtcctgacaa tgactaatat ggaccccgtc gataccgcaa catactattg cgcccatatg 300
aaggatgact ctctgtactt tgataactgg gggcagggaa ctctggtgac cgtgagcagc 360

<210> SEQ ID NO 190
<211> LENGTH: 120
<212> TYPE: PRT

<213> ORGANISM: Homo sapiens

<400> SEQUENCE: 190

Gln Val Thr Leu Lys Glu Ser Gly Pro Thr Leu Val Lys Pro Thr Gln
1 5 10 15

Thr Leu Thr Leu Thr Cys Thr Phe Ser Gly Phe Ser Leu Thr Thr Ser
20 25 30

Gly Leu Gly Val Ala Trp Ile Arg Gln Pro Pro Gly Lys Ala Leu Glu
35 40 45

Trp Leu Ala His Ile Trp Ser Asp Gly Asp Thr Arg Tyr Tyr Pro Ala
50 55 60

Leu Lys Asn Arg Leu Thr Ile Thr Lys Asp Thr Ser Lys Asn Gln Val
65 70 75 80

Val Leu Thr Met Thr Asn Met Asp Pro Val Asp Thr Ala Thr Tyr Tyr
85 90 95

Cys Ala His Met Lys Asp Asp Ser Leu Tyr Phe Asp Asn Trp Gly Gln
100 105 110

Gly Thr Leu Val Thr Val Ser Ser
115 120

<210> SEQ ID NO 191
<211> LENGTH: 348
<212> TYPE: DNA
<213> ORGANISM: Homo sapiens

<400> SEQUENCE: 191
gaggtgcagc tgctggaatc tggggggga ctggtgcagc ctggaggaag cctgagactg 60
agttgtgccg caagtgggtt tacatttagc tcctacggaa tgagctgggt gaggcaggct 120
ccaggcaagg gactggagtg ggtctctgca atcagtacca acggagccac agcttactat 180
gccgactccg tgaagggccg gttcactatc tcaagagata acagcaagaa caccctgtat 240
ctgcagatga attctctgcg ggcagaagac acagccgtct actattgcgc tactgagaaa 300
ggggcaatga gccactgggg acagggcaca ctggtgaccg tgagttcc 348

<210> SEQ ID NO 192
<211> LENGTH: 116
<212> TYPE: PRT
<213> ORGANISM: Homo sapiens

<400> SEQUENCE: 192

Glu Val Gln Leu Leu Glu Ser Gly Gly Gly Leu Val Gln Pro Gly Gly
1 5 10 15

Ser Leu Arg Leu Ser Cys Ala Ala Ser Gly Phe Thr Phe Ser Ser Tyr
20 25 30

Gly Met Ser Trp Val Arg Gln Ala Pro Gly Lys Gly Leu Glu Trp Val
35 40 45

Ser Ala Ile Ser Thr Asn Gly Ala Thr Ala Tyr Tyr Ala Asp Ser Val
50 55 60

Lys Gly Arg Phe Thr Ile Ser Arg Asp Asn Ser Lys Asn Thr Leu Tyr
65 70 75 80

Leu Gln Met Asn Ser Leu Arg Ala Glu Asp Thr Ala Val Tyr Tyr Cys
85 90 95

Ala Thr Glu Lys Gly Ala Met Ser His Trp Gly Gln Gly Thr Leu Val
100 105 110

Thr Val Ser Ser
115

<210> SEQ ID NO 193
<211> LENGTH: 318
<212> TYPE: DNA
<213> ORGANISM: Homo sapiens

<400> SEQUENCE: 193
accgtggccg cccccctccgt gttcatcttc cccccctccg acgagcagct gaagtccggc 60
accgcctccg tggtgtgcct gctgaacaac ttctacccca gggaggccaa ggtgcagtgg 120
aaggtggaca acgccctgca gtccggcaac tcccaggagt ccgtgaccga gcaggactcc 180
aaggactcca cctactccct gtcctccacc ctgaccctgt ccaaggccga ctacgagaag 240
cacaaggtgt acgcctgcga ggtgacccac cagggcctgt cctcccccgt gaccaagtcc 300
ttcaacaggg gcgagtgc 318

<210> SEQ ID NO 194
<211> LENGTH: 106
<212> TYPE: PRT
<213> ORGANISM: Homo sapiens

<400> SEQUENCE: 194

Thr Val Ala Ala Pro Ser Val Phe Ile Phe Pro Pro Ser Asp Glu Gln
1 5 10 15

Leu Lys Ser Gly Thr Ala Ser Val Val Cys Leu Leu Asn Asn Phe Tyr
20 25 30

Pro Arg Glu Ala Lys Val Gln Trp Lys Val Asp Asn Ala Leu Gln Ser
35 40 45

Gly Asn Ser Gln Glu Ser Val Thr Glu Gln Asp Ser Lys Asp Ser Thr
50 55 60

Tyr Ser Leu Ser Ser Thr Leu Thr Leu Ser Lys Ala Asp Tyr Glu Lys
65 70 75 80

His Lys Val Tyr Ala Cys Glu Val Thr His Gln Gly Leu Ser Ser Pro
85 90 95

Val Thr Lys Ser Phe Asn Arg Gly Glu Cys
100 105

<210> SEQ ID NO 195
<211> LENGTH: 318
<212> TYPE: DNA
<213> ORGANISM: Homo sapiens

<400> SEQUENCE: 195
ggacagccaa aggcagcacc atctgtgacc ctgttcccac ctagctccga ggagctgcag 60
gccaacaagg ccaccctggt gtgcctgatc tccgactttt acccaggagc agtgacagtg 120
gcatggaagg ccgattctag ccctgtgaag gccggcgtgg agaccacaac cccatctaag 180
cagagcaaca ataagtacgc cgcctcctct tatctgtccc tgacccccga gcagtggaag 240
tctcaccgga gctattcctg ccaggtgaca cacgagggca gcacagtgga gaagaccgtg 300
gcccctacag agtgttcc 318

<210> SEQ ID NO 196
<211> LENGTH: 106
<212> TYPE: PRT
<213> ORGANISM: Homo sapiens

<400> SEQUENCE: 196

Gly Gln Pro Lys Ala Ala Pro Ser Val Thr Leu Phe Pro Pro Ser Ser

```
1               5                   10                  15

Glu Glu Leu Gln Ala Asn Lys Ala Thr Leu Val Cys Leu Ile Ser Asp
            20                  25                  30

Phe Tyr Pro Gly Ala Val Thr Val Ala Trp Lys Ala Asp Ser Ser Pro
        35                  40                  45

Val Lys Ala Gly Val Glu Thr Thr Thr Pro Ser Lys Gln Ser Asn Asn
    50                  55                  60

Lys Tyr Ala Ala Ser Ser Tyr Leu Ser Leu Thr Pro Glu Gln Trp Lys
65                  70                  75                  80

Ser His Arg Ser Tyr Ser Cys Gln Val Thr His Glu Gly Ser Thr Val
                85                  90                  95

Glu Lys Thr Val Ala Pro Thr Glu Cys Ser
            100                 105
```

<210> SEQ ID NO 197
<211> LENGTH: 978
<212> TYPE: DNA
<213> ORGANISM: Homo sapiens

<400> SEQUENCE: 197

```
gcctccacca agggcccctc cgtgttcccc ctggcccct  gctccaggtc cacctccgag     60

tccaccgccg ccctgggctg cctggtgaag gactacttcc ccgagcccgt gaccgtgtcc    120

tggaactccg gcgccctgac ctccggcgtg cacaccttcc ccgccgtgct gcagtcctcc    180

ggcctgtact ccctgtcctc cgtggtgacc gtgccctcct cctccctggg caccaagacc    240

tacacctgca acgtggacca caagccctcc aacaccaagg tggacaagag ggtggagtcc    300

aagtacggcc ccccctgccc cccctgcccc gcccccgagg ccgccggcgg ccccctccgtg   360

ttcctgttcc cccccaagcc caaggacacc ctgatgatct ccaggacccc cgaggtgacc    420

tgcgtggtgg tggacgtgtc ccaggaggac cccgaggtgc agttcaactg gtacgtggac    480

ggcgtggagg tgcacaacgc caagaccaag cccagggagg agcagttcaa ctccacctac    540

agggtggtgt ccgtgctgac cgtgctgcac caggactggc tgaacggcaa ggagtacaag    600

tgcaaggtgt ccaacaaggg cctgccctcc tccatcgaga agaccatctc caaggccaag    660

ggccagccca gggagcccca ggtgtacacc ctgcccccct cccaggagga gatgaccaag    720

aaccaggtgt ccctgacctg cctggtgaag ggcttctacc cctccgacat cgccgtggag    780

tgggagtcca acggccagcc cgagaacaac tacaagacca ccccccccgt gctggactcc    840

gacggctcct tcttcctgta ctccaggctg accgtggaca agtccaggtg gcaggagggc    900

aacgtgttct cctgctccgt gatgcacgag gccctgcaca accactacac ccagaagtcc    960

ctgtccctgt ccctgggc                                                  978
```

<210> SEQ ID NO 198
<211> LENGTH: 326
<212> TYPE: PRT
<213> ORGANISM: Homo sapiens

<400> SEQUENCE: 198

```
Ala Ser Thr Lys Gly Pro Ser Val Phe Pro Leu Ala Pro Cys Ser Arg
1               5                   10                  15

Ser Thr Ser Glu Ser Thr Ala Ala Leu Gly Cys Leu Val Lys Asp Tyr
            20                  25                  30

Phe Pro Glu Pro Val Thr Val Ser Trp Asn Ser Gly Ala Leu Thr Ser
        35                  40                  45
```

```
Gly Val His Thr Phe Pro Ala Val Leu Gln Ser Ser Gly Leu Tyr Ser
    50                  55                  60

Leu Ser Ser Val Val Thr Val Pro Ser Ser Ser Leu Gly Thr Lys Thr
65                  70                  75                  80

Tyr Thr Cys Asn Val Asp His Lys Pro Ser Asn Thr Lys Val Asp Lys
                85                  90                  95

Arg Val Glu Ser Lys Tyr Gly Pro Pro Cys Pro Pro Cys Pro Ala Pro
            100                 105                 110

Glu Ala Ala Gly Gly Pro Ser Val Phe Leu Phe Pro Pro Lys Pro Lys
        115                 120                 125

Asp Thr Leu Met Ile Ser Arg Thr Pro Glu Val Thr Cys Val Val Val
    130                 135                 140

Asp Val Ser Gln Glu Asp Pro Glu Val Gln Phe Asn Trp Tyr Val Asp
145                 150                 155                 160

Gly Val Glu Val His Asn Ala Lys Thr Lys Pro Arg Glu Glu Gln Phe
                165                 170                 175

Asn Ser Thr Tyr Arg Val Val Ser Val Leu Thr Val Leu His Gln Asp
            180                 185                 190

Trp Leu Asn Gly Lys Glu Tyr Lys Cys Lys Val Ser Asn Lys Gly Leu
        195                 200                 205

Pro Ser Ser Ile Glu Lys Thr Ile Ser Lys Ala Lys Gly Gln Pro Arg
    210                 215                 220

Glu Pro Gln Val Tyr Thr Leu Pro Pro Ser Gln Glu Glu Met Thr Lys
225                 230                 235                 240

Asn Gln Val Ser Leu Thr Cys Leu Val Lys Gly Phe Tyr Pro Ser Asp
                245                 250                 255

Ile Ala Val Glu Trp Glu Ser Asn Gly Gln Pro Glu Asn Asn Tyr Lys
            260                 265                 270

Thr Thr Pro Pro Val Leu Asp Ser Asp Gly Ser Phe Phe Leu Tyr Ser
        275                 280                 285

Arg Leu Thr Val Asp Lys Ser Arg Trp Gln Glu Gly Asn Val Phe Ser
    290                 295                 300

Cys Ser Val Met His Glu Ala Leu His Asn His Tyr Thr Gln Lys Ser
305                 310                 315                 320

Leu Ser Leu Ser Leu Gly
                325
```

<210> SEQ ID NO 199
<211> LENGTH: 20
<212> TYPE: DNA
<213> ORGANISM: Artificial Sequence
<220> FEATURE:
<223> OTHER INFORMATION: Synthetic construct

<400> SEQUENCE: 199
tttggrggga agatgaagac 20

<210> SEQ ID NO 200
<211> LENGTH: 21
<212> TYPE: DNA
<213> ORGANISM: Artificial Sequence
<220> FEATURE:
<223> OTHER INFORMATION: Synthetic construct

<400> SEQUENCE: 200
ttaacactct cccctgttga a 21

<210> SEQ ID NO 201
<211> LENGTH: 21
<212> TYPE: DNA
<213> ORGANISM: Artificial Sequence
<220> FEATURE:
<223> OTHER INFORMATION: Synthetic construct

<400> SEQUENCE: 201
ttaacactca ttcctgttga a 21

<210> SEQ ID NO 202
<211> LENGTH: 21
<212> TYPE: DNA
<213> ORGANISM: Artificial Sequence
<220> FEATURE:
<223> OTHER INFORMATION: Synthetic construct

<400> SEQUENCE: 202
tggacaggga tccagagttc c 21

<210> SEQ ID NO 203
<211> LENGTH: 21
<212> TYPE: DNA
<213> ORGANISM: Artificial Sequence
<220> FEATURE:
<223> OTHER INFORMATION: Synthetic construct

<400> SEQUENCE: 203
tggacagggc tccatagttc c 21

<210> SEQ ID NO 204
<211> LENGTH: 20
<212> TYPE: DNA
<213> ORGANISM: Artificial Sequence
<220> FEATURE:
<223> OTHER INFORMATION: Synthetic construct

<400> SEQUENCE: 204
actcgtcctt ggtcaacgtg 20

<210> SEQ ID NO 205
<211> LENGTH: 9
<212> TYPE: PRT
<213> ORGANISM: Mus musculus

<400> SEQUENCE: 205

Gln His Ser Tyr Ser Trp Pro Trp Thr
1 5

<210> SEQ ID NO 206
<211> LENGTH: 326
<212> TYPE: PRT
<213> ORGANISM: Homo sapiens

<400> SEQUENCE: 206

Ala Ser Thr Lys Gly Pro Ser Val Phe Pro Leu Ala Pro Cys Ser Arg
1 5 10 15

Ser Thr Ser Glu Ser Thr Ala Ala Leu Gly Cys Leu Val Lys Asp Tyr
20 25 30

Phe Pro Glu Pro Val Thr Val Ser Trp Asn Ser Gly Ala Leu Thr Ser
35 40 45

Gly Val His Thr Phe Pro Ala Val Leu Gln Ser Ser Gly Leu Tyr Ser
50 55 60

Leu Ser Ser Val Val Thr Val Pro Ser Ser Asn Phe Gly Thr Gln Thr

```
65                  70                  75                  80

Tyr Thr Cys Asn Val Asp His Lys Pro Ser Asn Thr Lys Val Asp Lys
                85                  90                  95

Thr Val Glu Arg Lys Cys Cys Val Glu Cys Pro Pro Cys Pro Ala Pro
            100                 105                 110

Pro Val Ala Gly Pro Ser Val Phe Leu Phe Pro Pro Lys Pro Lys Asp
        115                 120                 125

Thr Leu Met Ile Ser Arg Thr Pro Glu Val Thr Cys Val Val Val Asp
    130                 135                 140

Val Ser His Glu Asp Pro Glu Val Gln Phe Asn Trp Tyr Val Asp Gly
145                 150                 155                 160

Val Glu Val His Asn Ala Lys Thr Lys Pro Arg Glu Glu Gln Phe Asn
                165                 170                 175

Ser Thr Phe Arg Val Val Ser Val Leu Thr Val Val His Gln Asp Trp
            180                 185                 190

Leu Asn Gly Lys Glu Tyr Lys Cys Lys Val Ser Asn Lys Gly Leu Pro
        195                 200                 205

Ala Pro Ile Glu Lys Thr Ile Ser Lys Thr Lys Gly Gln Pro Arg Glu
    210                 215                 220

Pro Gln Val Tyr Thr Leu Pro Pro Ser Arg Glu Glu Met Thr Lys Asn
225                 230                 235                 240

Gln Val Ser Leu Thr Cys Leu Val Lys Gly Phe Tyr Pro Ser Asp Ile
                245                 250                 255

Ser Val Glu Trp Glu Ser Asn Gly Gln Pro Glu Asn Asn Tyr Lys Thr
            260                 265                 270

Thr Pro Pro Met Leu Asp Ser Asp Gly Ser Phe Phe Leu Tyr Ser Lys
        275                 280                 285

Leu Thr Val Asp Lys Ser Arg Trp Gln Gln Gly Asn Val Phe Ser Cys
    290                 295                 300

Ser Val Met His Glu Ala Leu His Asn His Tyr Thr Gln Lys Ser Leu
305                 310                 315                 320

Ser Leu Ser Pro Gly Lys
                325


<210> SEQ ID NO 207
<211> LENGTH: 137
<212> TYPE: PRT
<213> ORGANISM: Homo sapiens

<400> SEQUENCE: 207

Gly Ile Pro Pro His Val Gln Lys Ser Val Asn Asn Asp Met Ile Val
1               5                   10                  15

Thr Asp Asn Asn Gly Ala Val Lys Phe Pro Gln Leu Cys Lys Phe Cys
            20                  25                  30

Asp Val Arg Phe Ser Thr Cys Asp Asn Gln Lys Ser Cys Met Ser Asn
        35                  40                  45

Cys Ser Ile Thr Ser Ile Cys Glu Lys Pro Gln Glu Val Cys Val Ala
    50                  55                  60

Val Trp Arg Lys Asn Asp Glu Asn Ile Thr Leu Glu Thr Val Cys His
65                  70                  75                  80

Asp Pro Lys Leu Pro Tyr His Asp Phe Ile Leu Glu Asp Ala Ala Ser
                85                  90                  95

Pro Lys Cys Ile Met Lys Glu Lys Lys Lys Pro Gly Glu Thr Phe Phe
            100                 105                 110
```

```
Met Cys Ser Cys Ser Ser Asp Glu Cys Asn Asp Asn Ile Ile Phe Ser
        115                 120                 125

Glu Glu Tyr Asn Thr Ser Asn Pro Asp
    130                 135


<210> SEQ ID NO 208
<211> LENGTH: 10
<212> TYPE: PRT
<213> ORGANISM: Artificial Sequence
<220> FEATURE:
<223> OTHER INFORMATION: Synthetic construct

<400> SEQUENCE: 208

Gly Gly Gly Gly Ser Gly Gly Gly Gly Ser
1               5                   10


<210> SEQ ID NO 209
<211> LENGTH: 15
<212> TYPE: PRT
<213> ORGANISM: Artificial Sequence
<220> FEATURE:
<223> OTHER INFORMATION: Synthetic construct

<400> SEQUENCE: 209

Gly Gly Gly Gly Ser Gly Gly Gly Gly Ser Gly Gly Gly Gly Ser
1               5                   10                  15


<210> SEQ ID NO 210
<211> LENGTH: 20
<212> TYPE: PRT
<213> ORGANISM: Artificial Sequence
<220> FEATURE:
<223> OTHER INFORMATION: Synthetic construct

<400> SEQUENCE: 210

Gly Gly Gly Gly Ser Gly Gly Gly Gly Ser Gly Gly Gly Gly Ser Gly
1               5                   10                  15

Gly Gly Gly Ser
            20


<210> SEQ ID NO 211
<211> LENGTH: 214
<212> TYPE: PRT
<213> ORGANISM: Homo sapiens

<400> SEQUENCE: 211

Glu Ile Val Leu Thr Gln Ser Pro Asp Phe Gln Ser Val Thr Pro Lys
1               5                   10                  15

Glu Lys Val Thr Ile Thr Cys Arg Ala Ser Gln Asn Ile Gly Thr Ser
            20                  25                  30

Ile His Trp Tyr Gln Gln Lys Pro Asp Gln Tyr Pro Lys Leu Leu Ile
        35                  40                  45

Lys Tyr Ala Ser Lys Ser Ile Ser Gly Val Pro Ser Arg Phe Ser Gly
    50                  55                  60

Ser Gly Ser Gly Thr Asp Phe Thr Leu Thr Ile Asn Ser Leu Glu Ala
65                  70                  75                  80

Glu Asp Ala Ala Thr Tyr Tyr Cys Gln His Ser Tyr Ser Phe Pro Trp
                85                  90                  95

Thr Phe Gly Gln Gly Thr Lys Val Glu Ile Lys Arg Thr Val Ala Ala
            100                 105                 110

Pro Ser Val Phe Ile Phe Pro Pro Ser Asp Glu Gln Leu Lys Ser Gly
        115                 120                 125
```

Thr Ala Ser Val Val Cys Leu Leu Asn Asn Phe Tyr Pro Arg Glu Ala
130 135 140

Lys Val Gln Trp Lys Val Asp Asn Ala Leu Gln Ser Gly Asn Ser Gln
145 150 155 160

Glu Ser Val Thr Glu Gln Asp Ser Lys Asp Ser Thr Tyr Ser Leu Ser
165 170 175

Ser Thr Leu Thr Leu Ser Lys Ala Asp Tyr Glu Lys His Lys Val Tyr
180 185 190

Ala Cys Glu Val Thr His Gln Gly Leu Ser Ser Pro Val Thr Lys Ser
195 200 205

Phe Asn Arg Gly Glu Cys
210

<210> SEQ ID NO 212
<211> LENGTH: 603
<212> TYPE: PRT
<213> ORGANISM: Artificial Sequence
<220> FEATURE:
<223> OTHER INFORMATION: Synthetic construct

<400> SEQUENCE: 212

Gln Val Thr Leu Lys Glu Ser Gly Pro Thr Leu Val Lys Pro Thr Gln
1 5 10 15

Thr Leu Thr Leu Thr Cys Thr Phe Ser Gly Phe Ser Leu Thr Thr Ser
20 25 30

Gly Leu Gly Val Ala Trp Ile Arg Gln Pro Pro Gly Lys Ala Leu Glu
35 40 45

Trp Leu Ala His Ile Trp Ser Asp Gly Asp Thr Arg Tyr Tyr Pro Ala
50 55 60

Leu Lys Asn Arg Leu Thr Ile Thr Lys Asp Thr Ser Lys Asn Gln Val
65 70 75 80

Val Leu Thr Met Thr Asn Met Asp Pro Val Asp Thr Ala Thr Tyr Tyr
85 90 95

Cys Ala His Met Lys Asp Asp Ser Leu Tyr Phe Asp Asn Trp Gly Gln
100 105 110

Gly Thr Leu Val Thr Val Ser Ser Ala Ser Thr Lys Gly Pro Ser Val
115 120 125

Phe Pro Leu Ala Pro Cys Ser Arg Ser Thr Ser Glu Ser Thr Ala Ala
130 135 140

Leu Gly Cys Leu Val Lys Asp Tyr Phe Pro Glu Pro Val Thr Val Ser
145 150 155 160

Trp Asn Ser Gly Ala Leu Thr Ser Gly Val His Thr Phe Pro Ala Val
165 170 175

Leu Gln Ser Ser Gly Leu Tyr Ser Leu Ser Ser Val Val Thr Val Pro
180 185 190

Ser Ser Ser Leu Gly Thr Lys Thr Tyr Thr Cys Asn Val Asp His Lys
195 200 205

Pro Ser Asn Thr Lys Val Asp Lys Arg Val Glu Ser Lys Tyr Gly Pro
210 215 220

Pro Cys Pro Pro Cys Pro Ala Pro Glu Ala Ala Gly Gly Pro Ser Val
225 230 235 240

Phe Leu Phe Pro Pro Lys Pro Lys Asp Thr Leu Met Ile Ser Arg Thr
245 250 255

Pro Glu Val Thr Cys Val Val Val Asp Val Ser Gln Glu Asp Pro Glu
260 265 270

```
Val Gln Phe Asn Trp Tyr Val Asp Gly Val Glu Val His Asn Ala Lys
        275                 280                 285

Thr Lys Pro Arg Glu Glu Gln Phe Asn Ser Thr Tyr Arg Val Val Ser
    290                 295                 300

Val Leu Thr Val Leu His Gln Asp Trp Leu Asn Gly Lys Glu Tyr Lys
305                 310                 315                 320

Cys Lys Val Ser Asn Lys Gly Leu Pro Ser Ser Ile Glu Lys Thr Ile
                325                 330                 335

Ser Lys Ala Lys Gly Gln Pro Arg Glu Pro Gln Val Tyr Thr Leu Pro
            340                 345                 350

Pro Ser Gln Glu Glu Met Thr Lys Asn Gln Val Ser Leu Thr Cys Leu
        355                 360                 365

Val Lys Gly Phe Tyr Pro Ser Asp Ile Ala Val Glu Trp Glu Ser Asn
    370                 375                 380

Gly Gln Pro Glu Asn Asn Tyr Lys Thr Thr Pro Pro Val Leu Asp Ser
385                 390                 395                 400

Asp Gly Ser Phe Phe Leu Tyr Ser Arg Leu Thr Val Asp Lys Ser Arg
                405                 410                 415

Trp Gln Glu Gly Asn Val Phe Ser Cys Ser Val Met His Glu Ala Leu
            420                 425                 430

His Asn His Tyr Thr Gln Lys Ser Leu Ser Leu Ser Leu Gly Gly Gly
        435                 440                 445

Gly Gly Ser Gly Gly Gly Gly Ser Gly Gly Gly Gly Ser Gly Gly Gly
    450                 455                 460

Gly Ser Gly Ile Pro Pro His Val Gln Lys Ser Val Asn Asn Asp Met
465                 470                 475                 480

Ile Val Thr Asp Asn Asn Gly Ala Val Lys Phe Pro Gln Leu Cys Lys
                485                 490                 495

Phe Cys Asp Val Arg Phe Ser Thr Cys Asp Asn Gln Lys Ser Cys Met
            500                 505                 510

Ser Asn Cys Ser Ile Thr Ser Ile Cys Glu Lys Pro Gln Glu Val Cys
        515                 520                 525

Val Ala Val Trp Arg Lys Asn Asp Glu Asn Ile Thr Leu Glu Thr Val
    530                 535                 540

Cys His Asp Pro Lys Leu Pro Tyr His Asp Phe Ile Leu Glu Asp Ala
545                 550                 555                 560

Ala Ser Pro Lys Cys Ile Met Lys Glu Lys Lys Lys Pro Gly Glu Thr
                565                 570                 575

Phe Phe Met Cys Ser Cys Ser Ser Asp Glu Cys Asn Asp Asn Ile Ile
            580                 585                 590

Phe Ser Glu Glu Tyr Asn Thr Ser Asn Pro Asp
        595                 600
```